United States Patent
Atsumi et al.

(10) Patent No.: US 7,877,068 B2
(45) Date of Patent: Jan. 25, 2011

(54) SEMICONDUCTOR DEVICE

(75) Inventors: Tomoaki Atsumi, Isehara (JP);
Hidetomo Kobayashi, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 566 days.

(21) Appl. No.: 12/003,354

(22) Filed: Dec. 21, 2007

(65) Prior Publication Data
US 2008/0153450 A1    Jun. 26, 2008

(30) Foreign Application Priority Data

Dec. 25, 2006  (JP) .............................. 2006-347086
Dec. 26, 2006  (JP) .............................. 2006-350344

(51) Int. Cl.
H04B 1/16  (2006.01)

(52) U.S. Cl. .................................. 455/134; 455/277.1

(58) Field of Classification Search ................ 455/130, 455/133, 134, 135, 136, 272, 277.1, 277.2; 375/347
See application file for complete search history.

(56) References Cited

U.S. PATENT DOCUMENTS

| | | | |
|---|---|---|---|
| 5,390,357 A * | 2/1995 | Nobusawa et al. | .......... 455/134 |
| 6,848,620 B2 | 2/2005 | Nakane et al. | |
| 2006/0192019 A1 | 8/2006 | Kato et al. | |
| 2010/0073137 A1 * | 3/2010 | Kobayashi | ................. 340/10.1 |

FOREIGN PATENT DOCUMENTS

| | | |
|---|---|---|
| EP | 1 251 458 | 10/2002 |
| JP | 2000-172806 | 6/2000 |
| JP | 2002-319007 | 10/2002 |
| JP | 2006-268838 | 10/2006 |

OTHER PUBLICATIONS

International Search Report (Application No. PCT/JP2007/074603) Dated Apr. 1, 2008.
Written Opinion (Application No. PCT/JP2007/074603) Dated Apr. 1, 2008.

* cited by examiner

*Primary Examiner*—Thanh C Le
(74) *Attorney, Agent, or Firm*—Eric J. Robinson; Robinson Intellectual Property Law Office, P.C.

(57) ABSTRACT

A demodulation signal is generated by provision of a demodulation signal generation circuit to the semiconductor device capable of wireless communication and by obtainment of a difference between voltages having opposite polarities by the demodulation signal generation circuit. Alternatively, a plurality of demodulation signal generation circuits and a selective circuit which selects a demodulation signal generation circuit depending on characteristics of a received signal are provided, where operation of a second demodulation signal generation circuit stops when a first demodulation signal generation circuit is operated. The selective circuit includes an inverter circuit, a flip-flop circuit, and a selector circuit. When the second demodulation signal generation circuit has a comparator and the like, power consumption thereof is reduced.

25 Claims, 33 Drawing Sheets

FIG. 6A
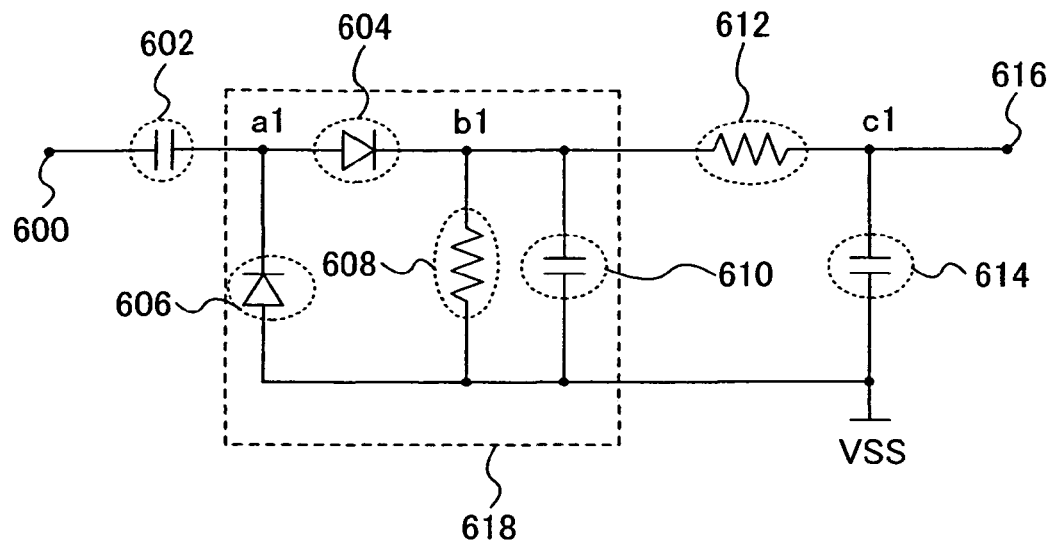
FIG. 6B
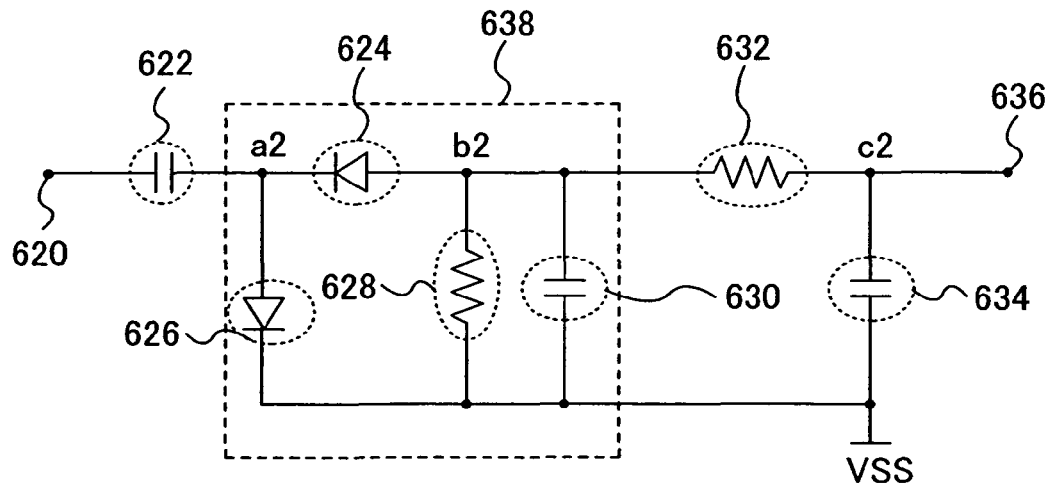
FIG. 6C
(C-1)
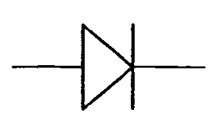
(C-2)
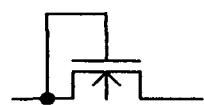
(C-3)
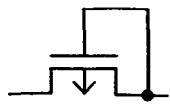

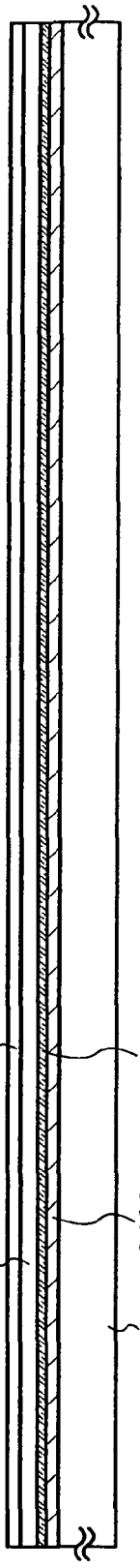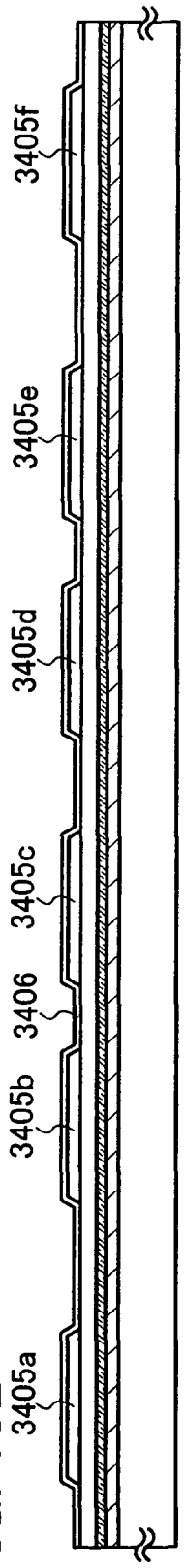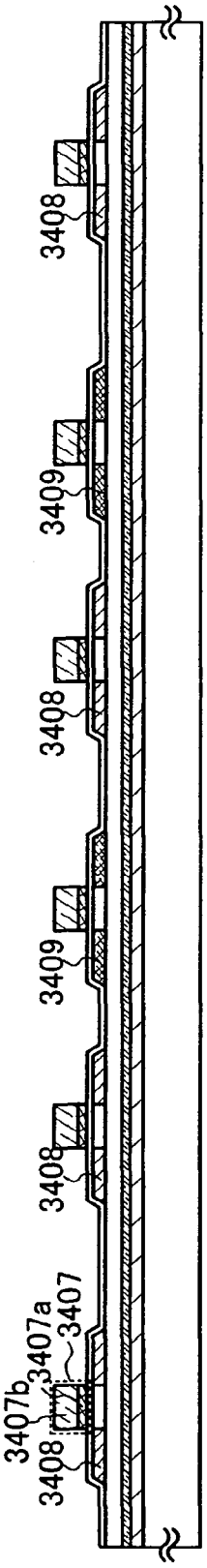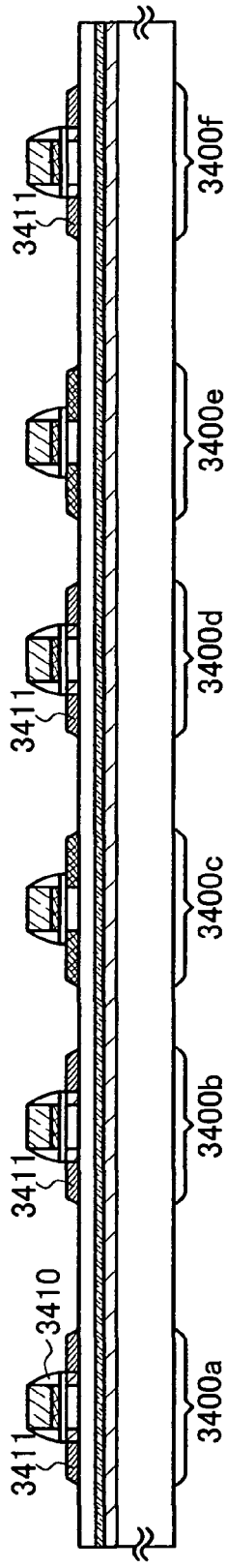

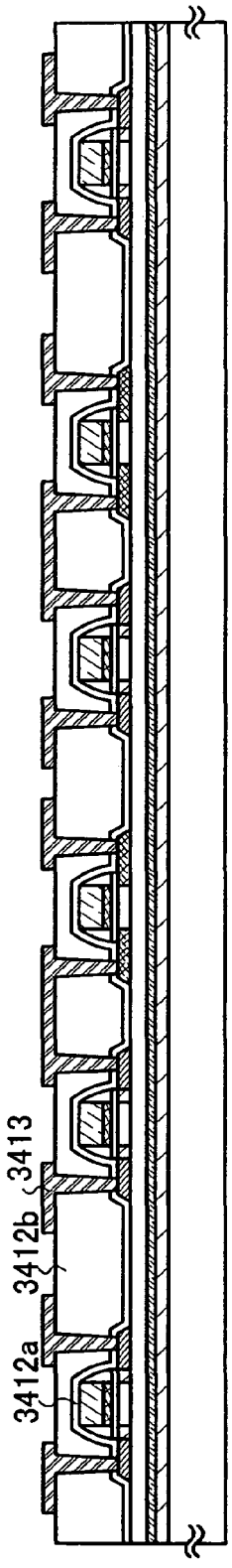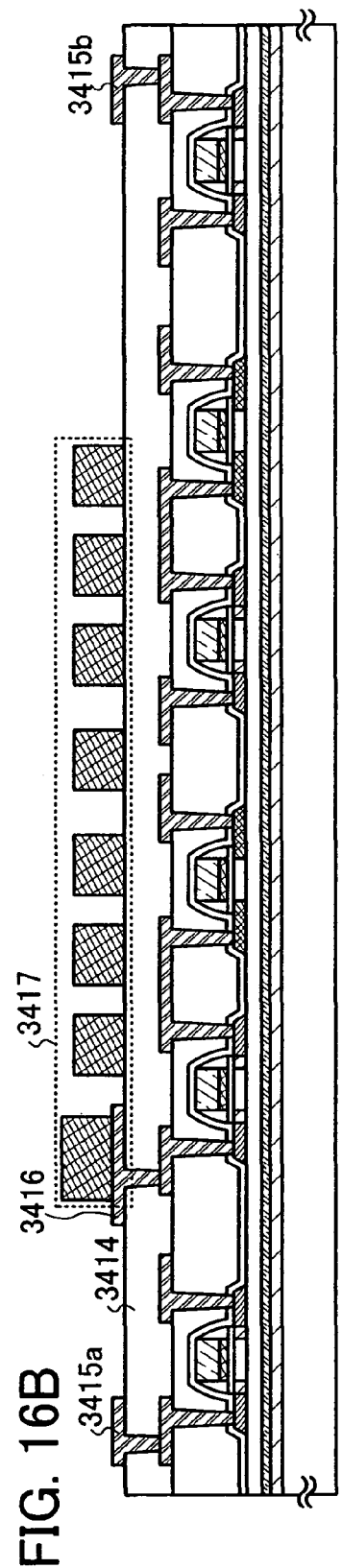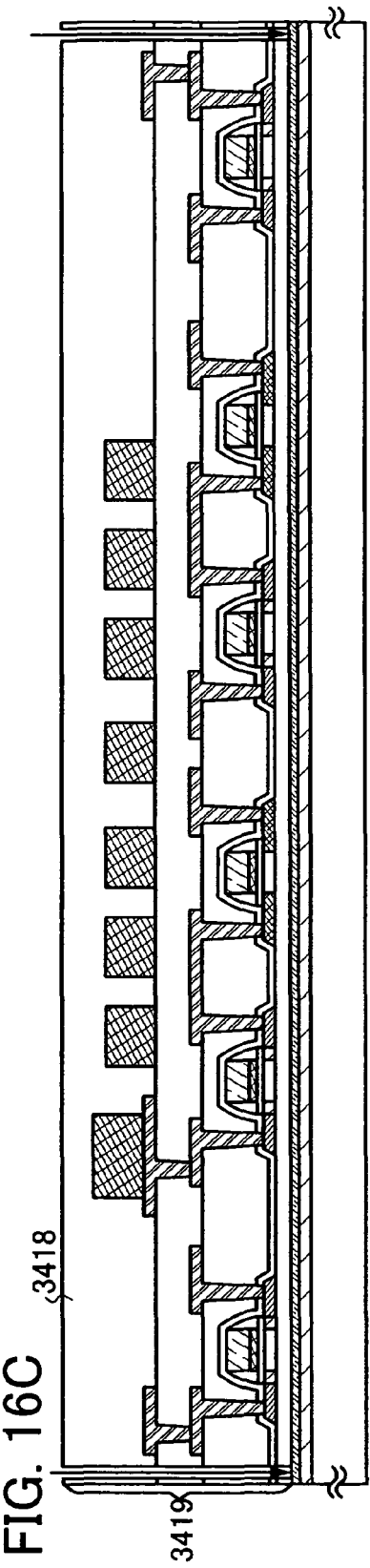

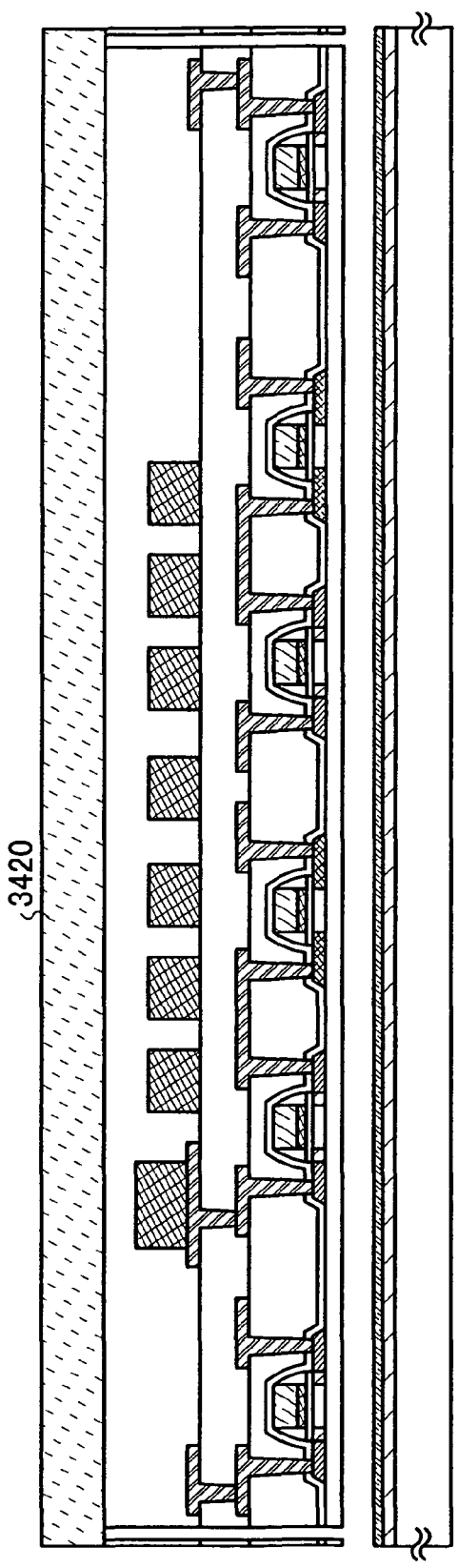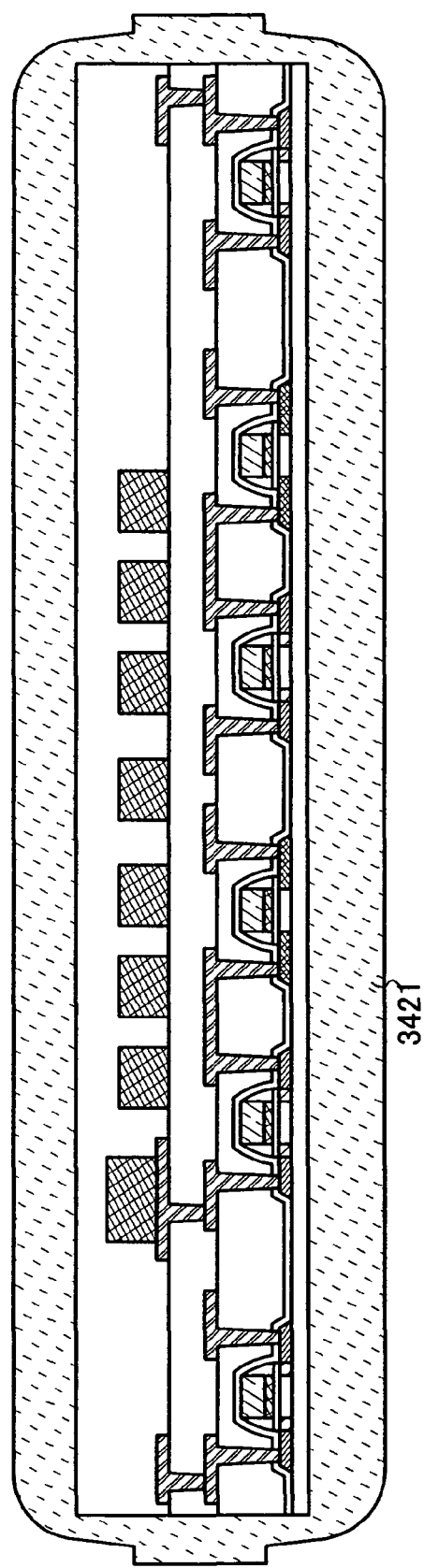
FIG. 17A
FIG. 17B

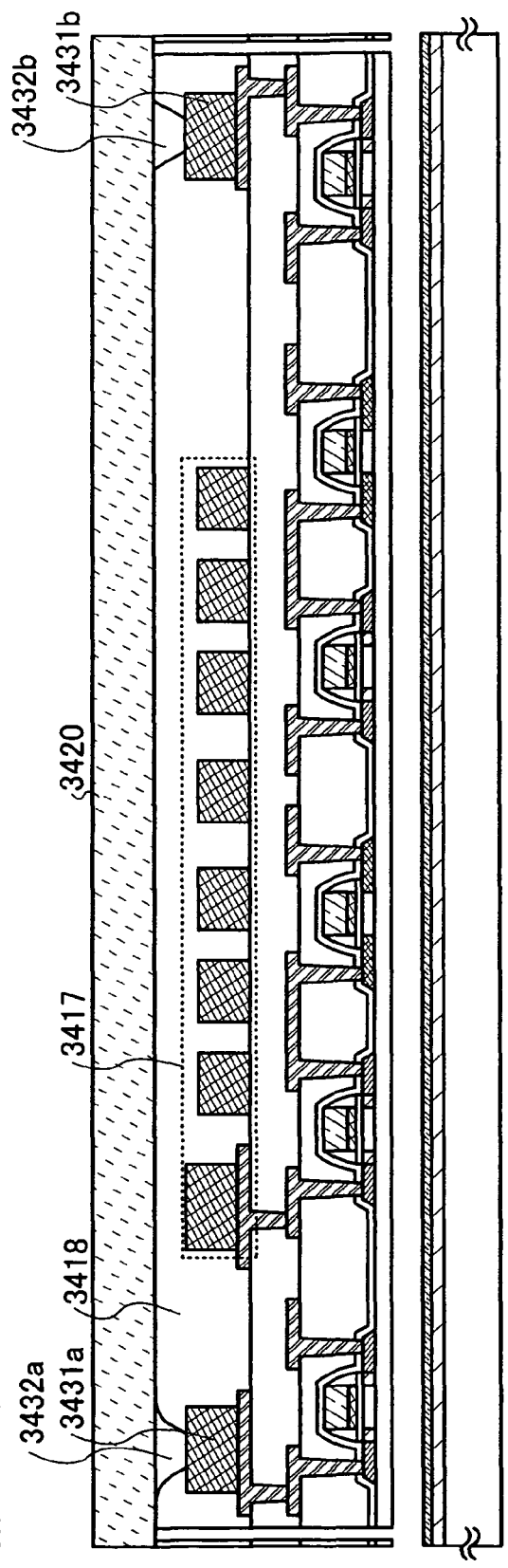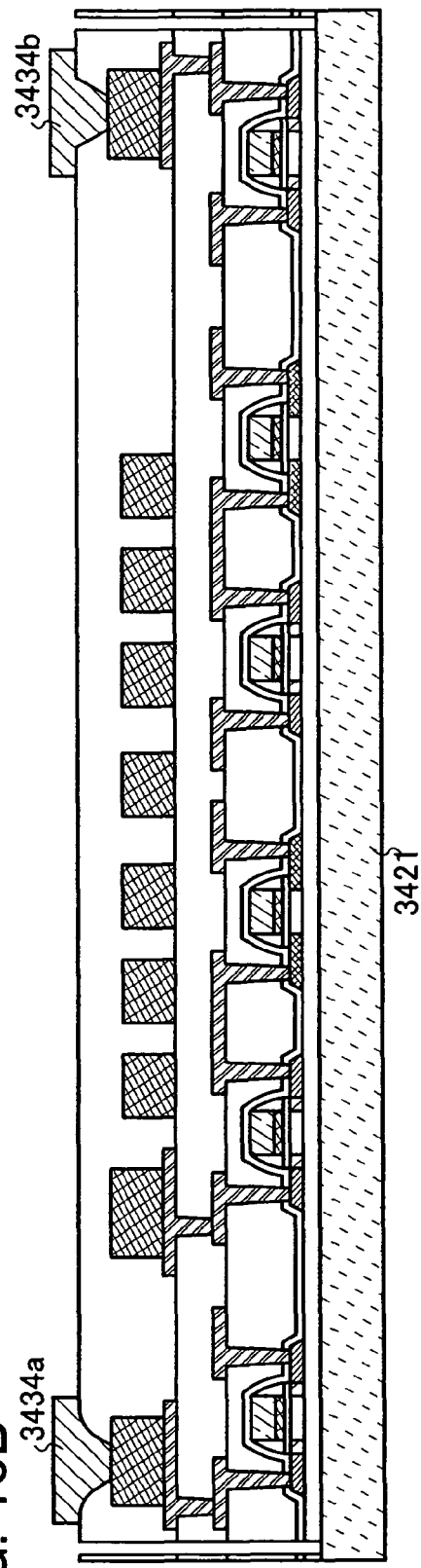

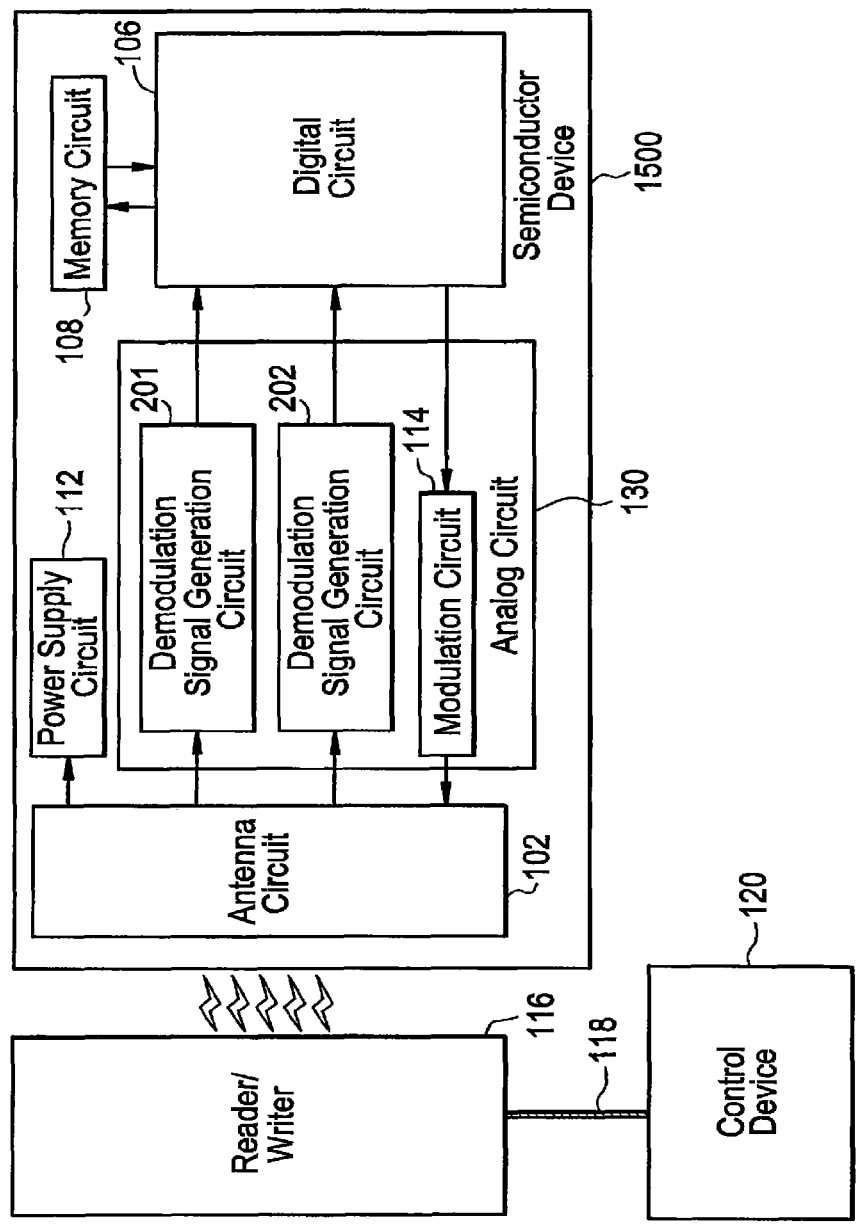

ly, the development of semi-conductor devices which can transmit and receive data without contact by utilizing wireless communication through a radio wave has been advanced. Such semiconductor devices are referred to as an IC tag, an RFID tag, and the like, which have begun to be used for management of articles in markets, or the like.

SEMICONDUCTOR DEVICE

TECHNICAL FIELD

The present invention relates to semiconductor devices. In particular, the present invention relates to semiconductor devices which can transmit and receive information without contact by utilizing wireless communication.

BACKGROUND ART

In recent years, individual recognition technology in which individual identification information is given to an individual object to clarify information such as a history of the object has attracted attention. In particular, the development of semiconductor devices which can transmit and receive data without contact by utilizing wireless communication through a radio wave has been advanced. Such semiconductor devices are referred to as an IC tag, an RFID tag, and the like, which have begun to be used for management of articles in markets, or the like.

In general, many of objects which are referred to as an RFID tag and the like that have been put into practical use include an element formation layer and an antenna layer having a circuit formed of a transistor or the like. Such semiconductor devices capable of wireless communication perform wireless communication with a reader/writer through an electromagnetic wave, so that the semiconductor devices can be operated by receiving power from a power supply and data from the reader/writer. In wireless communication between the reader/writer and the semiconductor device, in general, a transmission side device (a reader/writer) transmits a modulated carrier wave and a reception side device (a semiconductor device) demodulates the carrier wave, so that data is extracted and information is transmitted and received.

In the semiconductor devices capable of wireless communication, there is an amplitude modulation method (an amplitude shift keying (ASK) modulation method) as one of methods which modulate a carrier wave. An ASK modulation method is a method which transmits information by generation of a difference in amplitude of a carrier wave and use of this amplitude difference as a modulation signal. Here, when an amplitude in a low state (a difference between a signal line (an amplitude peak) and a reference line (an amplitude center) is a and an amplitude in a high state (a difference between a signal line (an amplitude peak) and a reference line (an amplitude center) is b, a modulation factor m can be expressed as m=(b−a)/(b+a). The transmission side device can decide a modulation factor by a method in accordance with both the transmission side device and the reception side device which perform wireless communication. The reception side device receives a modulation signal of which modulation factor is decided by the transmission side device, and demodulates the modulation signal.

Since the semiconductor device capable of wireless communication includes an integrated circuit provided with a minute semiconductor element, a problem of variation or the like arises and it has been difficult to manufacture a semiconductor device having favorable electric characteristics. However, a semiconductor device having favorable electric characteristics has nearly been realized with various improvements (for example, see Patent Document 1: Japanese Published Patent Application No. 2006-268838).

Note that the semiconductor device capable of wireless communication performs transmission, reception, and the like of a signal in accordance with a communication method based on various standards as communication thereof. With a communication method which is standardized with ISO/IEC 15693 which is a standard of a vicinity-type wireless IC card, a 13.56 MHz carrier wave is modulated in order to obtain a modulation factor of 100% or 10%, and data is encoded with a pulse position modulation method which identifies data by change of a modulation position of a pulse position. There are ISO/IEC14443 (TYPE-A) and ISO/IEC18000-3 as standards similar to ISO/IEC 15693. In ISO/IEC14443 (TYPE-A), it is prescribed that a carrier wave of which modulation factor is 100% is expressed with an amplitude of which initial amplitude (an amplitude in a state without modulation) is less than or equal to 5%. Note that a communication frequency of these standards is 13.56 MHz. Further, various means can be considered in order to demodulate a signal of which modulation factor is 10% (for example, see Patent Document 2: Japanese Published Patent Application No. 2000-172806).

DISCLOSURE OF INVENTION

In general, a reception side device includes an analog circuit having a demodulation circuit, a power supply circuit, a modulation circuit, and the like, and a digital circuit connected to the analog circuit. As an output of the demodulation circuit, a demodulation signal is outputted from the analog circuit and inputted into the digital circuit. When a carrier wave of which modulation factor is 100% is used for wireless communication, a state in which an amplitude is 0 (a state in which an amplitude peak and a reference line accord with each other) is included. Therefore, in a semiconductor device capable of wireless communication which operates by generating power from a power supply through a received electromagnetic wave, it is difficult to supply power from a power supply when an amplitude of a carrier wave of which modulation factor is 100%, which is used for wireless communication, is 0. Accordingly, the operation of the semiconductor device is interfered. In such a semiconductor device, a certain amplitude is secured so as to supply power with the use of a carrier wave of which modulation factor is small (for example, a carrier wave of which modulation factor is 10%); thus, the semiconductor device can be operated.

FIG. 4 illustrates a circuit configuration of a general demodulation circuit which demodulates a carrier wave of which modulation factor is 100%. A circuit of FIG. 4 includes a first diode, a second diode, a first resistor, a second resistor, a first capacitor, a second capacitor, and a third capacitor. In the circuit illustrated in FIG. 4, an input portion is connected to one end of the first capacitor. The other end of the first capacitor is connected to an anode (a first electrode) of the first diode and a cathode (a second electrode) of the second diode. A cathode (a second electrode) of the first diode is connected to each of one ends of the first resistor, the second resistor, and the second capacitor. An anode (a first electrode) of the second diode is grounded. Each of the other ends of the first resistor and the second capacitor are also grounded. The other end of the second resistor is connected to one end of the third capacitor and an output portion. The other end of the third capacitor is grounded.

Although the circuit illustrated in FIG. 4 can demodulate a carrier wave of which modulation factor is large (for example, a carrier wave of which modulation factor is 100%), it is difficult to demodulate a carrier wave of which modulation factor is small (for example, a carrier wave of which modulation factor is 10%). This is because the demodulation circuit of FIG. 4 has large influence of noise, which results from a carrier wave, on an amplitude waveform, and this influence cannot be disregarded when a modulation factor thereof is small (for example, when the modulation factor is 10%).

Therefore, the noise can be reduced by employment of a low-pass filter or the like for the demodulation circuit; however, the noise is not sufficiently reduced.

Thus, the present invention provides a semiconductor device having a circuit which can generate a demodulation signal (a demodulation circuit generation circuit) without any problem also as to a modulation signal of which modulation factor is small (for example, a signal of which modulation factor is 10%).

Note that the following are provided in a circuit configuration proposed in Patent Document 2: a first demodulation means which regenerates data from a (IS014443-A) 100% ASK signal (a signal of which modulation factor is 100%); a second demodulation means which regenerates data from a (IS014443-B) 10% ASK signal (a signal of which modulation factor is 10%); and a selector means which selects each of regeneration signals. Further, in order to control the selector means, a means which generates a selective control signal by input of the regeneration signal and a transmission signal of the first demodulation means is provided. According to the configuration of Patent Document 2, a means which regenerates data that is not selected by the selector means can be said as a useless circuit in terms of operation of a semiconductor device. In particular, it is apparent that an amplifier circuit is incorporated into the second demodulation means which regenerates data from a 10% ASK signal (a signal of which modulation factor is 10%). Thus, when power consumed in the amplifier circuit is as large as one which cannot be disregarded as compared with consumption power of the whole semiconductor device, this will cause to deteriorate performance of the semiconductor device.

Thus, the present invention provides a semiconductor device in which, when data of a signal of which modulation factor is large (for example, a signal of which modulation factor is 100%) is selected, the operation of the amplifier circuit which is incorporated into the second demodulation means which regenerates data of a signal of which modulation factor is small (a signal of which modulation factor is 10%) is stopped and low power is consumed.

In the meantime, the demodulation circuit illustrated in FIG. 4 has a simple configuration, in which operation of a semiconductor device is not interfered. Therefore, the demodulation circuit is appropriate as a demodulation signal generation circuit for demodulating a signal of which modulation factor is large (for example, a signal of which modulation factor is 100%).

There is a case where a configuration appropriate for operation is different between the case where a carrier wave of which modulation factor is small (for example, the case where a modulation factor is 10%) and the case where a carrier wave of which modulation factor is large (for example, the case where a modulation factor is 100%). For example, when a carrier wave of which modulation factor is 100% is demodulated using a circuit which demodulates a demodulation signal of which modulation factor is 10%, there is a fear that an unnecessary element is operated and power is consumed uselessly.

Thus, the present invention provides a semiconductor device in which a circuit which generates a demodulation circuit in the case where a carrier wave of which modulation factor is small (for example, the case where a modulation factor is 10%) and a circuit which generates a demodulation circuit in the case where a carrier wave of which modulation factor is large (for example, the case where a modulation factor is 100%) are separately provided. Further, the present invention provides a semiconductor device which can identify a modulation factor, switch a circuit which is used depending on a modulation factor, stop part of operation of a circuit which is not used, and generate a demodulation signal which is appropriate depending on a modulation factor with minimum power.

A semiconductor device of the present invention includes one or a plurality of demodulation signal generation circuits, and any of the demodulation signal generation circuits has a first demodulation circuit which demodulates a modulation signal, a second demodulation circuit which demodulates an electric signal (a modulation signal) which has a polarity opposite to that of an electric signal in the first demodulation circuit, and a comparator. A demodulation signal outputted from the first demodulation circuit and a demodulation signal outputted from the second demodulation circuit are each inputted into an input portion of the comparator, whereby a voltage difference of these demodulation signals is obtained.

In the above semiconductor device, a difference between an amplitude of the signal demodulated by the first demodulation circuit and an amplitude of the signal demodulated by the second demodulation circuit is obtained by the comparator. Since the amplitude of the signal demodulated by the first demodulation circuit and the amplitude of the signal demodulated by the second demodulation circuit have the same phase, influence of noise, which results from a carrier wave, can be reduced to demodulate the signals stably.

Alternatively, a semiconductor device of the present invention preferably has a selective circuit which selects either a first demodulation signal generation circuit or a second demodulation signal generation circuit depending on a modulation signal to stop the other demodulation signal generation circuit. Specifically, the semiconductor device of the present invention includes the following: the first demodulation signal generation circuit which generates a demodulation signal from a carrier wave of which modulation factor is large (for example, a carrier wave of which modulation factor is 100%); the second demodulation signal generation circuit which generates a demodulation signal from a carrier wave of which modulation factor is small (for example, a carrier wave of which modulation factor is 10%); and the selective circuit which selects, depending on a modulation factor, which of the first demodulation signal generation circuit and the second demodulation signal generation circuit is used.

The selective circuit includes a logic element that identifies a difference between modulation factors and a logic element group that determines a demodulation signal generation circuit to be used.

First, in the semiconductor device of the present invention, the first demodulation signal generation circuit corresponding to a carrier wave of which modulation factor is large (for example, a carrier wave of which modulation factor is 100%) outputs a first demodulation signal, and the second demodulation signal generation circuit corresponding to a carrier wave of which modulation factor is small (a carrier wave of which modulation factor is 10%) outputs a second demodulation signal. That is, the first demodulation signal generation circuit can demodulate a carrier wave of which modulation factor is large (for example, a carrier wave of which modulation factor is 100%), and the second demodulation signal generation circuit can demodulate a carrier wave of which modulation factor is small (for example, a carrier wave of which modulation factor is 10%). Further, it is not assured that the first demodulation signal generation circuit demodulates a carrier wave of which modulation factor is small (for example, a carrier wave of which modulation factor is 10%) and the second demodulation signal generation circuit demodulates a carrier wave of which modulation factor is large (for example, a carrier wave of which modulation factor is 100%).

In a digital circuit, the first demodulation signal is monitored and, if the first demodulation signal is effective, the signal is transmitted to an amplitude circuit (for example, a comparator or the like) which is included in the second demodulation signal generation circuit and the circuit operation is stopped.

The first demodulation signal generation circuit is appropriate for demodulating a carrier wave of which modulation factor is large (for example, a carrier wave of which modulation factor is 100%). However, in a carrier wave of which modulation factor is small (for example, a carrier wave of which modulation factor is 10%), there is a carrier wave having an amplitude of a certain degree (for example, an amplitude of which degree is 90%) even during a modulated period, as compared with an amplitude during an unmodulated period. Therefore, it is difficult for the first demodulation signal generation circuit to demodulate a carrier wave of which modulation factor is small. Whether the first demodulation signal can be demodulated or not is determined using a logic element (for example, an inverter), and other signals (for example, a clock signal) is not necessary. The clock signal is a periodic signal which is used in operating the digital circuit or the like. In general, a clock is generated from an oscillation circuit, a frequency division circuit, or the like.

Note that the logic element refers to an element formed of a plurality of circuits which are provided in order to achieve a certain object in the digital circuit, in this specification.

Note that "the case where a modulation factor is 10%" and "the case where a modulation factor is 100%" are described in this specification; however, a range of a modulation factor which is approximately greater than or equal to 10% and less than or equal to 30% is typically described as "the case where a modulation factor is 10%". In addition, a range of a modulation factor which is approximately greater than or equal to 90% and less than or equal to 100% is typically described as "the case where a modulation factor is 100%". Thus, a modulation factor should not be interpreted as being strictly limited to the figures which are described and all modulation factors can be applied within a scope that does not depart from the meaning of the present invention.

With the use of the present invention, a demodulation signal of a modulation signal of which modulation factor is small (for example, a modulation signal of which modulation factor is 10%) can be generated. Therefore, a semiconductor device capable of wireless communication can be operated even when the modulation signal of which modulation factor is small is used, and power from a power supply is continuously supplied during reception of a wireless signal. Thus, the semiconductor device can be operated stably.

Further, in a semiconductor device of the present invention, influence of noise, which results from a carrier wave, can be reduced; thus, a highly reliable demodulation signal can be generated stably.

In a semiconductor device of the present invention, different demodulation signal generation circuits are used in the cases of a carrier wave of which modulation factor is small (for example, a carrier wave of which modulation factor is 10%) and a carrier wave of which modulation factor is large (for example, a carrier wave of which modulation factor is 100%). Therefore, as to a parameter of an element included in each of the demodulation signal generation circuits, it is not necessary to take into consideration even the case where a modulation factor is different; thus, flexibility in designing the semiconductor device is improved. Further, in the second demodulation signal generation circuit, the second demodulation signal is generated by detection of a difference between an output of a first bias circuit and an output of a second bias circuit in the second demodulation signal generation circuit. Therefore, even with a signal of which modulation factor is small, a demodulation signal can be generated stably. Accordingly, information can be transmitted and received. When a signal of which modulation factor is small is used, power from a power supply is continuously supplied; therefore, the semiconductor device can be operated stably.

Noise that exists in each of the outputs of the first bias circuit and the second bias circuit has the same phase. In the present invention, the second demodulation signal is generated by comparison of the outputs of the first bias circuit and the second bias circuit. Therefore, the noise of each of the outputs is cancelled, and influence of noise, which results from a carrier wave, is reduced; thus, a signal can be demodulated. Consequently, as to a wireless signal of which modulation factor is small (for example, a carrier wave of which modulation factor is 10%), the signal can be also detected stably.

In the case where a carrier wave of which modulation factor is small (for example, the case where a modulation factor is 10%) and the case where a carrier wave of which modulation factor is large (for example, the case where a modulation factor is 100%), power consumption of the semiconductor device of the present invention can be reduced by switching the demodulation signal generation circuit to be used and stopping part of operation of the circuit which is not used.

According to the present invention, a demodulation signal is monitored in the digital circuit only using the shape of a waveform of the first demodulation signal; therefore, the semiconductor of the present invention can be realized with a simple circuit configuration without the necessity of a complicated circuit.

BRIEF DESCRIPTION OF DRAWINGS

In the accompanying drawings:

FIGS. 6A to 6C (6C-1 to 6C-3) are diagrams each illustrating a semiconductor device of the present invention;

FIGS. 15A to 15D are views illustrating a manufacturing method of a semiconductor device to which the present invention is applied;

FIGS. 16A to 16C are views illustrating a manufacturing method of a semiconductor device to which the present invention is applied;

FIGS. 17A and 17B are views illustrating a manufacturing method of a semiconductor device to which the present invention is applied;

FIGS. 18A and 18B are views illustrating a manufacturing method of a semiconductor device to which the present invention is applied;

FIG. 31 is a diagram illustrating a semiconductor device of the present invention;

BEST MODE FOR CARRYING OUT THE INVENTION

Figure 1:
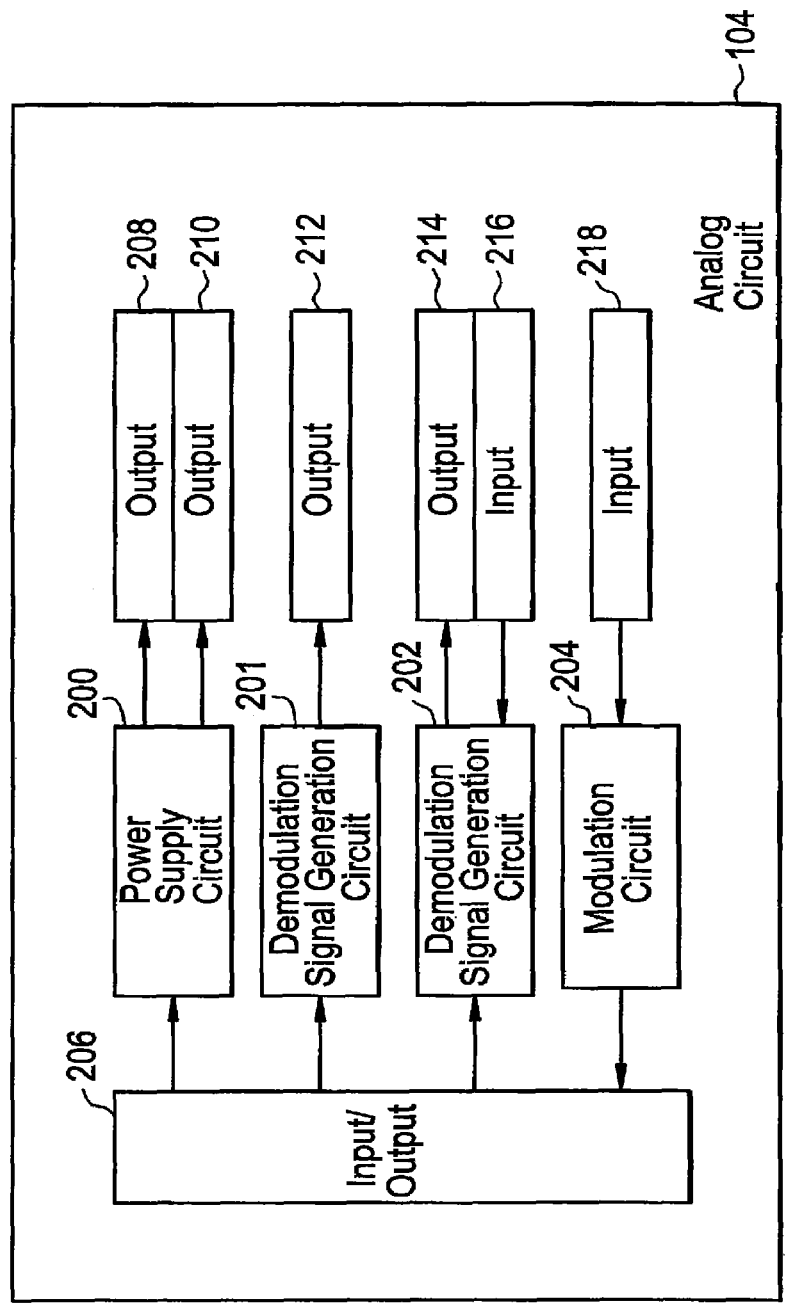
FIG. 1 is a diagram illustrating a semiconductor device of the present invention.

Embodiment modes and an embodiment of the present invention will be hereinafter described with reference to the accompanying drawings. However, the present invention can be implemented in various modes, and it is easily understood by those skilled in the art that modes and details thereof can be modified in various ways without departing from the meaning and the scope of the present invention. Therefore, the present invention should not be interpreted as being limited to the description of the embodiment modes and an embodiment below. Note that the same reference numeral is used in common to denote the same component in different drawings in structures of the present invention described below.

Embodiment Mode 1

This embodiment mode will describe an example of a structure of a semiconductor device of the present invention which includes a demodulation signal generation circuit with reference to drawings.

Figure 2:
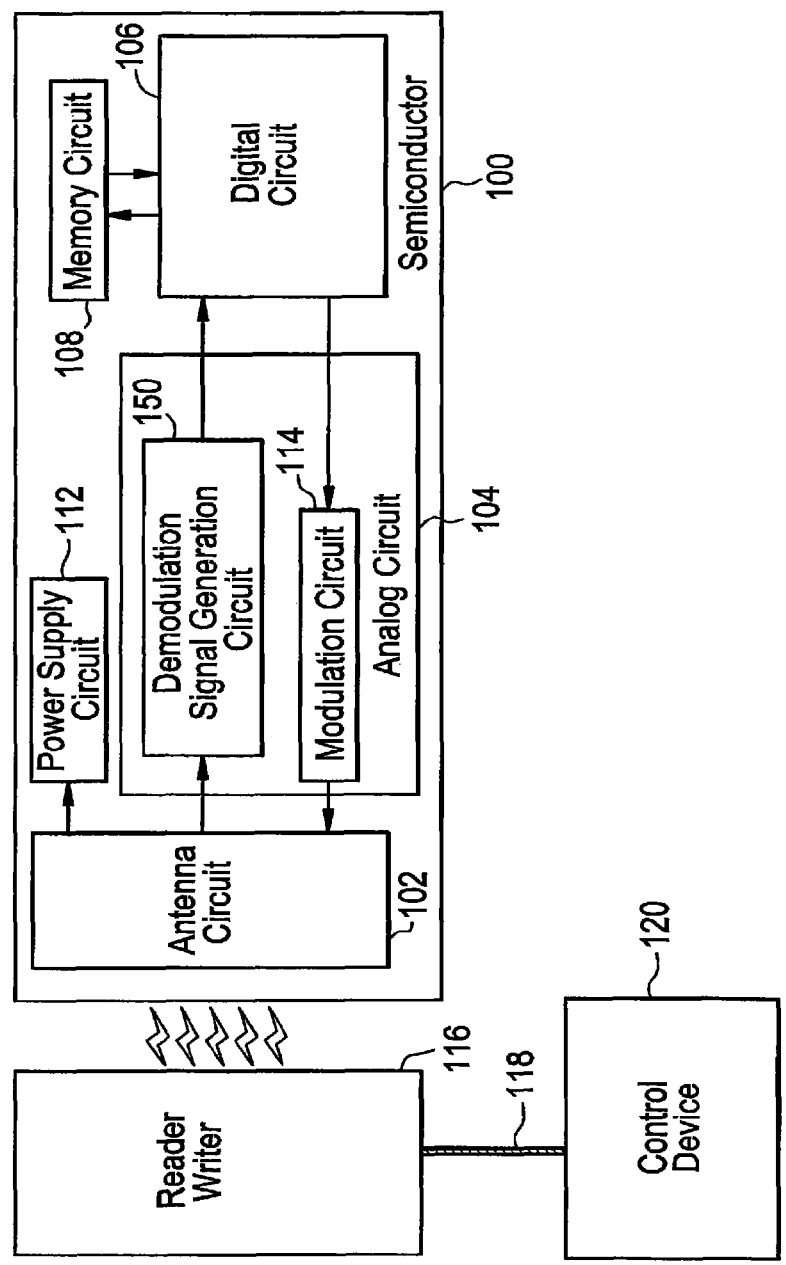
FIG. 2 is a diagram illustrating a semiconductor device of the present invention.

FIG. 2 illustrates a block diagram of a semiconductor device of the present invention. A semiconductor device 100 of the present invention transmits and receives data wirelessly to and from a reader/writer 116 by an electromagnetic wave. The reader/writer 116 is preferably connected to a control device 120 through a communication line 118. The control device 120 controls communication between the reader/writer 116 and the semiconductor device 100.

The semiconductor device 100 includes an antenna circuit 102, a power supply circuit 112, an analog circuit 104, a digital circuit 106, and a memory circuit 108. The analog circuit 104 has a demodulation signal generation circuit 150 and a modulation circuit 114. Alternatively, the semiconductor device 100 does not include an antenna but does include a wiring used to connect to an external antenna. The wiring and the external antenna may be connected with each other. In this case, the antenna which is separately manufactured is connected to the wiring. A connection terminal (a terminal electrode) which is electrically connected to the wiring may be used to connect the wiring and the antenna. Further, the semiconductor device 100 is not limited to the above structure, and may include a clock generation circuit, a central processor unit (hereinafter referred to as a CPU), or the like.

Note that the clock generation circuit refers to a circuit which generates and supplies to each circuit a clock signal having a frequency necessary for operations of the digital circuit 106, the memory circuit 108, and the like based on an AC induced voltage which is generated in the antenna circuit 102. An oscillation circuit or a frequency division circuit may be used for the clock generation circuit.

The antenna circuit 102 preferably having an antenna and a rectifier circuit receives an electromagnetic wave, which is transmitted from the reader/writer 116, and generates an AC induced voltage. The induced voltage becomes power from a power supply of the semiconductor device 100 and also includes data transmitted from the reader/writer 116.

The shape of the antenna that can be used for the present invention is not particularly limited. Therefore, a signal transmission method applied to the antenna circuit 102 included in the semiconductor device 100 can be an electromagnetic coupling method, an electromagnetic induction method, a radio wave method, or the like. The transmission method may be selected as appropriate by a practitioner in consideration of the intended use of the device. Thus, an antenna with an optimum length and shape may be provided in accordance with the transmission method. In the present invention, an electromagnetic induction method having a communication frequency of 13.56 MHz is preferably used as the signal transmission method.

In the case of applying an electromagnetic coupling method or an electromagnetic induction method (for example, a 13.56 MHz band) as the transmission method, a conductive film which functions as the antenna is formed in an annular form (for example, a loop antenna) or a helical form (for example, a spiral antenna) in order to utilize electromagnetic induction that occurs with changes in magnetic density.

In the case of using a microwave method (for example, UHF band (860 to 960 MHz), 2.45 GHz band, or the like) which is one kind of radio wave methods as the transmission method, the length and shape of the conductive film which functions as the antenna may be determined as appropriate in consideration of the wavelength of radio waves used for the signal transmission. For example, the conductive film which functions as the antenna may be formed in a linear form (for example, a dipole antenna), a flat form (for example, a patch antenna), or the like. Further, the shape of the conductive film which functions as the antenna is not limited to the linear form, and the conductive film may be provided in a curved form, a serpentine form, or a form combining them in consideration of the wavelength of the radio waves.

Figure 12A:
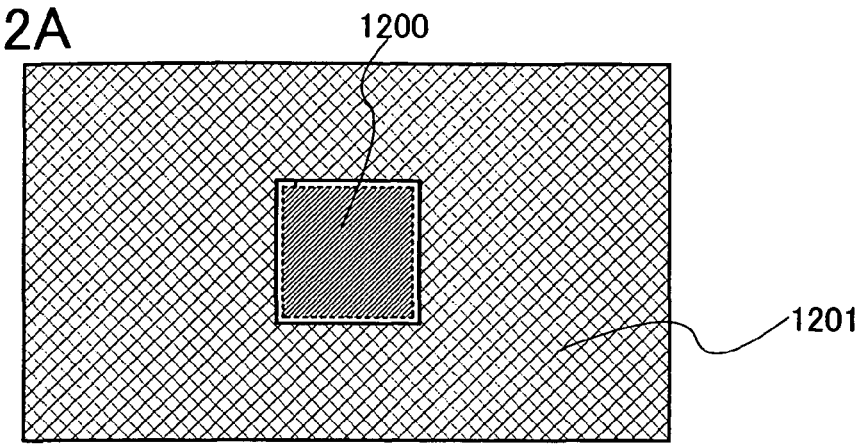
FIGS. 12A to 12E are views each illustrating a semiconductor device of the present invention.
Figure 12B:
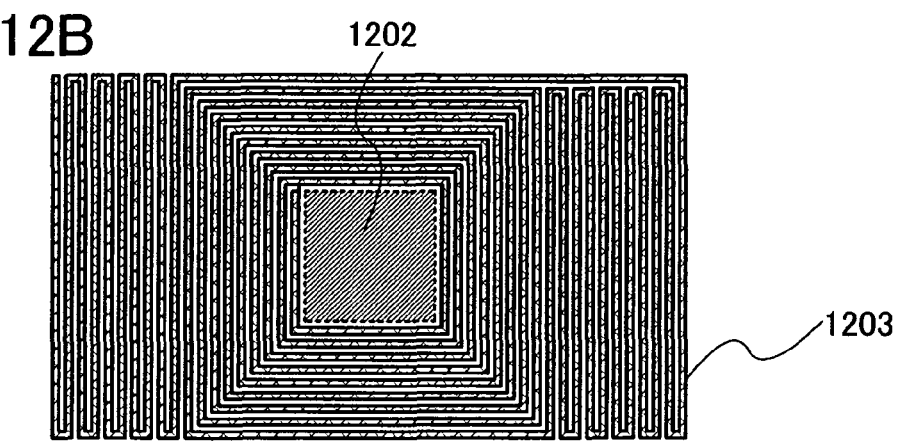
Figure 12C:
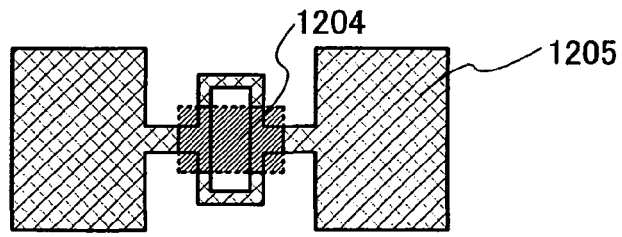
Figure 12D:
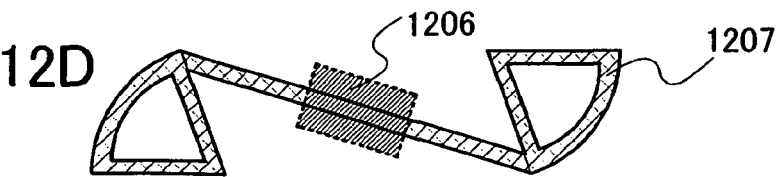
Figure 12E:
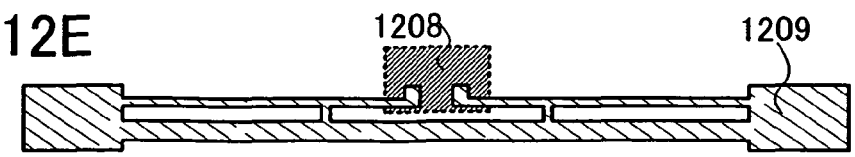

FIGS. 12A to 12E each illustrate an example of the shape of the antenna provided in the antenna circuit 102. For example, as illustrated in FIG. 12A, a layout may be used in which an antenna 1201 is disposed all around a chip 1200 provided with a signal processing circuit. Alternatively, as illustrated in FIG. 12B, a layout may be used in which a chip 1202 provided with a signal processing circuit is coiled around by a thin antenna 1203. Further, as illustrated in FIG. 12C, a layout may be used in which an antenna of which shape is like that of an antenna 1205 for receiving high-frequency electromagnetic waves is disposed for a chip 1204 provided with a signal processing circuit. Alternatively, as illustrated in FIG. 12D, a layout may be used in which an antenna of which shape is like that of an antenna 1207 which is 180-degree omnidirectional (such that it can receive signals equally from any direction) is disposed for a chip 1206 provided with a signal processing circuit. As a further alternative, as illustrated in FIG. 12E, a layout may be used in which an antenna of which shape is like that of an antenna 1209 with a long rod shape is disposed for a chip 1208 provided with a signal processing circuit. The antenna circuit 102 may be formed by combination of the antennas with the above shapes.

In FIGS. 12A to 12E, a connection method between the chip 1200 or the like provided with a signal processing circuit and the antenna 1201 or the like is not particularly limited as long as a signal can be transmitted and received between the chip and the antenna. By giving FIG. 12A as an example, the antenna 1201 and the chip 1200 provided with a signal processing circuit are connected to each other by wire bonding or bump bonding. Alternatively, part of the chip may be used as an electrode to be attached to the antenna 1201. With this method, the chip 1200 can be attached to the antenna 1201 with the use of an anisotropic conductive film (hereinafter referred to as ACF). Further, an appropriate length of the antenna differs depending on the frequency of a signal to receive. In general, in the case where, for example, a frequency of 2.45 GHz is used, the length of the antenna may be approximately 60 nm (a half of the wavelength) or approximately 30 mm (a quarter of the wavelength).

The power supply circuit 112 rectifies an induced voltage, which is generated in the antenna circuit 102, by a diode or the like, and stabilizes the induced voltage with the use of a capacitor, thereby adjusting so as to maintain a stable potential having a certain potential difference from a reference potential (a potential of a reference line).

The digital circuit 106 performs the following operations based on a demodulated signal: analyzing instructions; controlling the memory circuit 108; outputting data for external transmission to the modulation circuit 114; and the like. The digital circuit 106 may include a decoding circuit, an information judging circuit, or the like, in addition to a generation circuit of a memory control signal. Further, the digital circuit 106 may include a circuit which converts part or all of data extracted from the memory circuit 108, which is transmitted from the semiconductor device 100 to the reader/writer 116, into an encoded signal.

The memory circuit 108 stores at least specific data (individual identification information) of the semiconductor device 100. The memory circuit 108 includes a control circuit, which performs writing or reading of data in accordance with the digital circuit 106, and a circuit having a memory element. The memory circuit 108 includes one or more of an organic memory, a dynamic random access memory (DRAM), a static random access memory (SRAM), a ferroelectric random access memory (FeRAM), a mask read-only memory (ROM), a programmable read only memory (PROM), an electrically programmable read only memory (EPROM), an electrically erasable programmable read only memory (EEPROM), and a flash memory. As long as the memory content of the memory circuit 108 is specific data (individual identification information or the like) of the semiconductor device 100, a nonvolatile memory which can store memory without being supplied with power is preferably used. On the other hand, as long as temporary memory is used in processing performed by the semiconductor device 100 is stored, a volatile memory may be used. Particularly in the case of a so-called passive type in which the semiconductor device 100 has no battery, a nonvolatile memory is preferably used as the memory circuit 108.

The organic memory has a structure in which a layer containing an organic compound is sandwiched between a pair of conductive layers, which has at least two advantages because the structure is simple. One advantage is that a manufacturing process can be simplified and that the cost can be reduced. The other advantage is that it is easy to reduce the area of the memory circuit and increase in capacitor can be realized easily. Therefore, it is preferable to use the organic memory for the memory circuit 108.

The modulation circuit 114 transmits load modulation to the antenna circuit 102 based on a signal from the digital circuit 106.

The demodulation signal generation circuit 150 demodulates and extracts data included in the induced voltage which is generated in the antenna circuit 102.

In the semiconductor device of this embodiment mode, an electromagnetic wave from the reader/writer is received and power by the electromagnetic wave is supplied to drive the semiconductor device. Therefore, although a passive-type semiconductor device is described in this embodiment mode, the present invention is not limited thereto. As a structure in which a battery is contained inside the semiconductor device, power may be supplied from a battery to drive the semiconductor device.

In the electromagnetic wave transmitted from the reader/writer, a carrier wave having a certain frequency is modulated from a sub-carrier wave. A signal included in the sub-carrier wave is a binarized digital signal which is transmitted to the semiconductor device from the reader/writer. As to a modulation method of the carrier wave, there are an amplitude shift keying (ASK) modulation method which changes amplitude and a frequency shift keying (FSK) modulation method which changes a frequency. This embodiment mode describes the case in which an electromagnetic wave modulated by the ASK modulation method is demodulated.

Figure 30:
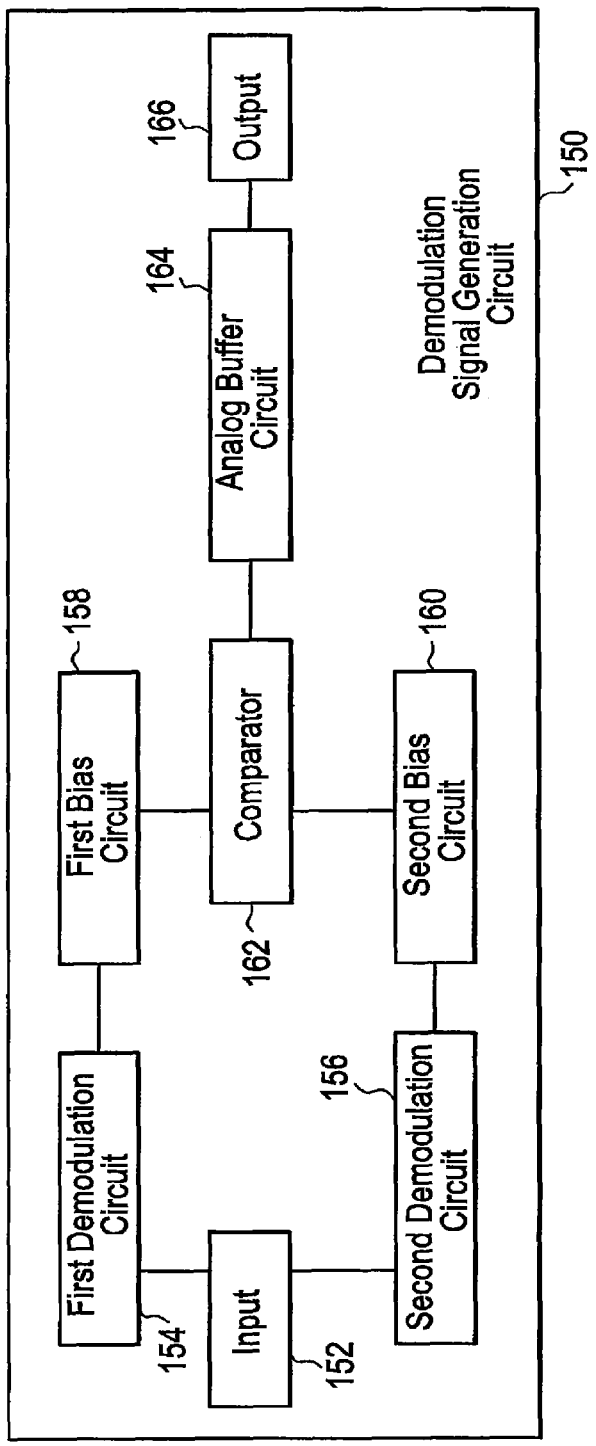
FIG. 30 is a diagram illustrating a semiconductor device of the present invention.

The demodulation signal generation circuit 150 included in the semiconductor device 100 of the present invention is described with reference to FIG. 30. FIG. 30 illustrates a block diagram of the demodulation signal generation circuit 150 which can be used for this embodiment mode. The demodulation signal generation circuit 150 includes a first demodulation circuit 154, a second demodulation circuit 156, a first bias circuit 158, a second bias circuit 160, and a comparator 162. Although these circuits included in the demodulation signal generation circuit 150 are described below, the present invention is not limited thereto.

An input portion 152 of the demodulation signal generation circuit 150 illustrated in FIG. 30 is connected to an input portion 600 of the first demodulation circuit 154 and an input portion 620 of the second demodulation circuit 156. An output portion 616 of the first demodulation circuit 154 is connected to an input portion 800A of the first bias circuit 158, and an output portion 636 of the second demodulation circuit 156 is connected to an input portion 800B of the second bias circuit 160. An output portion 808A of the first bias circuit 158 is connected to a first input portion 900A of the comparator 162, and an output portion 808B of the second bias circuit 160 is connected to a second input portion 900B of the comparator 162. An output portion 912 of the comparator 162 is connected to an output portion 166 of the demodulation signal generation circuit 150.

Note that the output portion 912 of the comparator 162 and the output portion 166 of the demodulation signal generation circuit 150 are preferably connected to each other through an analog buffer circuit 164 as illustrated in FIG. 30. As the analog buffer circuit 164, a source follower circuit, a common source amplifier circuit, and the like can be given. Noise can be removed more effectively and a demodulation signal can be generated stably by provision of the analog buffer circuit 164.

FIGS. 6A to 6C (6C-1 to 6C-3) each illustrate an example of a configuration of a demodulation circuit which is used as each of the first demodulation circuit 154 and the second demodulation circuit 156. FIG. 6A illustrates the first demodulation circuit 154. The first demodulation circuit 154 includes the input portion 600, the output portion 616, a first diode 604, a second diode 606, a first resistor 608, a second resistor 612, a first capacitor 602, a second capacitor 610, and a third capacitor 614. The input portion 600 is connected to one end of the first capacitor 602. The other end of the first capacitor 602 is connected to an anode of the first diode 604 and a cathode of the second diode 606. A cathode of the first diode 604 is connected to each of one ends of the first resistor 608, the second capacitor 610, and the second resistor 612. The other end of the second resistor 612 is connected to one end of the third capacitor 614 and the output portion 616. Further, an anode of the second diode 606, each of the other ends of the first resistor 608, the second capacitor 610, and the third capacitor 614 are connected to a reference potential ($V_{SS}$).

FIG. 6B illustrates the second demodulation circuit 156. The demodulation circuit illustrated in FIG. 6B includes the input portion 620, the output portion 636, a first diode 624, a second diode 626, a first resistor 628, a second resistor 632, a first capacitor 622, a second capacitor 630, and a third capacitor 634. The input portion 620 is connected to one end of the first capacitor 622. The other end of the first capacitor 622 is connected to a cathode of the first diode 624 and an anode of the second diode 626. An anode of the first diode 624 is connected to each one ends of the first resistor 628, the second capacitor 630, and the second resistor 632. The second resistor 632 is connected to one end of the third capacitor 634 and the output portion 636. Further, a cathode of the second diode 626, each of the other ends of the first resistor 628, the second capacitor 630, and the third capacitor 634 are connected to a reference potential ($V_{SS}$).

Figure 3:
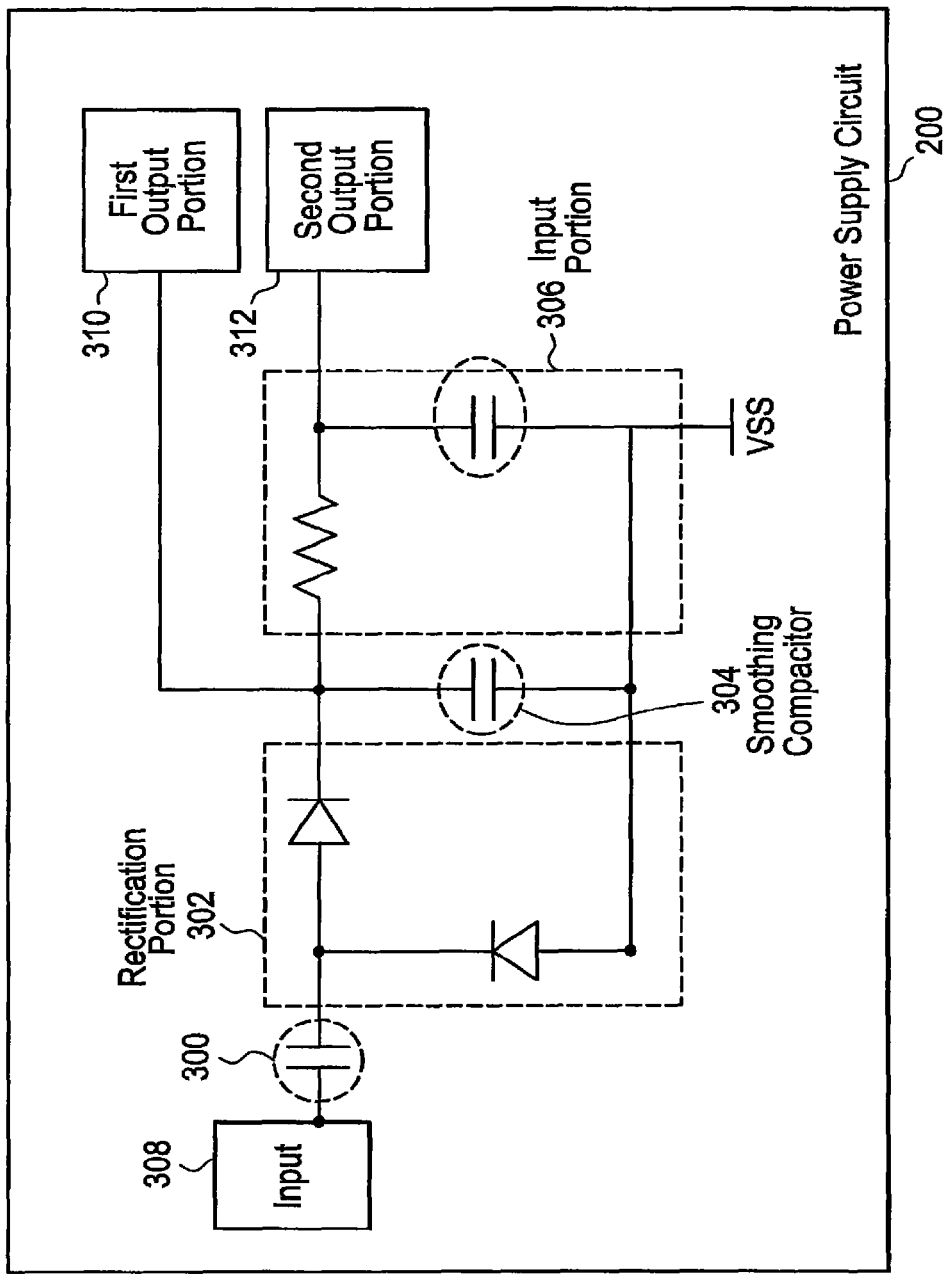
FIG. 3 is a diagram illustrating a semiconductor device of the present invention.
Figure 7A:
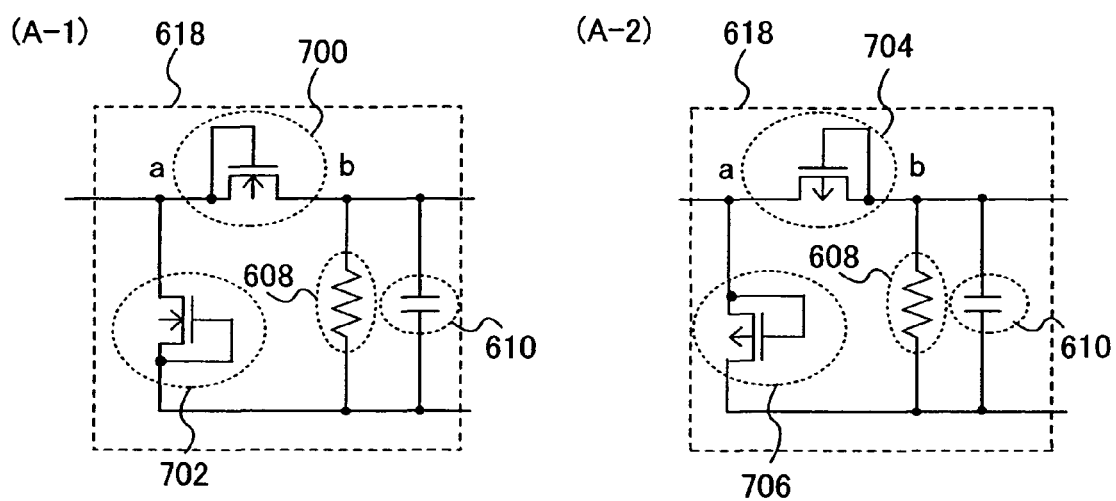
FIG. 7A (7A-1 and 7A-2) and 7B (7B-1 and 7B-2) are diagrams each illustrating a semiconductor device of the present invention.

Each of the first diode 604, the second diode 606, the first diode 624, and the second diode 626 of FIGS. 6A and 6B may be formed of a diode-connected TFT. A diode illustrated in FIG. 6C-1, a diode-connected n-type TFT illustrated in FIG. 6C-2, and a diode-connected p-type TFT illustrated in FIG. 6C-3 are equivalent as a circuit. FIG. 7A (7A-1 and 7A-2) each illustrate an example in which a circuit 618, which is part of the first demodulation circuit 154, illustrated in FIG. 6A is formed using any of the TFTs illustrated in FIG. 6C (6C-1 to 6C-3). Similarly, FIG. 7B (7B-1 and 7B-2) each illustrate an example in which a circuit 638, which is part of the second demodulation circuit 156, illustrated in FIG. 6B is formed using any of the TFTs illustrated in FIG. 6C (6C-1 to 6C-3). In the circuit illustrated in FIG. 7A-1, n-type TFTs 700 and 702 are used as diode-connected TFTs. In the circuit illustrated in FIG. 7A-2, p-type TFTs 704 and 706 are used as diode-connected TFTs. In the circuit illustrated in FIG. 7B-1, n-type TFTs 708 and 710 are used as diode-connected TFTs. In the circuit illustrated in FIG. 7B-2, p-type TFTs 712 and 714 are used as diode-connected TFTs.

Figure 7B:
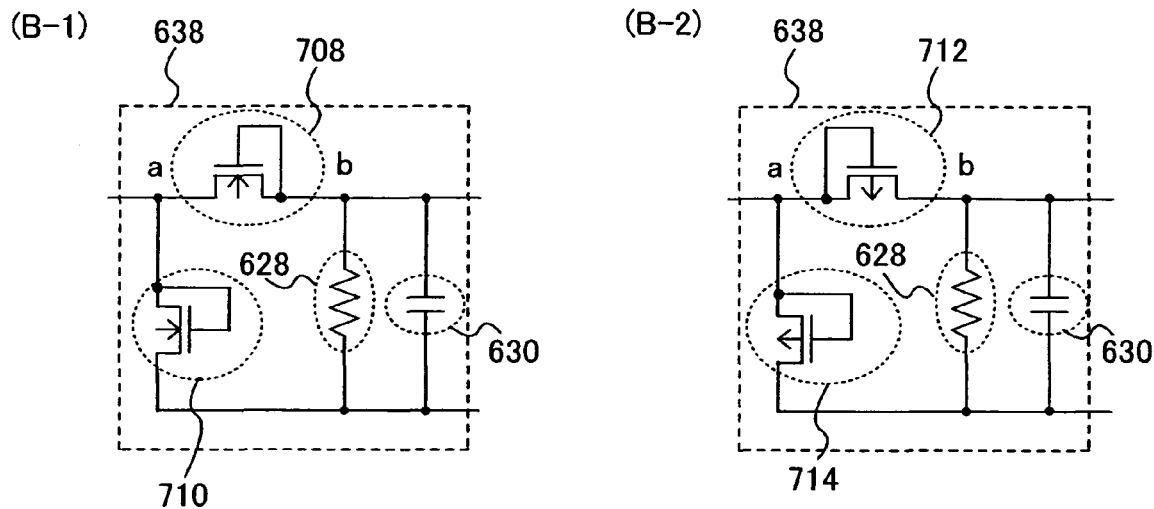

The first demodulation circuit 154 and the second demodulation circuit 156 may be formed by combination of the circuits illustrated in FIGS. 6A to 6C (6C-1 to 6C-3) and FIG. 7A (7A-1 and 7A-2) and 7B (7B-1 and 7B-2). The first demodulation circuit 154 having the circuit 618 illustrated in FIG. 7A-1 and the second demodulation circuit 156 having the circuit 638 illustrated in FIG. 7B-2 may be used, or the first demodulation circuit 154 having the circuit 618 illustrated in FIG. 7A-2 and the second demodulation circuit 156 having the circuit 638 illustrated in FIG. 7B-1 may be used. Alternatively, the first demodulation circuit 154 having the circuit 618 illustrated in FIG. 7A-2 and the second demodulation circuit 156 having the circuit 638 illustrated in FIG. 7B-2 may be used. Preferably, the circuit 618 illustrated in FIG. 7A-1 is used for the first demodulation circuit 154, and the circuit 638 illustrated in FIG. 7B-1 is used for the second demodulation circuit 156. In general, carriers of an n-type TFT have higher mobility than those of a p-type TFT. Therefore, n-type TFTs are used for all TFTs included in the first demodulation circuit and the second demodulation circuit, so that operation performance of the circuits can be improved.

The first capacitor 602 (or the first capacitor 622) is provided to compensate center of a wave amplitude (a reference line). The first resistor 608 (or the first resistor 628) is provided to make constant current flowing through a point b1 (or a point b2). Further, the second capacitor 610 (or the second capacitor 630) is provided to smooth a waveform. The resistance of the first resistor 608 (or the first resistor 628) is adjusted as appropriate depending on the degree of electrostatic capacitance of the second capacitor 610 (or the second capacitor 630). When the resistance of the first resistor 608 (or the first resistor 628) is small, an amplitude of the carrier wave is reduced; and when the resistance is excessive, a breakdown phenomenon of the second diode 606 (or the second diode 626) occurs; thus, the semiconductor device does not operate normally. Furthermore, the second resistor 612 (or the second resistor 632) and the third capacitor 614 (or the third capacitor 634) function as a low-pass filter which removes a high-frequency component.

Figure 8:
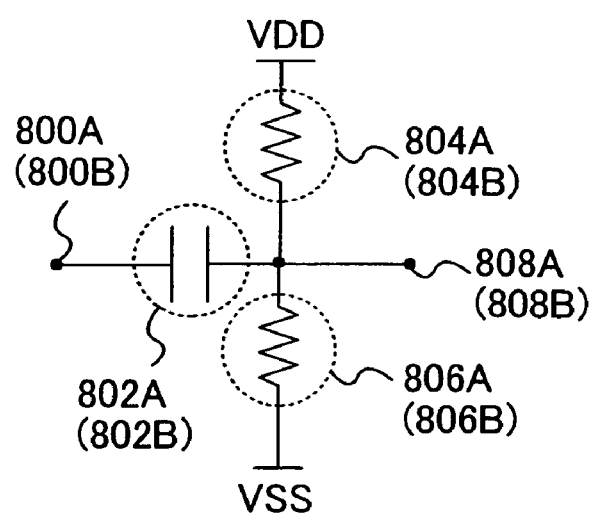
FIG. 8 is a diagram illustrating a semiconductor device of the present invention.

FIG. 8 illustrates an example of a configuration of the first bias circuit 158 and the second bias circuit 160. In a bias circuit illustrated in FIG. 8, an input portion 800 (the input portion 800 is hereinafter referred to as the input portion 800A and the input portion 800B in the first bias circuit and the second bias circuit, respectively) is connected to one end of a capacitor 802 (the capacitor 802 is hereinafter referred to as a capacitor 802A and a capacitor 802B in the first bias circuit and the second bias circuit, respectively). The other end of the capacitor 802 is connected to an output portion 808 (the output portion 808 is hereinafter referred to as the output portion 808A and the output portion 808B in the first bias circuit and the second bias circuit, respectively), and each of one ends of a first resistor 804 (the first resistor 804 is hereinafter referred to as a first resistor 804A and a first resistor 804B in the first bias circuit and the second bias circuit, respectively) and a second resistor 806 (the second resistor 806 is hereinafter referred to as a second resistor 806A and a second resistor 806B in the first bias circuit and the second bias circuit, respectively). The other end of the first resistor 804 is connected to a power supply potential ($V_{DD}$), and the other end of the second resistor 806 is connected to a reference potential ($V_{SS}$).

The capacitor 802 is provided to isolate the input portion 800 galvanically from the power supply potential to which the first resistor 804 is connected.

The first resistor 804 and the second resistor 806 are provided to generate a difference between potentials of signals which are inputted into the first input portion 900A and the second input portion 900B included in the comparator 162. It is preferable that resistance $R_{1A}$ of the first resistor 804A, resistance $R_{1B}$ of the first resistor 804B, resistance $R_{2A}$ of the second resistor 806A, and resistance $R_{2B}$ of the second resistor 806B be $R_{1A}=R_{2B}\neq R_{1B}=R_{2A}$.

Malfunction in the comparator 162 can be prevented by inclusion of the first bias circuit 158 and the second bias circuit 160.

Figure 9A:
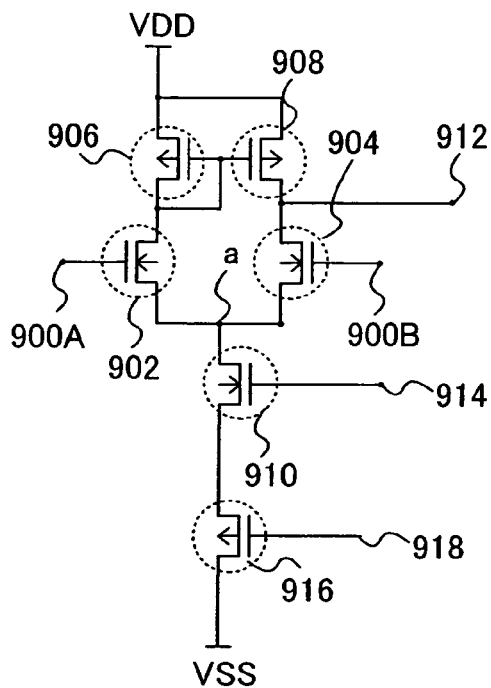
FIGS. 9A to 9C are diagrams each illustrating a semiconductor device of the present invention.
Figure 9B:
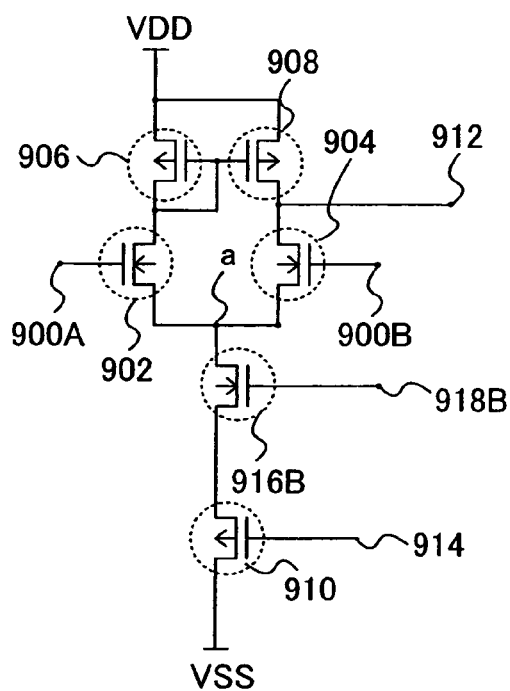
Figure 9C:
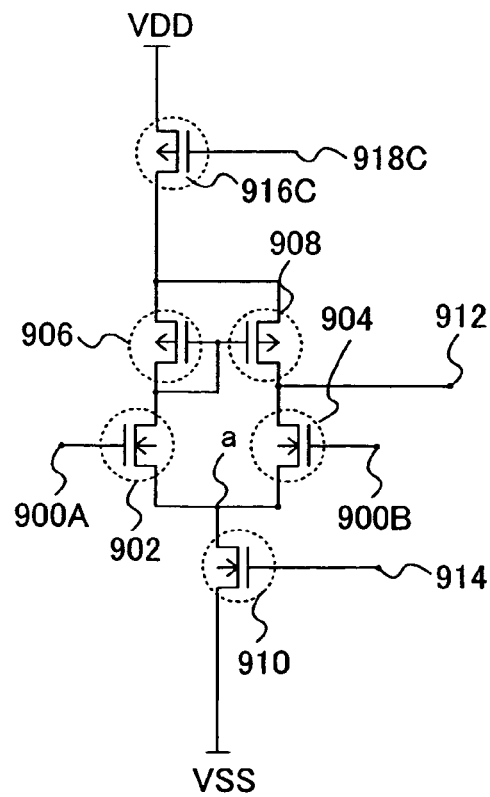

FIGS. 9A to 9C each illustrate an example of a configuration of the comparator 162. The comparator 162 includes two input portions such as a differential circuit, a differential amplifier, or an operational amplifier, and a circuit having a function to compare two signals inputted into the input portions can be used. The comparator 162 includes the first input portion 900A, the second input portion 900B, a first TFT 902 to a fifth TFT 910, and an output portion 912. In the comparator 162, the first input portion 900A is connected to the output portion 808A of the first bias circuit 158, and the second input portion 900B is connected to the output portion 808B of the second bias circuit 160. The first input portion 900A is connected to a gate electrode of the first TFT 902, and the second input portion 900B is connected to a gate electrode of the second TFT 904. One of a source electrode and a drain electrode of the first TFT 902 is connected to one of a source electrode and a drain electrode of the fifth TFT 910 and one of a source electrode and a drain electrode of the second TFT 904. The other of the source electrode and drain electrode of the first TFT 902 is connected to one of a source electrode and a drain electrode of the third TFT 906, a gate electrode of the third TFT 906, and a gate electrode of the fourth TFT 908. The other of the source electrode and drain electrode of the third TFT 906 is connected to a power supply potential ($V_{DD}$). One of a source electrode and a drain electrode of the fourth TFT 908 is connected to the power supply potential ($V_{DD}$). The other of the source electrode and drain electrode of the fourth TFT 908 is connected to the output portion 912 and the other of the source electrode and drain electrode of the second TFT 904. A gate electrode of the fifth TFT 910 is connected to a constant current circuit 1003 through a wiring 914. The other of the source electrode and drain electrode of the fifth TFT 910 is connected to a reference potential ($V_{SS}$). Note that the wiring 914 is connected to the constant current circuit 1003. In FIG. 9A, a sixth TFT 916 is constantly turned on or not provided.

Operation when a signal is inputted into the first input portion 900A and the second input portion 900B of the comparator 162 is described.

A current which flows through the fifth TFT 910 which is a constant current source of the comparator 162 is set $I_d$. Here, since the third TFT 906 and the fourth TFT 908 form a current mirror circuit, a current of $I_d/2$ flows between the source electrode and the drain electrode of each of the third TFT 906 and the fourth TFT 908. In addition, a potential of each of points a illustrated in FIGS. 9A to 9C is set $V_5$.

Here, the case where a different potential is applied to two TFTs which form a differential pair is described. First, the case where a potential of the first input portion 900A is higher than a potential of the second input portion 900B is considered. A current which flows through the first TFT 902 and the second TFT 904 is expressed in the following formula (1). Here, $V_{gs}$ is a gate voltage; $V_{ds}$, a drain voltage; $V_{th}$, a threshold voltage; k, a transconductance coefficient; and λ, a channel length modulation coefficient.

$$I_{ds} = \frac{I_d}{2} = k(V_{gs} - V_{th})^2(1 + \lambda \cdot V_{ds}) \qquad \text{[FORMULA 1]}$$

Since a potential of the first input portion 900A is higher than a potential of the second input portion 900B in the formula (1), the following relation is formed between $V_{gs}$ (902) which is the gate voltage of the first TFT 902 and $V_{gs}$ (904) which is the gate voltage of the second TFT 904: $V_{gs}$ (902)>$V_{gs}$ (904). The transconductance coefficient k is a value unique (a constant) to a TFT which is determined by a carrier mobility, a capacitance of a gate insulating film, a channel width, and a channel length of each of the TFTs, and the channel length modulation coefficient λ is a constant which is determined by manufacturing processes of each of the TFTs. Therefore, when the transconductance coefficients k and the channel length modulation coefficients λ of the first TFT 902 and the second TFT 904 are equivalent, the following relation is formed between the drain voltage $V_{ds}$ of the first TFT 902 and the drain voltage $V_{ds}$ of the second TFT 904: $V_{ds}$ (902)<$V_{ds}$ (904). Next, when the case where a potential of the first input portion 900A is lower than a potential of the second input portion 900B is considered similarly to the above, the following relation is formed between the drain voltage $V_{ds}$ of the first TFT 902 and the drain voltage $V_{ds}$ of the second TFT 904: $V_{ds}$ (902)>$V_{ds}$ (904).

As described above, the voltage of the output portion 912 fluctuates depending on the magnitude relation of potentials of the first input portion 900A and the second input portion 900B.

Figure 10A:
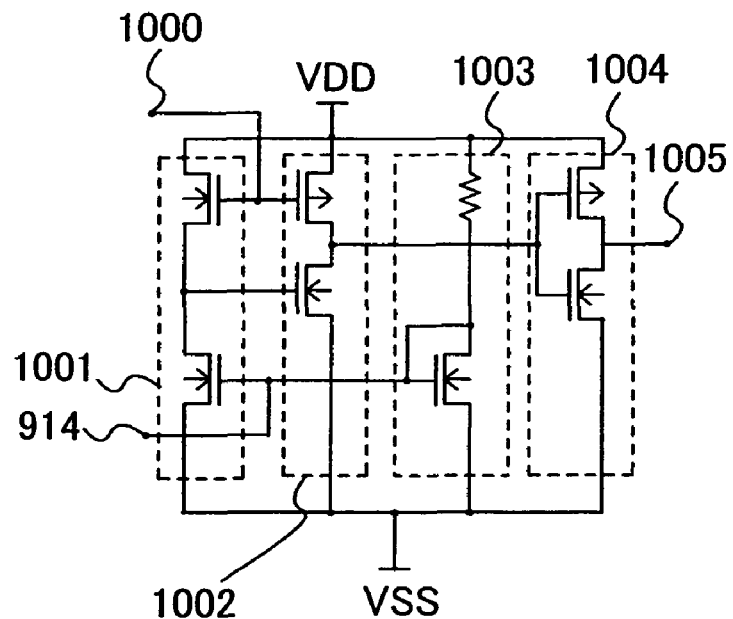
FIGS. 10A and 10B are diagrams each illustrating a semiconductor device of the present invention.
Figure 10B:
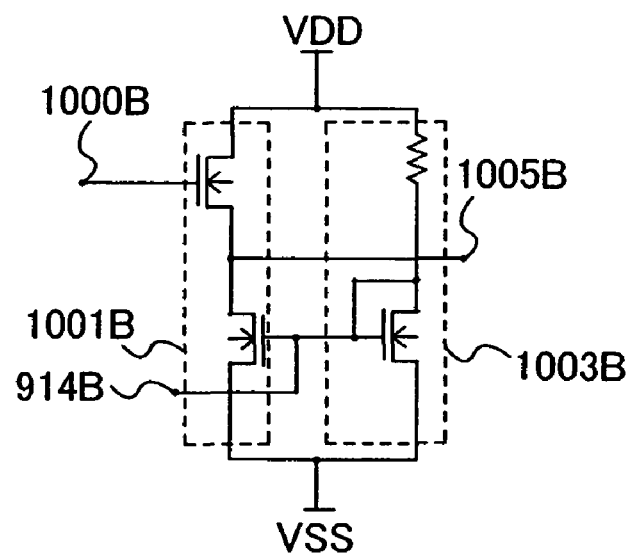

Next, FIGS. 10A and 10B each illustrate an example of a circuit configuration of the analog buffer circuit 164. An analog buffer circuit of FIG. 10A includes an input portion 1000, a wiring 914, a source follower circuit 1001, an inverter circuit 1002, the constant current circuit 1003, an inverter circuit 1004, and an output portion 1005. The wiring 914 is connected to the gate electrode of the fifth TFT 910 illustrated in each of FIGS. 9A to 9C. The output portion 1005 is connected to the output portion 166 of the demodulation signal generation circuit 150.

An analog buffer circuit of FIG. 10B includes an input portion 1000B, a wiring 914B, a source follower circuit 1001B, a constant current circuit 1003B, and an output portion 1005B. The wiring 914B is connected to the gate electrode of the fifth TFT 910 illustrated in each of FIGS. 9A to 9C. The output portion 1005B is connected to the output portion 166 of the demodulation signal generation circuit 150.

Noise can be removed more effectively and a demodulation signal can be generated stably by provision of such an analog buffer circuit 164 as illustrated in FIG. 10A or 10B.

A demodulated signal is inputted into the digital circuit 106, individual identification information or the like stored in the memory circuit 108 by the digital circuit 106 is extracted, and the extracted information is encoded in the digital circuit 106 and inputted into the modulation circuit 114. The modulation circuit 114 performs modulation in accordance with the inputted signal, and transmits information from the antenna circuit 102 to the reader/writer 116. The information received in the reader/writer 116 is transmitted to the control device 120 through the communication line 118.

As described above, a modulation signal of which modulation factor is small is demodulated stably with the use of a semiconductor device of the present invention and thus information can be received. Specifically, the modulation signal can be demodulated by detection of a difference between a signal line and a reference line and data thereof can be extracted stably.

Further, noise of the signal line and noise of the reference line have the same phase. As to the demodulation method of the present invention, demodulation is performed by comparison of the signal line and the reference line; therefore, the noise of each line is canceled because of the same phase. Through the above reasons, the semiconductor device of the present invention can perform demodulation having less influence of noise due to a carrier wave.

Further, a wireless signal of which modulation factor is 10% can also be detected with the use of the present invention. Therefore, without passing through a period where power is not supplied, a signal based on a communication method which is standardized with ISO/EEC 15693 can be transmitted and received. Since supply of power from a power supply is not impeded while a wireless signal is received in the semiconductor device of the present invention, the semiconductor device can operate stably.

Embodiment Mode 2

This embodiment mode will describe an example of a structure of a semiconductor device of the present invention which includes a demodulation signal generation circuit in a mode which is different from Embodiment Mode 1 with reference to the drawings. This embodiment mode will specifically describe a semiconductor device, in the case where a plurality of demodulation signal generation circuits are included, and one demodulation signal generation circuit is selected from the plurality of demodulation signal generation circuits by a selective circuit at the time of operation.

FIG. 31 illustrates a semiconductor device 1500 to which the present invention is applied. In FIG. 31, the semiconductor device 1500 includes an antenna circuit 102 which receives a radio wave, an analog circuit 130 which generates power from a power supply, from a signal received in the antenna circuit 102, and demodulates the signal, a digital circuit 106 which controls other circuit portions, and a memory circuit 108 which writes/reads data depending on output from the digital circuit 106.

Note that the semiconductor device 1500 is not limited to the above structure, and a central processor unit (hereinafter referred to as a CPU), a sensor element, an interface circuit, or the like may be included.

A semiconductor device capable of wireless communication is roughly classified into an active type which incorporates a power supply (a power storage portion) and a passive type which drives by utilization of power of a radio wave (or an electromagnetic wave) from external. Further, there is a type referred to as semi-active which charges a power supply (a power storage portion) by utilization of power of a radio wave (or an electromagnetic wave) from external. This embodiment mode describes the case where the semiconductor device 1500 is the passive type in which an electromagnetic wave is received from a reader/writer 110 and power of the electromagnetic wave is supplied to drive the semiconductor device; however, the present invention is not limited thereto. That is, the semiconductor device 1500 may be the active type.

In the electromagnetic wave transmitted from the reader/writer 110, a carrier wave having a certain frequency is modulated from a sub-carrier wave. A signal included in the sub-carrier wave is a binarized digital signal which is transmitted to the semiconductor device 1500 from the reader/writer 110. As to a modulation method of a carrier wave, there are an amplitude shift keying (ASK) modulation method which changes amplitude, a frequency shift keying (FSK) modulation method which changes a frequency, and a phase shift keying (PSK) modulation method which changes a phase. This embodiment mode describes the case in which an electromagnetic wave modulated by the ASK modulation method is demodulated.

The antenna circuit 102 includes an antenna and a capacitor. The antenna circuit 102 receives a radio wave (an electromagnetic wave) which is transmitted from the reader/writer 110, and inputs the signal obtained at this time into each of a power supply circuit 200, a first demodulation signal generation circuit 201, and a second demodulation signal generation circuit 202 included in the analog circuit 130. Further, the antenna circuit 102 receives a signal of which carrier wave is modulated from the analog circuit 130, and transmits a response signal to the reader/writer 110.

The shape of the antenna that can be used for the present invention is not particularly limited. Therefore, a signal transmission method applied to the antenna circuit 102 included in the semiconductor device 1500 can be an electromagnetic coupling method, an electromagnetic induction method, a radio wave method, or the like. The transmission method may be selected as appropriate by a practitioner in consideration of the intended use of the device. Thus, an antenna with an optimum length and shape may be provided in accordance with the transmission method.

In the case of applying an electromagnetic coupling method or an electromagnetic induction method (for example, a 13.56 MHz band) as the transmission method, a conductive film which functions as an antenna is formed in an annular form (for example, a loop antenna) or a helical form (for example, a spiral antenna) in order to utilize electromagnetic induction that occurs with changes in magnetic density.

In the case of using a microwave method (for example, UHF band (860 to 960 MHz), 2.45 GHz band, or the like) which is one kind of radio wave methods as the transmission method, the length and shape of the conductive film which functions as an antenna may be determined as appropriate in consideration of the wavelength of radio waves used for the signal transmission. For example, the conductive film which functions as an antenna may be formed in a linear form (for example, a dipole antenna), a flat form (for example, a patch antenna), or the like. Further, the shape of the conductive film which functions as an antenna is not limited to the linear form, and the conductive film may be provided in a curved form, a serpentine form, or a form combining them in consideration of the wavelength of the electromagnetic waves.

FIGS. 12A to 12E each illustrate an example of the shape of the antenna provided in the antenna circuit 102. For example, as illustrated in FIG. 12A, a layout may be used in which an antenna 1201 is disposed all around a chip 1200 provided with a signal processing circuit. Alternatively, as illustrated in FIG. 12B, a layout may be used in which a chip 1202 provided with a signal processing circuit is coiled around by a thin antenna 1203. Further, as illustrated in FIG. 12C, a layout may be used in which an antenna of which shape is like that of an antenna 1205 for receiving high-frequency electromagnetic waves is disposed for a chip 1204 provided with a signal processing circuit. Alternatively, as illustrated in FIG. 12D, a layout may be used in which an antenna of which shape is like that of an antenna 1207 which is 180-degree omnidirectional (such that it can receive signals equally from any direction) is disposed for a chip 1206 provided with a signal processing circuit. As a further alternative, as illustrated in FIG. 12E, a layout may be used in which an antenna of which shape is like that of an antenna 1209 with a long rod shape is disposed for a chip 1208 provided with a signal processing circuit. The antenna circuit 102 may be formed by combination of the antennas with the above shapes.

In FIGS. 12A to 12E, a connection method between the chip 1200 or the like provided with a signal processing circuit and the antenna 1201 or the like is not particularly limited. By giving FIG. 12A as an example, the antenna 1201 and the chip 1200 provided with a signal processing circuit are connected to each other by wire bonding or bump bonding. Alternatively, part of the chip may be used as an electrode to be attached to the antenna 1201. With this method, the chip 1200 can be attached to the antenna 1201 with the use of an anisotropic conductive film (hereinafter referred to as ACF). Further, an appropriate length of the antenna differs depending on the frequency of a signal to receive. In general, in the case where, for example, a frequency of 2.45 GHz is used, the length of the antenna may be approximately 60 nm (a half of the wavelength) or approximately 30 mm (a quarter of the wavelength).

The analog circuit 130 is described with reference to FIG. 1. The analog circuit 130 includes the power supply circuit 200, the first demodulation signal generation circuit 201, the second demodulation signal generation circuit 202, a modulation circuit 204, an input/output portion 206, a first output portion 208, a second output portion 210, a third output portion 212, a fourth output portion 214, a first input portion 216, and a second input portion 218. The analog circuit 130 generates a power supply voltage, a first demodulation signal, a second demodulation signal, and a reset signal from an output signal of the antenna circuit 102. The input/output portion 206 is connected to the antenna circuit 102, and receives and transmits a carrier wave. The first output portion 208 is connected to all the circuit blocks, and supplies the power supply voltages thereto. The second output portion 210 is connected to all the circuit blocks, and supplies the reset signals thereto. The third output portion 212 is connected to a selective circuit in the digital circuit 106, and outputs the first demodulation signal. The fourth output portion 214 is connected to the selective circuit in the digital circuit 106, and outputs the second demodulation signal. The first input portion 216 is connected to the selective circuit in the digital circuit 106, and inputs a control signal of a comparator 510 into the selective circuit. The second input portion 218 is connected to the digital circuit 106, and inputs thereinto a response data signal which is modulated by the modulation circuit 204. The first demodulation signal generation circuit 201 demodulates a carrier wave of which modulation factor is 100%, and the second demodulation signal generation circuit 202 demodulates a carrier wave of which modulation factor is 10%. Further, the second demodulation signal generation circuit 202 includes an input portion into which a signal outputted from the digital circuit 106 is inputted. Note that a regulator circuit, a limiter circuit, or the like may be added to a right place of the analog circuit 130 in order to stabilize the operation of the semiconductor device 1500.

The power supply circuit 200 is described with reference to FIG. 3. The power supply circuit 200 includes a first capacitor 300, a rectification portion 302 provided with two diodes, a smoothing capacitor 304, and a delay circuit 306 provided with one resistor and one capacitor. The power supply circuit 200 smoothes the output signal from the antenna circuit 102 and generates the power supply voltage and the reset signal of the digital circuit. The power supply voltage is adjusted so as to have a stable potential having a certain potential difference from a reference potential (a potential of a reference line).

The first demodulation signal generation circuit 201 demodulates data included in an induced voltage which is generated in the antenna circuit 102. The second demodulation signal generation circuit 202 demodulates data included in the induced voltage which is generated in the antenna circuit 102.

The carrier wave which is transmitted from the reader/writer 110 is modulated by the modulation circuit 204 in accordance with the output from the digital circuit 106, and transmitted to the antenna circuit 102.

First, the digital circuit 106 receives the power supply voltage, the two systems of the demodulation signals, and the reset signals which are supplied from the analog circuit 130, and selects the first demodulation signal or the second demodulation signal depending on the condition of the waveform of the first demodulation signal, whereby the demodulation signal generation circuit to use is determined. Next, in the digital circuit 106, the selected signals are transmitted to other digital circuits, and information on which signal is selected is fed back to the analog circuit 130. Further, an instruction which is given so as to operate the semiconductor device 1500 in accordance with the content of data of the selected demodulation signal is executed. For example, when the content of data of the selected demodulation signal is to "reply to the reader/writer 110 with data of the memory circuit 108", the data is obtained by accessing the memory circuit 108 and transmitted to the modulation circuit 204.

The memory circuit 108 stores at least specific data (individual identification information) of the semiconductor device 1500. The memory circuit 108 includes a control circuit, which performs writing or reading of data in accordance with the digital circuit 106, and a circuit having a memory element. The memory circuit 108 is similar to the memory circuit 108 in Embodiment Mode 1. As long as the memory content of the memory circuit 108 is specific data (individual identification information or the like) of the semiconductor device 1500, a nonvolatile memory which can store memory without being supplied with power is preferably used. On the other hand, as long as temporary memory used in processing performed by the semiconductor device 1500 is stored, a volatile memory may be used. Particularly in the case of a so-called passive type in which the semiconductor device 1500 has no battery, a nonvolatile memory is preferably used as the memory circuit 108. Further, in consideration of security, a non-rewritable memory is preferably used to store the specific data of the semiconductor device 1500.

Figure 4:
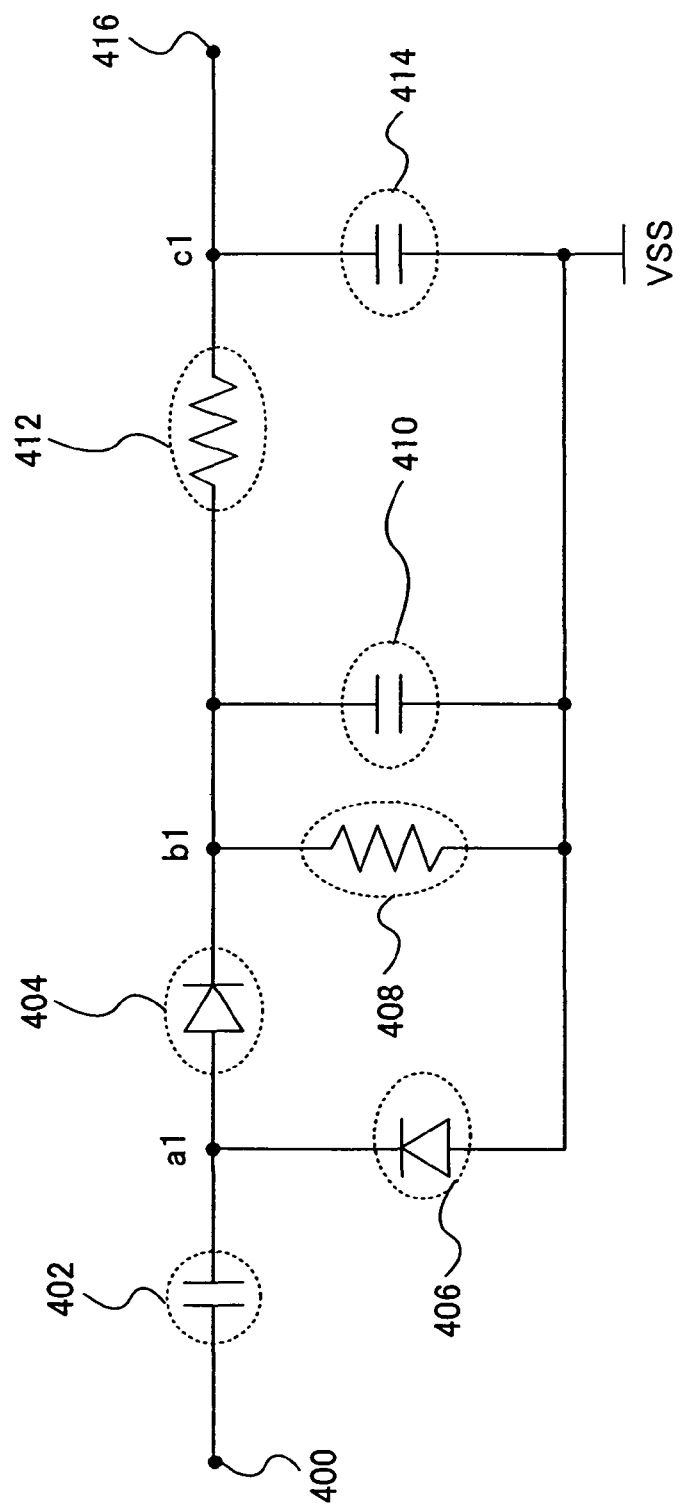
FIG. 4 is a diagram illustrating a semiconductor device of the present invention.

The first demodulation signal generation circuit 201 included in the semiconductor device 1500 of this embodiment mode is described with reference to FIG. 4. The first demodulation signal generation circuit 201 includes an input portion 400, an output portion 416, a first diode 404, a second diode 406, a first resistor 408, a second resistor 412, a first capacitor 402, a second capacitor 410, and a third capacitor 414. The input portion 400 is connected to one end of the first capacitor 402. The other end of the first capacitor 402 is connected to an anode of the first diode 404 and a cathode of the second diode 406. A cathode of the first diode 404 is connected to each of one ends of the first resistor 408, the second capacitor 410, and the second resistor 412. The other end of the second resistor 412 is connected to one end of the third capacitor 414 and the output portion 416. Further, an anode of the second diode 406, each of the other ends of the first resistor 408, the second capacitor 410, and the third capacitor 414 are connected to a reference potential ($V_{SS}$).

One configurational example of the second demodulation signal generation circuit 202 included in the semiconductor device 1500 of this embodiment mode is described with reference to FIGS. 5 and 6 (6C-1 to 6C-2). The second demodulation signal generation circuit 202 includes a first input portion 500, a second input portion 518, an output portion 514, a first demodulation circuit 502, a second demodulation circuit 504, a first bias circuit 506, a second bias circuit 508, and a comparator 510. Although these circuits provided in the second demodulation signal generation circuit 202 are described below, the present invention is not limited to the following description.

The input portion 500 of the second demodulation signal generation circuit 202 is connected to an input portion 600 of the first demodulation circuit 502 and an input portion 620 of the second demodulation circuit 504, and the second input portion 518 of the second demodulation signal generation circuit 202 is connected to an input portion 918 (see FIGS. 9A to 9C) of the comparator 510. An output portion 616 of the first demodulation circuit 502 is connected to an input portion 800A of the first bias circuit 506, and an output portion 636 of the second demodulation circuit 504 is connected to an input portion 800B of the second bias circuit 508. An output portion 808A of the first bias circuit 506 is connected to a first input portion 900A of the comparator 510, and an output portion 808B of the second bias circuit 508 is connected to a second input portion 900B of the comparator 510. An output portion 912 of the comparator 510 is connected to the output portion 514 of the second demodulation signal generation circuit 202.

Note that the first demodulation circuit and the second demodulation circuit included in the second demodulation signal generation circuit demodulate electric signals which have opposite polarities opposite to each other.

Figure 5:
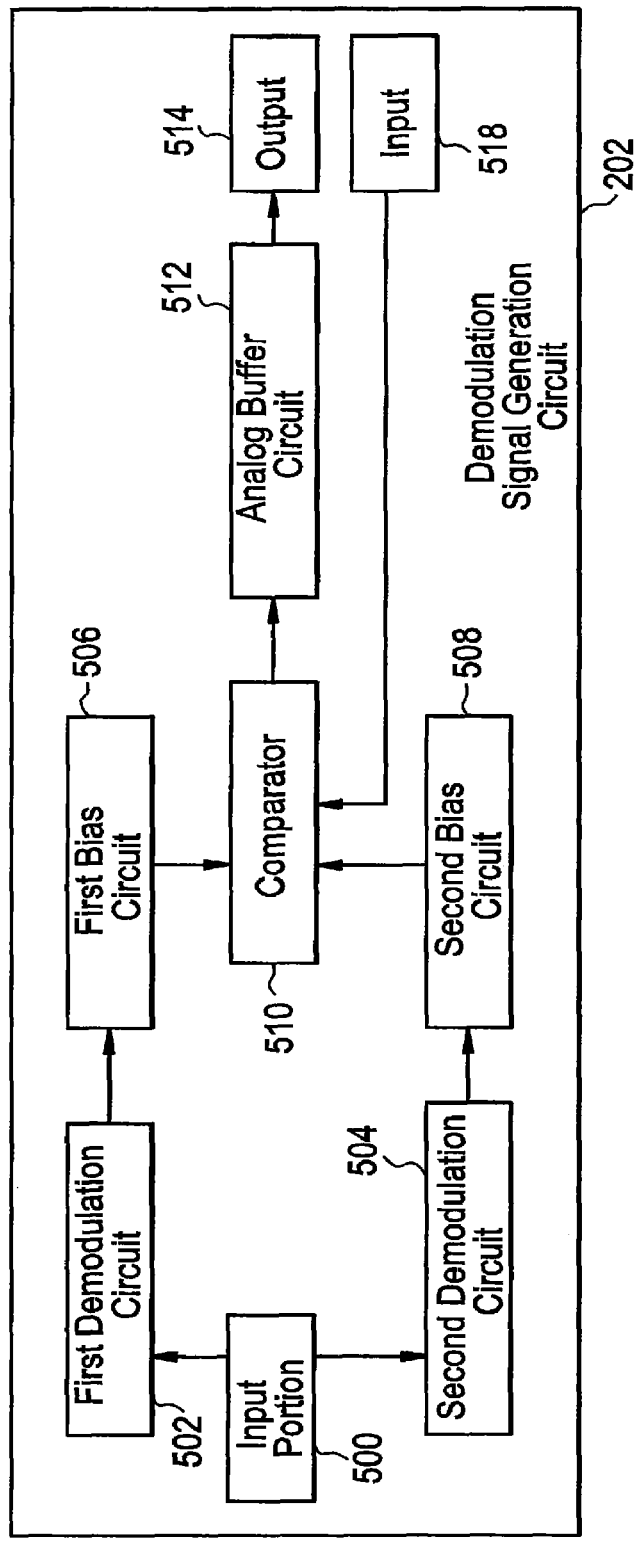
FIG. 5 is a diagram illustrating a semiconductor device of the present invention.

Note that the output portion 912 of the comparator 510 and the output portion 514 of the second demodulation signal generation circuit 202 are preferably connected to each other through an analog buffer circuit 512 as illustrated in FIG. 5. As the analog buffer circuit 512, a source follower circuit, a common source amplifier circuit, and the like can be given. Noise can be removed more effectively and a demodulation signal can be generated stably by provision of the analog buffer circuit 512.

FIGS. 6A to 6C (6C-1 to 6C-3) each illustrate an example of a configuration of a demodulation circuit which is used as each of the first demodulation circuit 502 and the second demodulation circuit 504. FIG. 6A illustrates the first demodulation circuit 502. The first demodulation circuit 502 includes an input portion 600, an output portion 616, a first diode 604, a second diode 606, a first resistor 608, a second resistor 612, a first capacitor 602, a second capacitor 610, and a third capacitor 614. The input portion 600 is connected to one end of the first capacitor 602. The other end of the first capacitor 602 is connected to an anode of the first diode 604 and a cathode of the second diode 606. A cathode of the first diode 604 is connected to each of one ends of the first resistor 608, the second capacitor 610, and the second resistor 612. The other end of the second resistor 612 is connected to one end of the third capacitor 614 and the output portion 616. Further, an anode of the second diode 606, each of the other ends of the first resistor 608, the second capacitor 610, and the third capacitor 614 are connected to a reference potential ($V_{SS}$).

FIG. 6B illustrates the second demodulation circuit 504. The demodulation circuit includes the input portion 620, the output portion 636, a first diode 624, a second diode 626, a first resistor 628, a second resistor 632, a first capacitor 622, a second capacitor 630, and a third capacitor 634. The input portion 620 is connected to one end of the first capacitor 622. The other end of the first capacitor 622 is connected to a cathode of the first diode 624 and an anode of the second diode 626. An anode of the first diode 624 is connected to each of one ends of the first resistor 628, the second capacitor 630, and the second resistor 632. The second resistor 632 is connected to one end of the third capacitor 634 and the output portion 636. Further, a cathode of the second diode 626, each of the other ends of the first resistor 628, the second capacitor 630, and the third capacitor 634 are connected to a reference potential ($V_{SS}$).

Each of the first diode 604, the second diode 606, the first diode 624, and the second diode 626 of FIGS. 6A and 6B may be formed of a diode-connected TFT. A diode illustrated in FIG. 6C-1 of, a diode-connected n-type TFT illustrated in FIG. 6C-2, and a diode-connected p-type TFT illustrated in FIG. 6C-3 are equivalent as a circuit. FIG. 7A (7A-1 and 7A-2) each illustrate an example in which a circuit 618, which is part of the first demodulation circuit 502, illustrated in FIG. 6A is formed using any of the TFTs illustrated in FIG. 6C (6C-1 to 6C-3). Similarly, FIG. 7B (7B-1 and 7B-2) each illustrate an example in which a circuit 638, which is part of the second demodulation circuit 504, illustrated in FIG. 6B is formed using any of the TFTs illustrated in FIG. 6C (6C-1 to 6C-3). In the circuit illustrated in FIG. 7A-1, n-type TFTs 700 and 702 are used as diode-connected TFTs. In the circuit illustrated in FIG. 7A-2, p-type TFTs 704 and 706 are used as diode-connected TFTs. In the circuit illustrated in FIG. 7B-1, n-type TFTs 708 and 710 are used as diode-connected TFTs. In the circuit illustrated in FIG. 7B-2, p-type TFTs 712 and 714 are used as diode-connected TFTs.

The first demodulation circuit 502 and the second demodulation circuit 504 may be formed by combination of the circuits illustrated in FIGS. 6A to 6C (6C-1 to 6C-3) and FIG. 7A (7A-1 and 7A-2) and 7B (7B-1 and 7B-2). The first demodulation circuit 502 having the circuit 618 illustrated in FIG. 7A-1 and the second demodulation circuit 504 having the circuit 638 illustrated in FIG. 7B-2 may be used, or the first demodulation circuit 502 having the circuit 618 illustrated in FIG. 7A-2 and the second demodulation circuit 504 having the circuit 638 illustrated in FIG. 7B-1 may be used. Alternatively, the first demodulation circuit 502 having the circuit 618 illustrated in FIG. 7A-2 and the second demodulation circuit 504 having the circuit 638 illustrated in FIG. 7B-2 may be used. Preferably, the circuit 618 illustrated in FIG. 7A-1 is used for the first demodulation circuit 502, and the circuit 638 illustrated in FIG. 7B-1 is used for the second demodulation circuit 504. In general, carriers of an n-type TFT have higher mobility than those of a p-type TFT. Therefore, n-type TFTs are used for all TFTs included in the first demodulation circuit and the second demodulation circuit, so that operation performance of the circuits can be improved.

The first capacitor 602 (or the first capacitor 622) illustrated in FIG. 6A compensates center of a wave amplitude (a reference line). The first resistor 608 (or the first resistor 628) makes constant current flowing through a point b1 (or a point b2). Further, the second capacitor 610 (or the second capacitor 630) is provided to smooth a waveform. The resistance of the first resistor 608 (or the first resistor 628) is adjusted as appropriate depending on the degree of electrostatic capacitance of the second capacitor 610 (or the second capacitor 630). When the resistance of the first resistor 608 (or the first resistor 628) is small, amplitude is reduced; and when the resistance is excessive, a breakdown phenomenon of the second diode 606 (or the second diode 626) occurs; thus, the semiconductor device does not operate normally. Furthermore, the second resistor 612 (or the second resistor 632) and the third capacitor 614 (or the third capacitor 634) function as a low-pass filter which removes a high-frequency component.

FIG. 8 illustrates an example of a configuration of the first bias circuit 506 and the second bias circuit 508. In a bias circuit illustrated in FIG. 8, an input portion 800 (the input portion 800 is hereinafter referred to as the input portion 800A and the input portion 800B in the first bias circuit and the second bias circuit, respectively) is connected to one end of a capacitor 802 (the capacitor 802 is hereinafter referred to as a capacitor 802A and a capacitor 802B in the first bias circuit and the second bias circuit, respectively). The other end of the capacitor 802 is connected to an output portion 808 (the output portion 808 is hereinafter referred to as the output portion 808A and the output portion 808B in the first bias circuit and the second bias circuit, respectively), and each of one ends of a first resistor 804 (the first resistor 804 is hereinafter referred to as a first resistor 804A and a first resistor 804B in the first bias circuit and the second bias circuit, respectively) and a second resistor 806 (the second resistor 806 is hereinafter referred to as a second resistor 806A and a second resistor 806B in the first bias circuit and the second bias circuit, respectively). The other end of the first resistor 804 is connected to a power supply potential ($V_{DD}$), and the other end of the second resistor 806 is connected to a reference potential ($V_{SS}$).

The capacitor 802 isolates the input portion 800 galvanically from the power supply potential to which the first resistor 804 is connected.

The first resistor 804 and the second resistor 806 are provided to generate a difference between potentials of signals which are inputted into the first input portion 900A and the second input portion 900B included in the comparator 510. Resistance $R_{1A}$ of the first resistor 804A, resistance $R_{1B}$ of the first resistor 804B, resistance $R_{2A}$ of the second resistor 806A, and resistance $R_{2B}$ of the second resistor 806B satisfy $R_{1A} \neq R_{2A}$ and $R_{1B} \neq R_{2B}$. Preferably, $R_{1A} = R_{2B}$ and $R_{1B} = R_{2A}$. Malfunction in the comparator 510, which results from noise, can be prevented when the comparator 510 has the first bias circuit 506 and the second bias circuit 508.

FIGS. 9A to 9C each illustrate an example of a configuration of the comparator 510. The comparator 510 includes a circuit having a function to compare two signals, for example, a differential circuit, a differential amplifier, or an operational amplifier, and a switch for stopping the operation (which is an operation to stop a current which flows to a reference potential from a power supply potential). The comparator 510 includes the first input portion 900A, the second input portion 900B, a third input portion 918, a first TFT 902 to a sixth TFT 916, and the output portion 912. In the comparator 510, the first input portion 900A is connected to the output portion 808A of the first bias circuit 506, and the second input portion 900B is connected to the output portion 808B of the second bias circuit 508. The first input portion 900A is connected to a gate electrode of the first TFT 902 (n-type), and the second input portion 900B is connected to a gate electrode of the second TFT 904 (n-type). One of a source electrode and a drain electrode of the first TFT 902 (n-type) is connected to one of a source electrode and a drain electrode of the fifth TFT 910 (n-type) and one of a source electrode and a drain electrode of the second TFT 904 (n-type). The other of the source electrode and drain electrode of the first TFT 902 (n-type) is connected to one of a source electrode and a drain electrode of the third TFT 906 (p-type), a gate electrode of the third TFT 906 (p-type), and a gate electrode of the fourth TFT 908 (p-type). The other of the source electrode and drain electrode of the third TFT 906 (p-type) is connected to the power supply potential ($V_{DD}$). One of a source electrode and a drain electrode of the fourth TFT 908 (p-type) is connected to the power supply potential ($V_{DD}$). The other of the source electrode and drain electrode of the fourth TFT 908 (p-type) is connected to the output portion 912 and the other of the source electrode and drain electrode of the second TFT 904 (n-type). A gate electrode of the fifth TFT 910 (n-type) is connected to a constant current circuit 1003 (see FIG. 10A) through a wiring 914. The other of the source electrode and drain electrode of the fifth TFT 910 (n-type) is connected to one of a source electrode and a drain electrode of a sixth TFT 916 (p-type). The other of the source electrode and drain electrode of the sixth TFT 916 (p-type) connected to a reference potential ($V_{SS}$). Note that the sixth TFT 916 (p-type) may be connected so that the sixth TFT 916 (p-type) at least controls a current which flow to the reference potential from the power supply potential. The sixth TFT 916 (p-type) may be disposed between the following: between a wiring of the power supply potential and a wiring connecting one of the source electrode and drain electrode of the third TFT 906 (p-type) and one of the source electrode and drain electrode of the fourth TFT 908 (p-type) (see a sixth TFT 916C of FIG. 9C); between the fifth TFT 910 (n-type) and a wiring of the reference potential (see the sixth TFT 916 of FIG. 9A); or between one of the source electrode and drain electrode of the fifth TFT 910 (n-type) and a wiring connecting one of the source electrode and drain electrode of the first TFT 902 (n-type) and one of the source electrode and drain electrode of the second TFT 904 (n-type) (see a sixth TFT 916B of FIG. 9B). A gate electrode of the sixth TFT 916 (p-type) is connected to the third input portion 918. The wiring 914 is connected to the constant current circuit 1003. Note that the configuration of the comparator 510 is not limited thereto.

Hereinafter, an operation of the comparator 510 is described. First, the case where the sixth TFT 916 (p-type) is turned on is described.

A current which flows through the fifth TFT 910 (n-type) which is a constant current source of the comparator 510 is set $I_d$. Here, since the third TFT 906 (p-type) and the fourth TFT 908 (p-type) form a current mirror circuit, a current of 1 d/2 flows between the source electrode and the drain electrode of each of the third TFT 906 (p-type) and the fourth TFT 908 (p-type). In addition, a potential of each of points a illustrated in FIGS. 9A to 9C is set $V_5$.

Here, the case where a different potential is applied to two TFTs which form a differential pair is described. First, the case where a potential of the first input portion 900A is higher than a potential of the second input portion 900B is considered. A current which flows through the first TFT 902 (n-type) and the second TFT 904 (n-type) is expressed in the following formula (1), where $V_{gs}$ is a gate voltage; $V_{ds}$, a drain voltage; $V_{th}$, a threshold voltage; k, a transconductance coefficient; and λ, a channel length modulation coefficient.

$$I_{ds} = \frac{I_d}{2} = k(V_{gs} - V_{th})^2(1 + \lambda \cdot V_{ds}) \quad \text{[FORMULA 1]}$$

Since a potential of the first input portion 900A is higher than a potential of the second input portion 900B in the formula (1), the following relation is formed between $V_{gs}$ (902) which is the gate voltage of the first TFT 902 and $V_{gs}$ (904) which is the gate voltage of the second TFT 904: $V_{gs}$ (902)>$V_{gs}$ (904). The transconductance coefficient λ is a value unique (a constant) to a TFT which is determined by a carrier mobility, a capacitance of a gate insulating film, a channel width, and a channel length of a channel formation region of each of the TFTs, and the channel length modulation coefficient λ is a constant which is determined by manufacturing processes of each of the TFTs. Therefore, when the transconductance coefficients k and the channel length modulation coefficients λ of the first TFT 902 (n-type) and the second TFT 904 (n-type) are equivalent, the following relation is formed between the drain voltage $V_{ds}$ of the first TFT 902 (n-type) and the drain voltage $V_{ds}$ of the second TFT 904 (n-type): $V_{ds}$ (902)<$V_{ds}$ (904). Next, when the case where a potential of the first input portion 900A is lower than a potential of the second input portion 900B is considered similarly to the above, the following relation is formed between the drain voltage $V_{ds}$ of the first TFT 902 (n-type) and the drain voltage $V_{ds}$ of the second TFT 904 (n-type): $V_{ds}$ (902)>$V_{ds}$ (904).

As described above, the voltage of the output portion 912 fluctuates depending on the magnitude relation of potentials of the input portion 900A and the input portion 900B.

Next, the case where the sixth TFT 916 (p-type) is turned off is described.

The sixth TFT 916 (p-type) is turned off; therefore, a point in which there is almost no carrier mobility of the power supply potential ($V_{DD}$) and the reference potential (VSS) generates in the comparator 510. Accordingly, this point (a node) comes to be in a floating potential, and the node which comes to be in a floating potential is affected by each parameter, manufacturing processes, or the like of a device.

Note that the comparator 510 is not limited to the above configuration, and any configuration may be employed as long as a function similar to the above can be obtained.

Next, FIGS. 10A and 10B each illustrate an example of a circuit configuration of the analog buffer circuit 512. The analog buffer circuit of FIG. 10A includes the input portion 1000, the wiring 914, the source follower circuit 1001, the inverter circuit 1002, the constant current circuit 1003, the inverter circuit 1004, and the output portion 1005. The wiring 914 is connected to the wiring 914 of the comparator 510. The output portion 1005 is connected to the output portion 514 of the second demodulation signal generation circuit 202.

An analog buffer circuit of FIG. 10B includes the input portion 1000B, the wiring 914B, the source follower circuit 1001B, the constant current circuit 1003B, and the output portion 1005B. The output portion 1005B is connected to the output portion 514 of the second demodulation signal generation circuit 202.

Noise can be removed more effectively and a demodulation signal can be generated stably by provision of such an analog buffer circuit 512 as illustrated in FIG. 10A or 10B.

The selective circuit which processes the first demodulation signal and the second demodulation signal is described with reference to FIG. 11. The selective circuit is part of the digital circuit; however, a clock is not needed. Hereinafter, an example of a structure of a circuit block and an operation thereof is described.

Figure 11:
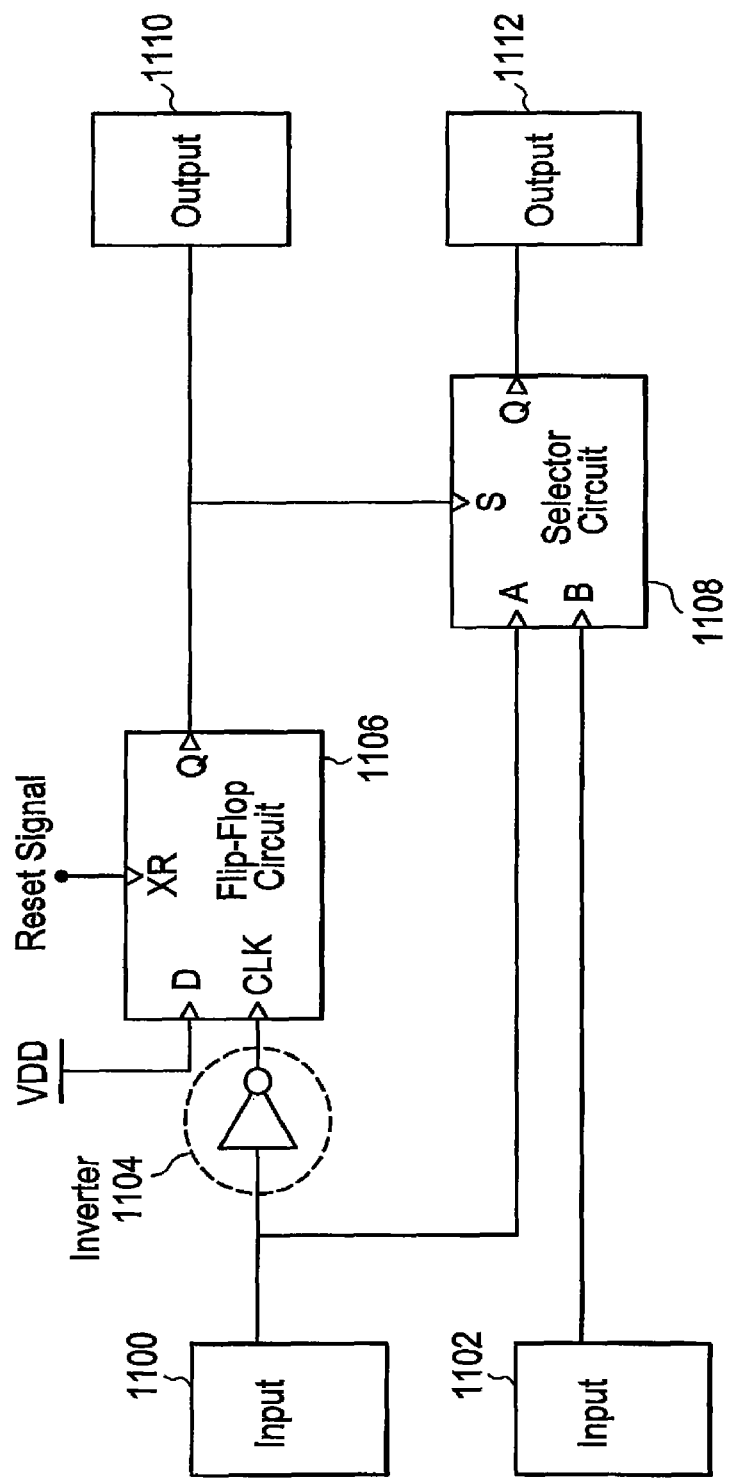
FIG. 11 is a diagram illustrating a semiconductor device of the present invention.

The selective circuit illustrated in FIG. 11 includes a first input portion 1100, a second input portion 1102, a first output portion 1110, a second output portion 1112, an inverter 1104, a flip-flop circuit 1106, and a selector circuit 1108. The first input portion 1100 is connected to an input portion of the inverter 1104 and an A terminal of the selector circuit 1108, and the second input portion 1102 is connected to a B terminal of the selector circuit 1108. Note that connections to the A and B terminals of the selector circuit 1108 are not limited thereto. The first input portion 1100 may be connected to the B terminal of the selector circuit 1108, and the second input portion 1102 may be connected to the input portion of the inverter 1104 and the A terminal of the selector circuit 1108. An output portion of the inverter 1104 is connected to a CLK terminal of the flip-flop circuit 1106, a power supply potential is connected to a D terminal thereof, and a reset signal is inputted into an XR terminal thereof. A Q terminal which is an output portion of the flip-flop circuit 1106 is connected to the first output portion 1110 and an S terminal of the selector circuit 1108. A Q terminal which is an output portion of the selector circuit 1108 is connected to the second output portion 1112.

Hereinafter, an operation of the selective circuit of FIG. 11 is described. "HIGH" in describing the operation represents a potential state the same as a power supply potential, and "LOW" represents a potential state the same as a reference potential. The selective circuit of FIG. 11 monitors a state of the first input portion 1100, selects one of signals in the two input portions from the result of the monitoring, outputs the selected signal to the second output portion 1112, and outputs information on which signal is selected to the first output portion 1110. The selected signal is outputted to other digital circuits from the second output portion 1112, and information on which signal is selected is fed back to the second demodulation signal generation circuit 202 of the analog circuit 130 from the first output portion 1110. A feedback signal is HIGH when the first demodulation signal is selected, and a feed back signal is LOW when the second demodulation signal is selected. Note that a relation between a feedback signal and the selected signal is not limited thereto. A feedback signal may be LOW when the first demodulation signal is selected, and a feedback signal may be HIGH when the second demodulation signal is selected.

Next, the inverter 1104 is described. When a signal changes from HIGH to LOW or from LOW to HIGH in the first input portion 1100 connected to the input portion of inverter 1104, an output of the inverter 1104 changes to an inverse state from a state just before the output (a signal changes from LOW to HIGH or from HIGH to LOW). On the other hand, when a signal maintains HIGH or LOW in the first input portion 1100 connected to the input portion of the inverter 1104, an output of the inverter 1104 maintains a state just before the output without being inverted (a signal maintains HIGH or LOW). By utilization of this property, a waveform state of the first input portion 1100 (whether or not the waveform is one of a signal which changes from HIGH to LOW or from LOW to HIGH in the inverter) is detected. Note that an element other than the inverter may be used as long as changes from HIGH to LOW or from LOW to HIGH of the signal in the input portion can be monitored.

Next, the flip-flop circuit 1106 is described. First, the output Q becomes LOW by the reset signal inputted into the XR terminal. Next, when the output of the inverter 1104 changes to HIGH from LOW (from HIGH to LOW depending on a circuit configuration), the flip-flop circuit 1106 transmits a power supply potential ($V_{DD}$, which is usually HIGH, and the same can be said for the following) connected to the D terminal to the output Q. On the other hand, an output of the flip-flop circuit 1106 maintains a state just before the output except when the output of the inverter 1104 changes to HIGH from LOW (from HIGH to LOW depending on a circuit configuration). That is, the power supply potential is outputted only when the output Q becomes LOW by the reset signal and the output of the inverter 1104 changes from LOW to HIGH (from HIGH to LOW depending on a circuit configuration).

Next, the selector circuit 1108 is described. The selector circuit selects the A terminal or the B terminal by a potential of the S terminal, and a potential of the selected terminal is outputted to a Y terminal. For example, in a configuration where a potential of the A terminal is outputted to the Y terminal when a potential of the S terminal is HIGH, a potential of the B terminal is outputted to the Y terminal if the S terminal is LOW. Here, the terminal A is selected when the S terminal is HIGH and the B terminal is selected when the S terminal is LOW; however, a relation between a potential of the S terminal and selection of the A terminal or the B terminal is not limited to the above and can be freely set.

The behaviors of the demodulation signals and signals lines in periphery thereof in the case of a carrier wave of which modulation factor is 100% and the case of a carrier wave of which modulation factor is 10% are each described.

In the case of the carrier wave of which modulation factor is 100%, a signal of which modulation factor is 100% is inputted from the antenna circuit 102 into the first demodulation signal generation circuit 201 and the second demodulation signal generation circuit 202 of the analog circuit 130. The first demodulation signal, which is an output signal from the first demodulation signal generation circuit 201, has a waveform that a signal in the inverter 1104 changes from HIGH to LOW or from LOW to HIGH. Consequently, the first demodulation signal is selected as a demodulation signal and outputted to other digital circuits. Further, the information is fed back to the second demodulation signal generation circuit 202, the operation of the comparator 510 is stopped, and waste of power is suppressed.

In the case of the carrier wave of which modulation factor is 10%, a signal of which modulation factor is 10% is inputted from the antenna circuit 102 into the first demodulation signal generation circuit 201 and the second demodulation signal generation circuit 202 of the analog circuit 130. The second demodulation signal, which is an output signal from the second demodulation signal generation circuit 202, has a waveform that a signal in the inverter 1104 maintains HIGH or LOW. Consequently, the second demodulation signal is selected as a demodulation signal and outputted to other digital circuits. Further, the information is fed back to the second demodulation signal generation circuit 202, and the comparator 510 is operated without being stopped.

According to one structural example described above, both the carrier wave of which modulation factor is 100% and the carrier wave of which modulation factor is 10% can be demodulated, and useless power consumption can be suppressed in the case of the carrier wave of which modulation factor is 100%.

As discussed above, in the case where the carrier wave of which modulation factor is 10% and the case where the carrier wave of which modulation factor is 100%, the demodulation signal generation circuit to use is switched and part of operation of the circuit which is not used is stopped, so that power consumption can be reduced.

In addition, a different demodulation signal generation circuit is used in each of the cases of the carrier wave of which modulation factor is 10% and the case of the carrier wave of which modulation factor is 100%. Therefore, as to a parameter of an element included in each of the demodulation signal generation circuits, it is not necessary to take into consideration even the case where a modulation factor is different; thus, flexibility in designing the semiconductor device is improved. Further, the semiconductor device is operated stably with ease.

A demodulation signal is monitored in the digital circuit only using the shape of a waveform of the first demodulation signal; therefore, the semiconductor of the present invention can be realized in a small circuit size.

Further, in the second demodulation signal generation circuit, the second demodulation signal is generated by detection of a difference between an output of the first bias circuit and an output of the second bias circuit in the second demodulation signal generation circuit, and a demodulation signal can be generated stably even with a signal of which modulation factor is small. Accordingly, information can be transmitted and received.

Noise that exists in each of the outputs of the first bias circuit and the second bias circuit has the same phase. In the present invention, the second demodulation signal is generated by comparison of the outputs of the first bias circuit and the second bias circuit. Therefore, the noise of each of the outputs is cancelled, and influence of noise, which results from a carrier wave, is reduced; thus, a signal can be demodulated. Consequently, as to a wireless signal of which modulation factor is 10%, the signal can be also detected stably. Therefore, signal transmission and reception which are based on ISO/IEC 15693 can be performed stably.

Further, in the semiconductor device of the present invention, power from a power supply is continuously supplied while a wireless signal is received; therefore, the semiconductor device can be operated stably.

Embodiment Mode 3

This embodiment mode will describe an example of a structure of a semiconductor device of the present invention which includes a demodulation signal generation circuit in a mode which is different from Embodiment Modes 1 and 2. Specifically, this embodiment mode will employ a structure in which the semiconductor device described in Embodiment Mode 2 is provided with a battery.

Figure 14:
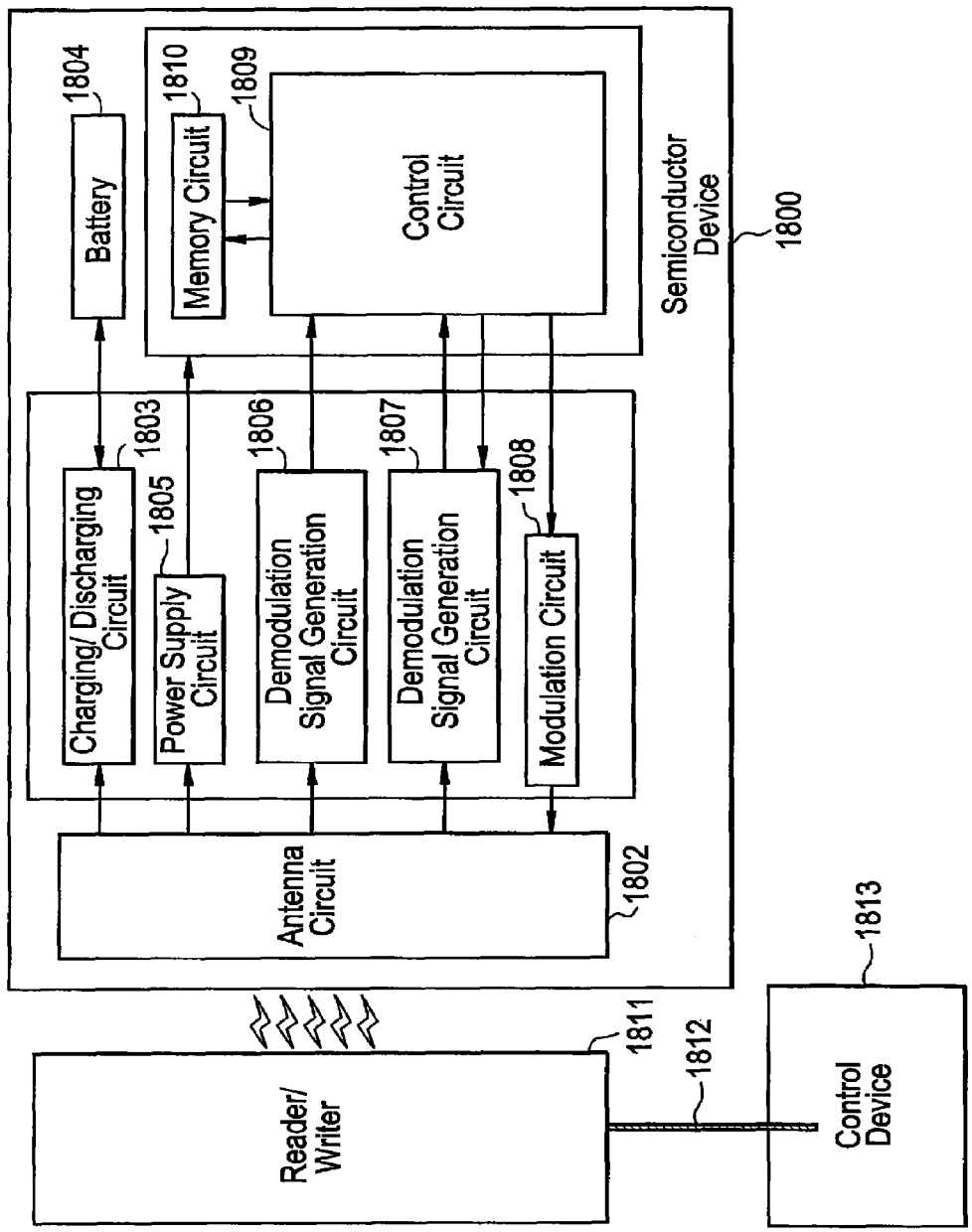
FIG. 14 is a diagram illustrating a semiconductor device of the present invention.

FIG. 14 illustrates a block diagram of a semiconductor device of this embodiment mode. A semiconductor device 1800 of this embodiment mode transmits and receives data wirelessly to and from a reader/writer 1811 by an electromagnetic wave. The reader/writer 1811 is preferably connected to a control device 1813 through a communication line 1812. The control device 1813 controls communication between the reader/writer 1811 and the semiconductor device 1800.

Further, the semiconductor device 1800 is wirelessly supplied with power from the reader/writer 1811.

The semiconductor device 1800 includes an antenna circuit 1802, a charging/discharging circuit 1803, a battery 1804, a power supply circuit 1805, a first demodulation signal generation circuit 1806, a second demodulation signal generation circuit 1807, a modulation circuit 1808, a control circuit 1809, and a storage circuit 1810. Alternatively, the semiconductor device 1800 does not include an antenna but does include a wiring used to connect to an external antenna. The wiring and the external antenna may be connected with each other. In this case, the antenna which is separately manufactured is connected to the wiring. A connection terminal (a terminal electrode) which is electrically connected to the wiring may be used to connect the wiring and the antenna. Further, the semiconductor device 1800 is not limited to the above structure, and may include a clock generation circuit, a central processor unit (hereinafter referred to as a CPU), or the like.

Note that the clock generation circuit refers to a circuit which generates and supplies to each circuit a clock signal having a frequency necessary for operations of the control circuit 1809, the memory circuit 1810, and the like based on an AC induced voltage which is generated in the antenna circuit 1802. An oscillation circuit or a frequency division circuit may be used for the clock generation circuit.

The antenna circuit 1802 preferably having an antenna and a rectifier circuit, receives an electromagnetic wave, which is transmitted from the reader/writer 1811, and generates an AC induced voltage. The induced voltage becomes power from a power supply of the semiconductor device 1800 and also includes data transmitted from the reader/writer 1811.

The shape of the antenna that can be used for the present invention is not particularly limited. Therefore, a signal transmission method applied to the antenna circuit 1802 included in the semiconductor device 1800 can be an electromagnetic coupling method, an electromagnetic induction method, a radio wave method, or the like. The transmission method may be selected as appropriate by a practitioner in consideration of the intended use of the device. Thus, an antenna with an optimum length and shape may be provided in accordance with the transmission method. In the present invention, an electromagnetic induction method having a communication frequency of 13.56 MHz is preferably used as the signal transmission method.

In the case of applying an electromagnetic coupling method or an electromagnetic induction method (for example, a 13.56 MHz band) as the transmission method, a conductive film which functions as the antenna is formed in an annular form (for example, a loop antenna) or a helical form (for example, a spiral antenna) in order to utilize electromagnetic induction that occurs with changes in magnetic density.

In the case of using a microwave method (for example, UHF band (860 to 960 MHz), 2.45 GHz band, or the like) which is one kind of radio wave methods as the transmission method, the length and shape of the conductive film which functions as the antenna may be determined as appropriate in consideration of the wavelength of radio waves used for the signal transmission. For example, the conductive film which functions as the antenna may be formed in a linear form (for example, a dipole antenna), a flat form (for example, a patch antenna), or the like. Further, the shape of the conductive film which functions as the antenna is not limited to the linear form, and the conductive film may be provided in a curved form, a serpentine form, or a form combining them in consideration of the wavelength of the electromagnetic waves.

Note that the shape and the connection method of the antenna provided for the antenna circuit 1802 are similar to those of the antenna included in the semiconductor device 1500 of Embodiment Mode 1 which is illustrated in FIG. 8.

The power supply circuit 1805 rectifies the induced voltage, which is generated in the antenna circuit 1802, by a diode or the like, and stabilizes the induced voltage with the use of a capacitor, thereby adjusting so as to maintain a stable potential having a certain potential difference from a reference potential (a potential of a reference line).

The control circuit 1809 selects a first demodulation signal or a second demodulation signal, and data for controlling the second demodulation signal generation circuit 1807 is outputted when the first demodulation signal is selected. Further, the control circuit 1809 performs the following operations based on the selected demodulated signal: analyzing instructions; controlling the memory circuit 1810; outputting data for external transmission to the modulation circuit 1808; and the like. The control circuit 1809 may include a decoding circuit, an information judging circuit, or the like, in addition to a generation circuit of a memory control signal. Further, the control circuit 1809 may include a circuit which converts part or all of data extracted from the memory circuit 1810, which is transmitted from the semiconductor device 1800 to the reader/writer 1811, into an encoded signal.

The memory circuit 1810 stores at least specific data (individual identification information) of the semiconductor device 1800. The memory circuit 108 includes a control circuit, which performs writing or reading of data in accordance with the control circuit 1809, and a circuit having a memory element. The memory circuit 1810 includes one or more of an organic memory, a dynamic random access memory (DRAM), a static random access memory (SRAM), a ferroelectric random access memory (FeRAM), a mask read-only memory (ROM), a programmable read only memory (PROM), an electrically programmable read only memory (EPROM), an electrically erasable programmable read only memory (EEPROM), and a flash memory. As long as the memory content of the memory circuit 1810 is specific data (individual identification information or the like) of the semiconductor device 1800, a nonvolatile memory which can store memory without being supplied with power is preferably used. On the other hand, as long as temporary memory is used in processing performed by the semiconductor device 1800 is stored, a volatile memory may be used. Particularly in the case of a so-called passive type in which the semiconductor device 1800 has no battery, a nonvolatile memory is preferably used as the memory circuit 1810.

The organic memory has a structure in which a layer containing an organic compound is sandwiched between a pair of conductive layers, which has at least two advantages because the structure is simple. One advantage is that a manufacturing process can be simplified and that the cost can be reduced. The other advantage is that it is easy to reduce the area of the memory circuit and increase in capacitor can be realized easily. Therefore, it is preferable to use the organic memory for the memory circuit 1810.

The modulation circuit 1808 transmits load modulation to the antenna circuit 1802 based on a signal from the control circuit 1809.

The first demodulation signal generation circuit 1806 and the second demodulation signal generation circuit 1807 demodulate and extract data included in the induced voltage which is generated in the antenna circuit 1802.

In the semiconductor device of this embodiment mode, an electromagnetic wave from the reader/writer is received and power by the electromagnetic wave is supplied to drive the semiconductor device. Therefore, although a passive-type semiconductor device is described in this embodiment mode, the present invention is not limited thereto. As a structure in which a battery is contained inside the semiconductor device, power may be supplied from a battery to drive the semiconductor device.

The electromagnetic wave transmitted from the reader/writer is a carrier wave having a certain frequency which is modulated from a sub-carrier wave. A signal included in the sub-carrier wave is a binarized digital signal which is transmitted to the semiconductor device from the reader/writer. As to a modulation method of the carrier wave, there are an amplitude shift keying (ASK) modulation method which changes amplitude and a frequency shift keying (FSK) modulation method which changes a frequency. This embodiment mode describes the case in which an electromagnetic wave modulated by the ASK modulation method is demodulated.

The first demodulation signal generation circuit 1806 and the second demodulation signal generation circuit 1807 included in the semiconductor device 1800 of the present invention are similar to the first demodulation signal generation circuit 201 and the second demodulation signal generation circuit 202 included in the semiconductor device 100 which are described in Embodiment Mode 1. Therefore, the detailed descriptions are omitted in this embodiment mode.

Signals demodulated in the first demodulation signal generation circuit 1806 and the second demodulation signal generation circuit 1807 are inputted into the control circuit 1809, individual identification information or the like stored in the memory circuit 1810 by the control circuit 1809 is extracted, and the extracted information is encoded in the control circuit 1809 and inputted into the modulation circuit 1808. The modulation circuit 1808 performs modulation in accordance with the inputted signals, and transmits information from the antenna circuit 1802 to the reader/writer 1811. The information received in the reader/writer 1811 is transmitted to the control device 1813 through the communication line 1812.

The power supply circuit 1805 in FIG. 14 supplies power to each circuit included in the semiconductor device 1800. In addition, the battery 1804 is charged by an external wireless signal which is inputted from the antenna circuit 1802 through the rectifier circuit provided in the antenna circuit 1802, and each circuit can be supplied with power with which the battery 1804 is charged through the charging/discharging circuit 1803. By using the power with which the battery 1804 is charged, the power supply circuit 1805 can be supplied with power even when sufficient power cannot be obtained from the antenna circuit 1802 of the semiconductor device 1800 in the case where a communication distance is extended. Therefore, the semiconductor device 1800 can be operated. Accordingly, a semiconductor device of the present invention can be operated stably with certainty.

In addition, the antenna circuit 1802 may have a plurality of antennas. The antenna which is used to transmit and receive data to and from the reader/writer can be separately provided from an antenna which supplies power when the antenna circuit 1802 has a plurality of antennas. Further, a radio wave or the like which is transmitted from other than the reader/writer 1811 (other readers/writers) can be received when the antenna circuit 1802 has a plurality of antennas of which frequency bands to receive are each different from one another. Therefore, the radio wave can be efficiently utilized for power supply.

Note that a battery in this specification refers to a battery which can recover a continuous using time by charging. Note that a sheet-like battery is preferably used as the battery. For example, the battery can be made smaller with the use of a lithium battery, preferably a lithium polymer battery using a gel-like electrolyte, a lithium ion battery, or the like. Naturally, any battery can be used as the battery as long as it is a chargeable battery, and a battery which can be charged and discharged such as a nickel metal hydride battery or a nickel cadmium battery may be used, or a capacitor having high capacity or the like may be used.

As described above, a modulation signal of which modulation factor is small is demodulated stably with the use of a semiconductor device of the present invention and thus information can be received. Specifically, the modulation signal can be demodulated by detection of a difference between an output of a first bias circuit and an output of a second bias circuit and data thereof can be extracted.

Noise that exists in each of the outputs of the first bias circuit and the second bias circuit has the same phase. A demodulation method of the present invention is performed by comparison of the outputs of the first bias circuit and the second bias circuit. Therefore, the noise of each of the outputs is canceled because the noise has the same phase. From the above reasons, a semiconductor device of the present invention reduces influence of noise, which results from a carrier wave, so that the signal can be demodulated.

Further, a wireless signal of which modulation factor is 10% can also be detected with the use of the present invention. Therefore, without passing through a period where power is not supplied, a signal based on a communication method which is standardized with ISO/IEC 15693 can be transmitted and received. Since supply of power from a power supply is not impeded while a carrier wave of which modulation factor is 10% is received in the semiconductor device of the present invention, the semiconductor device can operate stably.

The semiconductor device of this embodiment mode includes a battery; therefore, shortage of power for transmitting and receiving individual information, due to deterioration of a battery over time, can be compensated. In particular, a semiconductor device of the present invention uses a comparator; therefore, provision of a battery is extremely effective as described in this embodiment mode because the comparator consumes high power.

The semiconductor device of this embodiment mode may include a plurality of antennas for wirelessly receiving power for the battery. Therefore, the battery for supplying power for driving the semiconductor device can be charged by an external electromagnetic wave, without directly connecting the semiconductor device to a charger. As a result, unlike a conventional active-type RFID tag, it is not necessary to check remaining capacity of a battery or change batteries, so that the semiconductor device can be continued to be used for long periods of time and over the long term. In addition, power for driving the semiconductor device is constantly stored in a battery, so that sufficient power for driving the semiconductor device can be obtained and a communication distance between a reader/writer and the semiconductor device can be increased.

Note that a battery is described as an example of a power storage portion in this embodiment mode; however, the semiconductor device can be formed using a capacitor instead of the battery. Although various capacitors can be used, a small and high-capacity double-layer electrolytic capacitor or a small and high-capacity stacked-layer ceramic capacitor is preferably used. Alternatively, both a battery and a capacitor may be provided as the power storage portion.

Note that this embodiment mode can be implemented in combination with other embodiment modes in this specification.

Embodiment Mode 4

This embodiment mode will describe an example of a manufacturing method of the semiconductor device described in Embodiment Mode 1 with reference to the drawings. This embodiment mode will describe a structure of the semiconductor device in which an antenna, a battery, and a signal processing circuit are formed over the same substrate with the use of a thin film transistor. Note that miniaturization can be achieved by formation of an antenna, a battery, and a signal processing circuit over one substrate. Further, this embodiment mode will describe an example in which a thin film secondary battery is used as the battery.

First, a separation layer 3403 is formed over one surface of a substrate 3401 with an insulating film 3402 interposed therebetween, and then an insulating film 3404 which functions as a base film and an amorphous semiconductor film 3405 (for example, a film containing amorphous silicon) are stacked thereover (see FIG. 15A). Note that the insulating film 3402, the separation layer 3403, the insulating film 3404, and the semiconductor film 3405 can be formed consecutively. Note that the separation layer 3403 is not necessarily formed when separation is not necessary.

The substrate 3401 is selected from a glass substrate, a quartz substrate, a metal substrate (for example, a stainless steel substrate), a ceramic substrate, a semiconductor substrate such as a silicon substrate, or the like. Alternatively, a substrate such as polyethylene terephthalate (PET), polyethylene naphthalate (PEN), polyether sulfone (PES), or acrylic, which is a plastic substrate, may be used. Note that the separation layer 3403 is provided over the entire surface of the substrate 3401 with the insulating film 3402 interposed therebetween in the step shown in FIG. 15A; however, a pattern may be formed by a photolithography method after the separation layer is provided over the entire surface of the substrate 3401.

The insulating films 3402 and 3404 are formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when each of the insulating films 3402 and 3404 is formed to have a two-layer structure, a silicon nitride oxide film may be formed as a first insulating film and a silicon oxynitride film may be formed as a second insulating film. Alternatively, a silicon nitride film may be formed as a first insulating film and a silicon oxide film may be formed as a second insulating film. The insulating film 3402 functions as a blocking layer which prevents an impurity element contained in the substrate 3401 from being mixed into the peeling layer 3403 or elements formed thereover. The insulating film 3404 functions as a blocking layer which prevents an impurity element contained in the substrate 3401 and the separation layer 3403 from being mixed into elements formed over the insulating film 3404. In this manner, providing the insulating films 3402 and 3404 which function as the blocking layers can prevent adverse effects on the elements formed over the separation layer 3403 or the insulating film 3404, which would otherwise be caused by an alkali metal such as sodium or an alkaline earth metal contained in the substrate 3401 or by the impurity element contained in the separation layer 3403. Note that the insulating films 3402 and 3404 may be omitted in such a case where quartz is used as the substrate 3401. This is because an alkaline metal and an alkaline earth metal are not contained in a quartz substrate.

The separation layer 3403 may be formed using a metal film, a stacked structure of a metal film and a metal oxide film, or the like. As a metal film, a single layer or stacked layers are formed using an element of tungsten, molybdenum, titanium, tantalum, niobium, nickel, cobalt, zirconium, zinc, ruthenium, rhodium, palladium, osmium, or iridium, or an alloy material or a compound material containing such an element as its main component. Further, such materials can be formed by a sputtering method, various CVD methods such as a plasma CVD method, or the like. A stacked structure or a metal film and a metal oxide film can be obtained by the steps of forming the above-described metal film, performing plasma treatment thereto under an oxygen atmosphere or an $N_2O$ atmosphere or performing heat treatment thereto under an oxygen atmosphere or an $N_2O$ atmosphere, and thereby forming oxide or oxynitride of the metal film on the metal film. For example, when a tungsten film is provided as a metal film by a sputtering method, a CVD method, or the like, a metal oxide film formed of tungsten oxide can be formed on the surface of the tungsten film by subjecting the tungsten film to plasma treatment. Besides, for example, after a metal film (for example, a tungsten film) is formed, an insulating film formed of silicon oxide ($SiO_2$) or the like may be formed over the metal film by a sputtering method, and also metal oxide (for example, a tungsten, tungsten oxide film over a tungsten film) may be formed over the metal film. Further, for example, high-density-plasma treatment may be performed as plasma treatment. Besides the metal oxide film, metal nitride or metal oxynitride may be formed. In this case, the metal film may be subjected to plasma treatment or heat treatment under a nitrogen atmosphere or an atmosphere containing a mixture of nitrogen and oxygen.

The amorphous semiconductor film 3405 is formed with a thickness greater than or equal to 10 nm and less than or equal to 200 nm (preferably greater than or equal to 30 nm and less than or equal to 150 nm) by a sputtering method, an LPCVD method, a plasma CVD method, or the like.

Next, the amorphous semiconductor film 3405 is crystallized by laser light irradiation. Note that the crystallization of the amorphous semiconductor film 3405 may be performed by a method combining any of laser light irradiation, a thermal crystallization method using a rapid thermal annealing (RTA) or an annealing furnace, or a thermal crystallization method using a metal element that promotes the crystallization. After that, the obtained crystalline semiconductor film is etched into desired shapes, whereby crystalline semiconductor films 3405a to 3405f are formed. Then, a gate insulating film 3406 is formed so as to cover the crystalline semiconductor films 3405a to 3405f (see FIG. 15B). Note that it is preferable to etch each end portion of the crystalline semiconductor films to have a tapered shape. This is because the gate insulating film can be formed favorably by having a tapered shape.

The gate insulating film 3406 is formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when the gate insulating film 3406 is formed to have a two-layer structure, a silicon oxynitride film may be formed as a first insulating film and a silicon nitride oxide film may be formed as a second insulating film. Alternatively, a silicon oxide film may be formed as a first insulating film and a silicon nitride film may be formed as a second insulating film.

An example of a manufacturing process of the crystalline semiconductor films 3405a to 3405f is briefly described below. First, an amorphous semiconductor film having a thickness of 50 to 60 nm is formed by a plasma CVD method. Then, a solution containing nickel which is a metal element for promoting crystallization is retained on the amorphous semiconductor film, which is followed by dehydrogenation treatment (at 500° C. for one hour) and thermal crystallization treatment (550° C. for four hours). Thus, a crystalline semiconductor film is formed. Then, the crystalline semiconductor film is irradiated with laser light by a photolithography method and etched, so that the crystalline semiconductor films 3405a to 3405f are formed. Note that crystallization of the amorphous semiconductor film may be performed only by laser light irradiation without performing thermal crystallization which uses a metal element that promotes crystallization.

As a laser oscillator used for crystallization, a continuous wave laser (a CW laser) or a pulsed laser can be used. As a laser that can be used here, a laser beam emitted from one or plurality of the following can be used: gas lasers such as an Ar laser, a Kr laser, and an excimer laser; a laser in which single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media of Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is performed with the fundamental wave of such a laser beam or the second to fourth harmonics of the fundamental wave, crystals with a large grain size can be obtained. For example, the second harmonic (532 nm) or the third harmonic (355 nm) of an Nd:YVO$_4$ laser (the fundamental wave of 1064 nm) can be used. In this case, a laser power density of approximately 0.01 to 100 MW/cm$^2$ (preferably greater than or equal to 0.1 MW/cm$^2$ and less than or equal to 10 MW/cm$^2$) is necessary, and irradiation is performed with a scanning speed of about 10 to 2000 cm/sec. Note that the laser in which single-crystalline YAG, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media of Nd, Yb, Cr, Ti, Ho, Er, Tm, and Ta as dopant; an Ar ion laser, or a Ti:sapphire laser can be used as a CW laser, whereas they can also be used as pulsed laser with a repetition rate greater than or equal to 10 MHz by being combined with a Q-switch operation, mode locking, or the like. When a laser beam with a repetition rate greater than or equal to 10 MHz is used, it is possible for a semiconductor film to be irradiated with the next pulse after during the period in which the semiconductor film is melted by the previous laser and solidified. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 3406 may be formed by oxidation or nitridation of the surfaces of the crystalline semiconductor films 3405a to 3405f by the above high-density-plasma treatment. For example, plasma treatment with a mixed gas of a rare gas such as He, Ar, Kr, or Xe, and oxygen, nitrogen oxide, ammonia, nitrogen, hydrogen, or the like is used. When plasma is excited by the introduction of microwaves, plasma with a low electron temperature and high electron density can be generated. With oxygen radicals (there is a case where OH radicals are included) or nitrogen radicals (there is a case where NH radicals are included) which are generated by the high-density plasma, the surfaces of the semiconductor films can be oxidized or nitrided.

By such high-density-plasma treatment, an insulating film with a thickness greater than or equal to 1 nm and less than or equal to 20 nm, typically greater than or equal to 5 nm and less than or equal to 10 nm, is formed over the semiconductor films. Since the reaction in this case is a solid-phase reaction, interface state density between the insulating film and the semiconductor films can be extremely lowered. Since such high-density-plasma treatment directly oxidizes (or nitrides) the semiconductor films (crystalline silicon or polycrystalline silicon), the insulating film can be formed to have a thickness with extremely little unevenness, which is ideal. In addition, since crystal grain boundaries of crystalline silicon are not strongly oxidized, an extremely preferable state is obtained. That is, by the solid-phase oxidation of the surfaces of the semiconductor films by high-density-plasma treatment which is described here, an insulating film with a uniform thickness and low interface state density can be formed without excessive oxidation reaction at the crystal grain boundaries.

As the gate insulating film 3406, only an insulating film formed by high-density-plasma treatment may be used, or a stacked layer which is obtained by deposition of an insulating film such as silicon oxide, silicon oxynitride, or silicon nitride on the insulating film by a CVD method using plasma or thermal reaction may be formed. In either case, a transistor which includes an insulating film formed by high-density-plasma treatment in part or the whole of the gate insulating film can reduce variation of characteristics.

Further, the crystalline semiconductor films 3405a to 3405f, which are obtained by scanning of the semiconductor film in one direction to crystallize the semiconductor film while irradiating a semiconductor film with a continuous wave laser beam or a laser beam oscillated with a repetition rate of 10 MHz or more, can grow their crystals in the laser beam scanning direction. A transistor is arranged so that its channel length direction (direction in which carriers move when a channel formation region is formed) is aligned with the scanning direction, and the above gate insulating film is combined with the crystalline semiconductor film, so that a thin film transistor with high electron field-effect mobility and few variations in characteristics can be obtained.

Next, a first conductive film and a second conductive film are stacked over the gate insulating film 3406. Here, the first conductive film is formed with a thickness greater than or equal to 20 nm and less than or equal to 100 nm by a CVD method, a sputtering method, or the like. The second conductive film is formed with a thickness greater than or equal to 100 nm and less than or equal to 400 nm. The first conductive film and the second conductive film are formed with an element of tantalum, tungsten, titanium, molybdenum, aluminum, copper, chromium, niobium, or the like, or an alloy material or a compound material containing such an element as its main component. Alternatively, the first conductive film and the second conductive film may be formed of a semiconductor material such as polycrystalline silicon imparting conductivity by being doped with an impurity element such as phosphorus. As a combination example of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after the first conductive film and the second conductive film are formed, thermal treatment can be applied thereto for the purpose of heat activation. In addition, in the case where a three-layer structure is employed instead of a two-layer structure, it is preferable to employ a stacked structure in which an aluminum film is interposed between molybdenum films.

Next, a resist mask is formed by a photolithography method, and etching treatment for forming gate electrodes and gate lines is performed. Thus, gate electrodes 3407 are formed over the crystalline semiconductor films 3405a to 3405f. Here, a stacked structure of a first conductive film 3407a and a second conductive film 3407b is shown as an example of the gate electrodes 3407.

Next, the crystalline semiconductor films 3405a, 3405b, 3405d, and 3405f are doped with an impurity element imparting n-type conductivity at a low concentration, using the gate electrodes 3407 as masks by an ion doping method or an ion implantation method. Then, a resist mask is selectively formed by a photolithography method, and the crystalline semiconductor films 3405c and 3405e are doped with an impurity element imparting p-type conductivity at high concentration. As an impurity element imparting n-type conductivity, phosphorus, arsenic, or the like can be used. As an impurity element imparting p-type conductivity, boron, aluminum, gallium, or the like can be used. Here, phosphorus is used as an impurity element imparting n-type conductivity and is selectively introduced into the crystalline semiconductor films 3405a, 3405b, 3405d, and 3405f so that phosphorus is contained at concentrations of $1\times10^{15}$ to $1\times10^{19}$/cm$^3$. Thus, impurity regions 3408 having n-type conductivity are formed. In addition, boron is used as an impurity element imparting p-type conductivity, and is selectively introduced into the crystalline semiconductor films 3405c and 3405e so as to be contained at concentrations of $1\times10^{19}$ to $1\times10^{20}$/cm$^3$. Thus, impurity regions 3409 having p-type conductivity are formed (see FIG. 15C).

Subsequently, an insulating film is formed so as to cover the gate insulating film 3406 and the gate electrodes 3407. The insulating film is formed to have a single layer or stacked layers of a film containing an inorganic material such as silicon, an oxide of silicon, or a nitride of silicon, or a film containing an organic material such as an organic resin or the like by a plasma CVD method, a sputtering method, or the like. Next, the insulating film is selectively etched by anisotropic etching (mainly in the perpendicular direction), so that insulating films 3410 (also referred to as sidewalls) which are in contact with the side surfaces of the gate electrodes 3407 are formed. The insulating films 3410 are used as doping masks for forming lightly doped drain (LDD) regions.

Next, the crystalline semiconductor films 3405a, 3405b, 3405d, and 3405f are doped with an impurity element imparting n-type conductivity at high concentration, using the resist mask formed by a photolithography method, the gate electrodes 3407, and the insulating films 3410 as masks. Thus, impurity regions 3411 having n-type conductivity are formed. Here, phosphorus is used as an impurity element imparting n-type conductivity, and is selectively introduced into the crystalline semiconductor films 3405a, 3405b, 3405d, and 3405f so as to be contained at concentrations of $1\times10^{19}$ to $1\times10^{20}$/cm$^3$. Thus, the n-type impurity regions 3411 having a higher concentration than that of the impurity regions 3408 are formed.

Through the above steps, n-channel thin film transistors 3400a, 3400b, 3400d, and 3400f; and p-channel thin film transistors 3400c and 3400e are formed (see FIG. 15D).

In the n-channel thin film transistor 3400a, a channel formation region is formed in a region of the crystalline semiconductor film 3405a which overlaps with the gate electrode 3407; the impurity region 3411 which forms a source region or a drain region is formed in a region of the crystalline semiconductor film 3405a which does not overlap with the gate electrode 3407 and the insulating film 3410; and a low concentration impurity region (LDD region) is formed in a region which overlaps with the insulating film 3410 and between the channel formation region and the impurity region 3411. In addition, channel formation regions, low concentration impurity regions, and the impurity regions 3411 are formed in the n-channel thin film transistors 3400b, 3400d, and 3400f.

In the p-channel thin film transistor 3400c, a channel formation region is formed in a region which overlaps with the gate electrode 3407; and the impurity region 3409 which forms a source region or a drain region is formed in a region of the crystalline semiconductor film 3405c which does not overlap with the gate electrode 3407. Similarly, a channel formation region and the impurity region 3409 are formed in the p-channel thin film transistor 3400e. Here, although an LDD region is not formed in the p-channel thin film transistors 3400c and 3400e, an LDD region may be provided in the p-channel thin film transistors, or a structure without an LDD region may be applied to the n-channel thin film transistors.

Next, a single layer or stacked layers of an insulating film are formed so as to cover the crystalline semiconductor films 3405a to 3405f, the gate electrodes 3407, and the like. Then, conductive films 3413 electrically connected to the impurity regions 3409 and the impurity regions 3411 which each form the source region or the drain region of the thin film transistors 3400a to 3400f are formed over the insulating film (see FIG. 16A). The insulating film is formed in a single layer or in stacked layers, using an inorganic material such as an oxide of silicon or a nitride of silicon; an organic material such as polyimide, polyamide, benzocyclobutene, acrylic, or epoxy; a siloxane material, or the like by a CVD method, a sputtering method, an SOG method, a droplet discharging method, a screen printing method, or the like. Here, the insulating film is formed to have two layers such that a silicon nitride oxide film is formed as a first insulating film 3412a and a silicon oxynitride film is formed as a second insulating film 3412b. Further, the conductive films 3413 each can form a source electrode or a drain electrode each of the thin film transistors 3400a to 3400f.

Note that heat treatment may be applied for the purpose of recovery of the crystallinity of the semiconductor films, activation of the impurity element which has been added into the semiconductor films, or hydrogenation of the semiconductor films before the insulating films 3412a and 3412b are formed or after one or both of them are formed. As the heat treatment, a thermal annealing method, a laser annealing method, an RTA method, or the like may be applied.

The conductive films 3413 are formed in a single layer or stacked layers of an element of aluminum, tungsten, titanium, tantalum, molybdenum, nickel, platinum, copper, gold, silver, manganese, neodymium, carbon, or silicon, or an alloy material or a compound material containing such an element as its main component by a CVD method, a sputtering method, or the like. An alloy material containing aluminum as its main component corresponds to, for example, a material which contains aluminum as its main component and also contains nickel, or an alloy material which contains aluminum as its main component and also contains nickel and one or both carbon and silicon. The conductive films 3413 may be formed to have a stacked structure of a barrier film, an aluminum-silicon film, and a barrier film or a stacked structure of a barrier film, an aluminum silicon film, a titanium nitride film, and a barrier film. Note that the barrier film is a thin film formed of titanium, a nitride of titanium, molybdenum, or a nitride of molybdenum. Aluminum and aluminum silicon are optimum materials of the conductive films 3413 because they have low resistance and are inexpensive. When barrier layers are provided as the top layer and the bottom layer of the conductive film 3413, generation of hillocks of aluminum and aluminum silicon can be prevented. When a barrier film of titanium which is an element having a high reducing property is formed, even when there is a thin natural oxide film formed on the crystalline semiconductor film, the natural oxide film can be reduced and thus the natural oxide film is removed, and a favorable contact between the conductive films 3413 and the crystalline semiconductor film can be obtained.

Next, an insulating film 3414 is formed so as to cover the conductive films 3413, and conductive films 3415a and 3415b each electrically connected to the conductive film 3413 which forms the source electrode or the drain electrode of the thin film transistors 3400a or 3400f are formed. In addition, a conductive film 3416 electrically connected to the conductive film 3413 which forms the source electrode or drain electrode of the thin film transistor 3400b or the like is formed. Note that the conductive films 3415a and 3415b and the conductive film 3416 may be formed using the same material in the same steps. The conductive films 3415a and 3415b and the conductive film 3416 may be formed using any of the above material which has been described for the conductive films 3413.

Subsequently, a conductive film 3417 which functions as an antenna is formed so as to be electrically connected to the conductive film 3416 (see FIG. 16B).

The insulating film 3414 can be formed in a single layer or stacked layers of an insulating film containing oxygen or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (Diamond-Like Carbon); or a film formed of an organic material such as epoxy, polyimide, polyamide, polyvinyl phenol, benzocyclobutene, or acrylic, or a siloxane material such as a siloxane resin by a CVD method, a sputtering method, or the like. Note that a siloxane material corresponds to a material having a bond of Si—O—Si. Siloxane has a skeleton structure with the bond of silicon and oxygen. As a substituent, an organic group containing at least hydrogen (for example, an alkyl group or aromatic hydrocarbon) is used. Alternatively, a fluoro group can be used as the substituent. Further alternatively, both a fluoro group and an organic group containing at least hydrogen may be used as the substituent.

The conductive film 3417 can be formed of a conductive material by a CVD method, a sputtering method, a printing method such as screen printing or gravure printing, a droplet discharging method, a dispensing method, a plating method, or the like. The conductive film 3417 is formed in a single layer or stacked layers of an element of aluminum, titanium, silver, copper, gold, platinum, nickel, palladium, tantalum, or molybdenum, or an alloy material or a compound material containing such an element as its main component.

For example, when the conductive film 3417 which functions as an antenna is formed by a screen printing method, the conductive film 3417 can be provided by selective printing of a conductive paste in which conductive particles with a grain diameter of several nm to several tens of μm are dissolved or dispersed in an organic resin. As the conductive particles, at least one of metal particles of silver, gold, copper, nickel, platinum, palladium, tantalum, molybdenum, and titanium; fine particles of silver halide; or dispersive nanoparticles can be used. Further, the organic resin included in the conductive paste can be one or a plurality of more of organic resins which function as a binder, a solvent, a dispersing agent, and a coating material for the metal particles. Typically, an organic resin such as an epoxy resin and a silicone resin can be given as examples. In addition, baking is preferably performed after the conductive paste is applied. For example, in the case of using fine particles (for example, a grain diameter greater than or equal to 1 nm and less than or equal to 100 nm) containing silver as its main component as a material of the conductive paste, the conductive paste is baked and hardened at temperatures approximately 150 to 300° C., so that the conductive film can be obtained. Alternatively, it is also possible to use fine particles containing solder or lead-free solder as its main component. In this case, fine particles with a grain diameter less than or equal to 20 μm are preferably used. Solder and lead-free solder have the advantage of low cost.

The conductive films 3415a and 3415b can function as wirings which are electrically connected to a secondary battery included in a semiconductor device of the present invention in a later step. In addition, in forming the conductive film 3417 which functions as an antenna, another conductive film may be separately formed so as to be electrically connected to the conductive films 3415a and 3415b, so that the conductive film can be utilized as the wiring connected to the secondary battery.

Next, an insulating film 3418 is formed so as to cover the conductive film 3417, and layers including the thin film transistors 3400a to 3400f, the conductive film 3417, and the like (hereinafter referred to as an "element formation layer 3419") are separated from the substrate 3401. Here, after openings are formed in the element formation layer 3419 excluding the region of the thin film transistors 3400a to 3400f by laser light irradiation (for example, UV light), the element formation layer 3419 can be separated from the substrate 3401 with physical force. The separation layer 3403 may be selectively removed by introduction of etchant into the openings before the element formation layer 3419 is separated from the substrate 3401. As the etchant, a gas or a liquid containing halogen fluoride or an interhalogen compound is used. For example, chlorine trifluoride is used as the gas containing halogen fluoride. Thus, the element formation layer 3419 can be separated from the substrate 3401. Note that the whole separation layer 3403 is not removed but part thereof may be left. Accordingly, the consumption of the etchant can be suppressed and process time for removing the separation layer can be shortened. Therefore, the throughput is improved and the cost is reduced. Further, even after the separation layer 3403 is removed, the element formation layer 3419 can be held over the substrate 3401. Furthermore, by reuse of the substrate 3401 from which the element formation layer 3419 has been separated, cost can be reduced.

The insulating film 3418 can be formed in a single layer or stacked layers of an insulating film containing oxygen or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (Diamond-Like Carbon); or a film formed of an organic material such as epoxy, polyimide, polyamide, polyvinyl phenol, benzocyclobutene, or acrylic, or a siloxane material such as a siloxane resin by a CVD method, a sputtering method, or the like.

In this embodiment mode, after the openings in the element formation layer 3419 is formed by laser light irradiation, a first sheet material 3420 is attached to one surface of the element formation layer 3419 (the surface where the insulating film 3418 is exposed), and then the element formation layer 3419 is separated from the substrate 3401 (see FIG. 17A).

Next, a second sheet material 3421 is attached to the other surface of the element formation layer 3419 (the surface exposed by separation), followed by one or both heat treatment and pressurization treatment (see FIG. 17B). As the first sheet material 3420 and the second sheet material 3421, hot-melt films and the like can be used.

As the first sheet material 3420 and the second sheet material 3421, a film on which antistatic treatment for preventing static electricity or the like has been applied (hereinafter referred to as an antistatic film) can be used. As examples of the antistatic film, a film in which an antistatic material is dispersed in a resin, a film to which an antistatic material is attached, and the like can be given. The film provided with an antistatic material can be a film with an antistatic material provided over one of its surfaces, or a film with an antistatic material provided over each of its surfaces. Further, the film with an antistatic material provided over one of its surfaces may be attached so that the antistatic material is placed on the inner side of the film or the outer side of the film. The antistatic material may be provided over the entire surface of the film, or over part of the film. As an antistatic material, a metal or indium tin oxide (ITO) which is a conductive material, or a surfactant such as an amphoteric surfactant, a cationic surfactant, or a nonionic surfactant can be used. In addition, as another antistatic material, a resin material which contains a cross-linked copolymer having a carboxyl group and a quaternary ammonium base on its side chain, or the like can be used. Such a material is attached, mixed, or applied to a film, so that an antistatic film can be formed. By sealing of the element formation layer 3419 with the antistatic film, the semiconductor element can be prevented from adverse effects such as external static electricity when being dealt with as a commercial product.

Note that a storage capacitor of a power supply circuit is connected to the conductive films 3415a and 3415b of the thin film secondary battery. Connection between the secondary battery and the conductive films 3415a and 3415b may be performed before the element formation layer 3419 is separated from the substrate 3401 (at the stage illustrated in FIG. 16B or 16C), after the element formation layer 3419 is separated from the substrate 3401 (at the stage illustrated in FIG. 17A), or after the element formation layer 3419 is sealed with the first sheet material and the second sheet material (at the stage shown in FIG. 17B). An example where the element formation layer 3419 and the secondary battery are formed to be connected is explained below with reference to FIGS. 18A and 18B and FIGS. 19A and 19B.

In FIG. 16B, conductive films 3431a and 3431b which are electrically connected to the conductive films 3415a and 3415b, respectively are formed at the same time as the conductive film 3417 which functions as an antenna. Then, the insulating film 1918 is formed so as to cover the conductive film 3417, 3431a, and 3431b, followed by formation of openings 3432a and 3432b so that the surfaces of the conductive films 3431a and 3431b are exposed. After that, openings are formed in the element formation layer 3419 by laser light irradiation, and the first sheet material 3420 is attached to one surface of the element formation layer 3419 (the surface where the insulating film 3418 is exposed), so that the element formation layer 3419 is separated from the substrate 3401 (see FIG. 18A).

Next, the second sheet material 3421 is attached to the other surface of the element formation layer 3419 (the surface exposed by separation), and the element formation layer 3419 is separated from the first sheet material 3420. Therefore, a material with low viscosity is used as the first sheet material 3420. Then, conductive films 3434a and 3434b which are electrically connected to the conductive films 3431a and 3431b, respectively, through the openings 3432a and 3432b are selectively formed (see FIG. 18B).

The conductive films 3434a and 3434b are formed with a conductive material by a CVD method, a sputtering method, a printing method such as screen printing or gravure printing, a droplet discharging method, a dispenser method, a plating method, or the like. The conductive films 3434a and 3434b are formed in a single layer or stacked layers of an element of aluminum, titanium, silver, copper, gold, platinum, nickel, palladium, tantalum, or molybdenum, or an alloy material or a compound material containing such an element as its main component.

Note that the example shown here is the case where the conductive films 3434a and 3434b are formed after the element formation layer 3419 is separated from the substrate 3401. However, the element formation layer 3419 may be separated from the substrate 3401 after the conductive films 3434a and 3434b are formed.

Figure 19A:
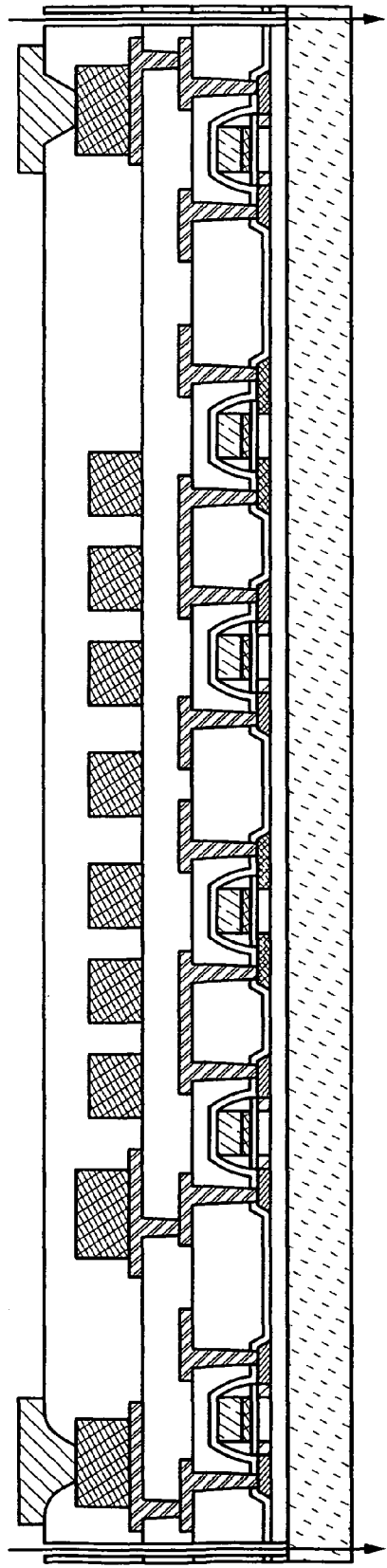
FIGS. 19A and 19B are views illustrating a manufacturing method of a semiconductor device to which the present invention is applied.

Next, in the case where a plurality of elements is formed over the substrate, the element formation layer 3419 is cut into individual elements (see FIG. 19A). A laser irradiation apparatus, a dicing apparatus, a scribing apparatus, or the like can be used for cutting. Here, the plurality of elements formed over one substrate is separated from one another by laser light irradiation.

Figure 19B:
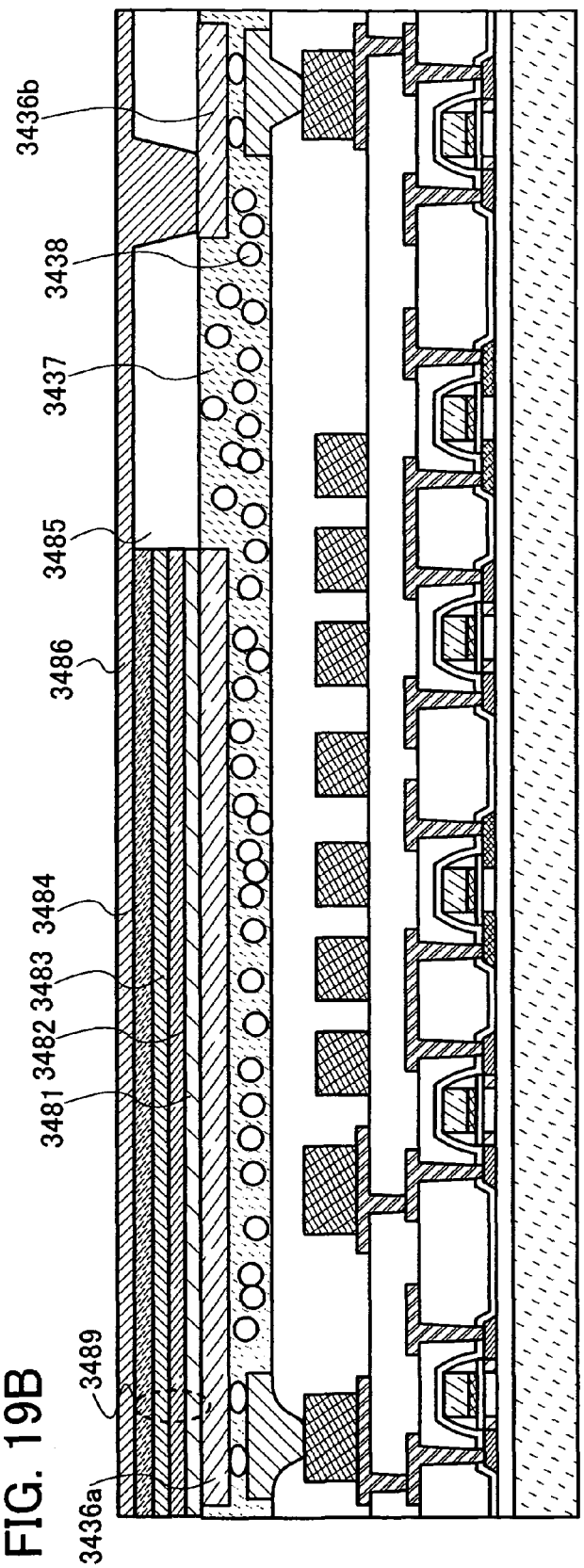

Next, the separated elements are electrically connected to the secondary battery (see FIG. 19B). In this embodiment mode, a thin-film secondary battery is used as the storage capacitor of the power supply circuit, in which a current-collecting thin film, a negative electrode active material layer, a solid electrolyte layer, a positive electrode active material layer, and a current-collecting thin film are sequentially stacked.

Conductive films 3436a and 3436b are formed of a conductive material by a CVD method, a sputtering method, a printing method such as screen printing or gravure printing, a droplet discharging method, a dispenser method, a plating method, or the like. The conductive films 3436a and 3436b are formed in a single layer or stacked layers of an element of aluminum, titanium, silver, copper, gold, platinum, nickel, palladium, tantalum, or molybdenum, or an alloy material or a compound material containing such an element as its main component. The conductive material should have high adhesion to a negative electrode active material layer and also low resistance. In particular, aluminum, copper, nickel, vanadium, or the like is preferably used.

The structure of the thin-film secondary battery is described in further detail. A negative electrode active material layer 3481 is formed over the conductive film 3436a. In general, vanadium oxide ($V_2O_5$) or the like is used. Next, a solid electrolyte layer 3482 is formed over the negative electrode active material layer 3481. In general, lithium phosphate ($Li_3PO_4$) or the like is used. Next, a positive electrode active material layer 3483 is formed over the solid electrolyte layer 3482. In general, lithium manganese oxide ($LiMn_2O_4$) or the like is used. Lithium cobalt oxide ($LiCoO_2$) or lithium nickel oxide ($LiNiO_2$) may also be used. Next, a current-collecting thin film 3484 to serve as an electrode is formed over the positive electrode active material layer 3483. The current-collecting thin film 3484 should have high adhesion to the positive electrode active material layer 3483 and also low resistance. For example, aluminum, copper, nickel, vanadium, or the like can be used.

Each of the above thin layers of the negative electrode active material layer 3481, the solid electrolyte layer 3482, the positive electrode active material layer 3483, and the current-collecting thin film 3484 may be formed by sputtering or evaporation. In addition, the thickness of each layer is preferably 0.1 to 3 μm.

Next, a contact hole is formed by formation of a resin film by a spin-coating method or the like and etching an interlayer film 3485. The interlayer film 3485 is not limited to a resin film, and other films such as an oxide film formed by a CVD method may be used as well; however, a resin film is preferably used in terms of flatness. Further, the contact hole can be formed without etching with the use of a photosensitive resin. Next, a wiring layer 3486 is formed over the interlayer film 3485 and connected to the conductive film 3436*b*. Thus, an electrical connection with the thin-film secondary battery is secured.

Here, the conductive films 3434*a* and 3434*b* which are provided in the element formation layer 3419 are connected to the conductive films 3436*a* and 3436*b*, respectively, which serve as the connection terminals of the thin film secondary battery 3489, which has been made in advance. Here, the case is shown where an electrical connection between the conductive films 3434*a* and 3436*a* or an electrical connection between the conductive films 3434*b* and 3436*b* is performed by pressure bonding with an adhesive material such as an anisotropic conductive film (ACF) or an anisotropic conductive paste (ACP) interposed therebetween. Here, the example is shown, in which the connection is performed using conductive particles 3438 included in an adhesive resin 3437. Alternatively, a conductive adhesive such as a silver paste, a copper paste, or a carbon paste; solder joint; or the like can be used.

Note that the structures of such transistors can be various without being limited to the specific structure shown in this embodiment mode. For example, a multi-gate structure having two or more gate electrodes may be employed. When a multi-gate structure is employed, a structure in which channel regions are connected in series is provided; therefore, a structure in which a plurality of transistors are connected in series is provided. When a multi-gate structure is employed, various advantages can be obtained in that off-current can be reduced; withstand voltage of the transistor can be increased, so that the reliability is increased; even if a voltage between a drain electrode and a source electrode fluctuates when the transistor operates in the saturation region, a fluctuation of a current between the drain electrode and the source electrode can be reduced, and thus flat characteristics can be obtained; and the like. Alternatively, a structure in which gate electrodes are formed above and below a channel may also be employed. When the structure in which gate electrodes are formed above and below a channel is employed, the channel region is enlarged and the amount of current flowing therethrough can be increased. Thus, a depletion layer can be easily formed and the subthreshold swing (S value) can be reduced. When gate electrodes are formed above and below a channel, a structure in which a plurality of transistors is connected in parallel is provided.

In addition, any of the following structures may be employed: a structure in which a gate electrode is formed above a channel formation region; a structure in which a gate electrode is formed below a channel formation region; a staggered structure; and an inversely staggered structure. Further, a structure, in which a channel formation region is divided into a plurality of regions and the divided regions are connected in parallel or in series, may be employed. Further, a channel formation region (or part thereof) may overlap with a source electrode or a drain electrode. When a structure in which a channel formation region (or part thereof) overlaps with a source electrode or a drain electrode is employed, electric charges can be prevented from being accumulated in part of the channel formation region and thus an unstable operation can be prevented. In addition, a lightly doped drain (LDD) region may be provided. When an LDD region is provided, off-current can be reduced; the withstand voltage of the transistor can be increased, so that the reliability is increased; and even if a voltage between a drain electrode and a source electrode fluctuates when the transistor operates in the saturation region, a fluctuation of a current between the drain electrode and the source electrode can be reduced, and thus flat characteristics can be obtained.

Note that the manufacturing method of the semiconductor device of this embodiment mode can be applied to any of the semiconductor devices described in this specification. That is, according to this embodiment mode, a semiconductor device which can transmit and receive information by detecting a difference between a signal line and a reference line in a signal waveform so as to generate a demodulation signal, and generate a demodulation signal stably even with a signal of which modulation factor is small can be manufactured.

Further, a semiconductor device which can demodulate a signal by canceling noise of each line and reducing influence of noise, which results from a carrier wave, can be manufactured.

Furthermore, a semiconductor device which can detect a signal as to a wireless signal of which modulation factor is 10% and stably perform signal transmission and reception which are based on ISO/IEC 15693 can be manufactured.

In the semiconductor device of the present invention, power from a power supply is continuously supplied while a wireless signal is received; therefore, the semiconductor device can be operated stably. Further, the semiconductor device can be wirelessly charged; therefore, shortage of power for transmitting and receiving individual information, due to deterioration of a battery over time, can be compensated.

Further, a semiconductor device which can generate a demodulation signal by detecting a difference between an output of a first bias circuit and an output of a second bias circuit, generate a demodulation signal stably even with a signal of which modulation factor is small, and demodulate a signal by reducing influence of noise can be manufactured.

Moreover, in the semiconductor device of the present invention, power from a power supply is continuously supplied while a carrier wave of which modulation factor is 10% is received; therefore, the semiconductor device can be operated stably. Further, the semiconductor device can be wirelessly charged; therefore, shortage of power for transmitting and receiving individual information, due to deterioration of a battery over time, can be compensated.

Embodiment Mode 5

This embodiment mode will describe another example of the manufacturing method of the semiconductor device shown in the above embodiment mode with reference to the drawings. In this embodiment mode, a structure in which an antenna, a battery, and a signal processing circuit included in a semiconductor device are formed over the same substrate will be described. Note that an antenna, a battery, and a signal processing circuit are formed at once on a single crystal substrate, using transistors in which channel formation regions are formed. When transistors are formed on a single crystal substrate, a semiconductor device having transistors with few electrical characteristic variations can be formed, which is preferable. In addition, an example in which a thin-film secondary battery is used as the battery will be described.

Figure 20A:
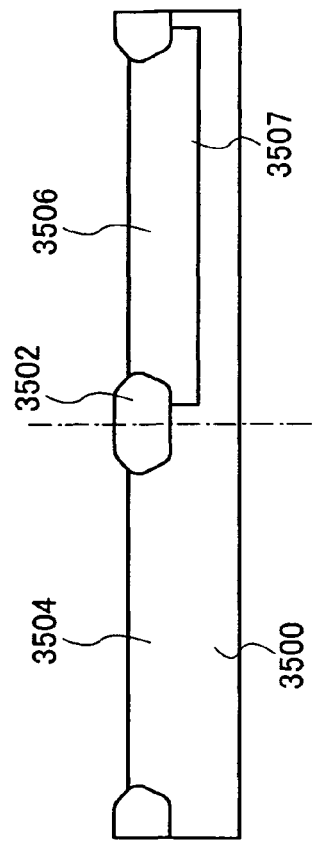
FIGS. 20A to 20C are views illustrating a manufacturing method of a semiconductor device to which the present invention is applied.

First, regions 3504 and 3506 are formed in a semiconductor substrate 3500 after an element region is isolated (see FIG. 20A). The regions 3504 and 3506 provided in the semiconductor substrate 3500 are isolated from each other by an insulating film (also referred to as a field oxide film) 3502. The example shown here is the case where a single crystal silicon substrate having n-type conductivity is used as the semiconductor substrate 3500, and a p-well 3507 is formed in the region 3506 of the semiconductor substrate 3500.

Any substrate can be used as the substrate 3500 as long as it is a semiconductor substrate. For example, a single crystal silicon substrate having n-type or p-type conductivity, a compound semiconductor substrate (for example, a GaAs substrate, an InP substrate, a GaN substrate, a SiC substrate, a sapphire substrate, or a ZnSe substrate), a silicon on insulator (SOI) substrate formed by a bonding method or a separation by implanted oxygen (SIMOX) method, or the like can be used.

The regions 3504 and 3506 can be formed by a local oxidation of silicon (LOCOS) method, a trench isolation method, or the like.

In addition, the p-well 3507 formed in the region 3506 of the semiconductor substrate 3500 can be formed by selective doping of the semiconductor substrate 3500 with an impurity element imparting p-type conductivity. As an impurity element imparting p-type conductivity, boron, aluminum, gallium, or the like can be used.

In this embodiment mode, although the region 3504 is not doped with an impurity element because a semiconductor substrate having n-type conductivity is used as the semiconductor substrate 3500, an n-well may be formed in the region 3504 by introduction of an impurity element imparting n-type conductivity. As an impurity element imparting n-type conductivity, phosphorus, arsenic, or the like can be used. When a semiconductor substrate having p-type conductivity is used, on the other hand, the region 3504 may be doped with an impurity element imparting n-type conductivity to form an n-well, whereas the region 3506 may not be doped with an impurity element.

Figure 20B:
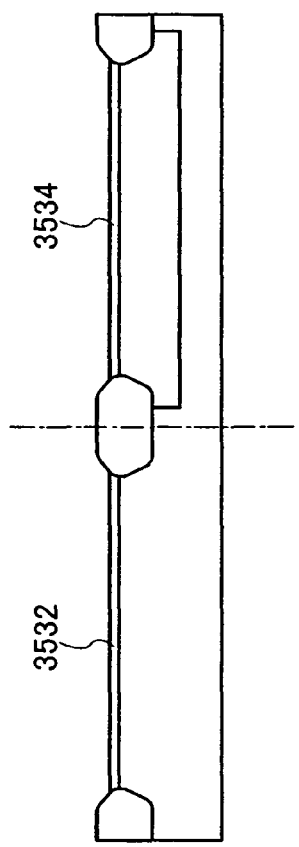

Next, insulating films 3532 and 3534 are formed so as to cover the regions 3504 and 3506, respectively (see FIG. 20B).

For example, surfaces of the regions 3504 and 3506 provided in the semiconductor substrate 3500 are oxidized by heat treatment, so that the insulating films 3532 and 3534 can be formed of silicon oxide films. Alternatively, the insulating films 3532 and 3534 may be each formed by stack of a silicon oxide film and a film containing oxygen and nitrogen (a silicon oxynitride film) by the steps of forming a silicon oxide film by a thermal oxidation method and then nitriding the surface of the silicon oxide film by nitridation treatment.

Further alternatively, the insulating films 3532 and 3534 may be formed by plasma treatment as described above. For example, a silicon oxide film or a silicon nitride film can be formed as the insulating films 3532 and 3534 by performance of high-density plasma treatment on the surfaces of the regions 3504 and 3506 provided in the semiconductor substrate 3500 so as to oxide or nitride the surfaces. Furthermore, after oxidation treatment is performed on the surfaces of the regions 3504 and 3506 by high-density plasma treatment, the surfaces may be nitrided by performance of high-density plasma treatment again. In this case, silicon oxide films are formed so as to be in contact with the surfaces of the regions 3504 and 3506, and then silicon oxynitride films are formed on the silicon oxide films. Thus, the insulating films 3532 and 3534 are each formed to have a stacked structure of the silicon oxide film and the silicon oxynitride film. Further, silicon oxide films may be formed on the surfaces of the regions 3504 and 3506 by a thermal oxidation method and the surfaces may be oxided or nitrided by high-density plasma treatment.

The insulating films 3532 and 3534 formed over the regions 3504 and 3506 of the semiconductor substrate 3500, respectively, function as gate insulating films of transistors which are completed later.

Figure 20C:
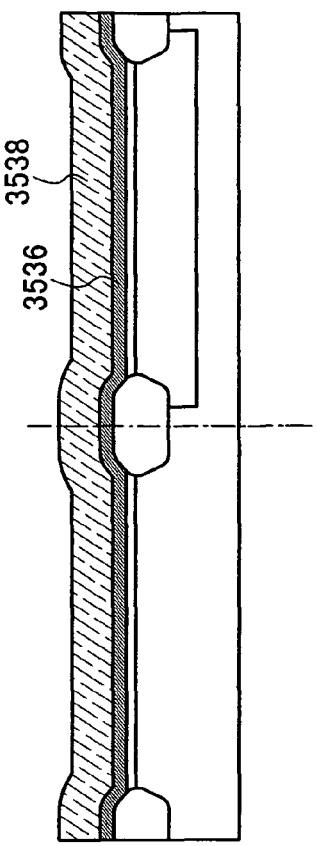

Next, a conductive film is formed so as to cover the insulating films 3532 and 3534 which are formed over the regions 3504 and 3506, respectively (see FIG. 20C). Here, an example is shown in which conductive films 3536 and 3538 are sequentially stacked as the conductive film. Needless to say, the conductive film may be formed to have a single layer or a stacked structure of three or more layers.

As materials of the conductive films 3536 and 3538, an element of tantalum, tungsten, titanium, molybdenum, aluminum, copper, chromium, niobium, or the like, or an alloy material or a compound material containing such an element as its main component can be used. Alternatively, a metal nitride film obtained by nitridation of the above elements can be used. Besides, a semiconductor material typified by polycrystalline silicon doped with an impurity element such as phosphorus can be used.

Here, a tantalum nitride film is formed as the conductive film 3536, and a tungsten film is formed thereover as the conductive film 3538. Alternatively, it is also possible to form the conductive film 3536 using a single layer or stacked layers of a tungsten nitride film, a molybdenum nitride film, and a titanium nitride film and form the conductive film 3538 using a single layer or stacked layers of a tungsten film, a tantalum film, a molybdenum film, and a titanium film.

Figure 21A:
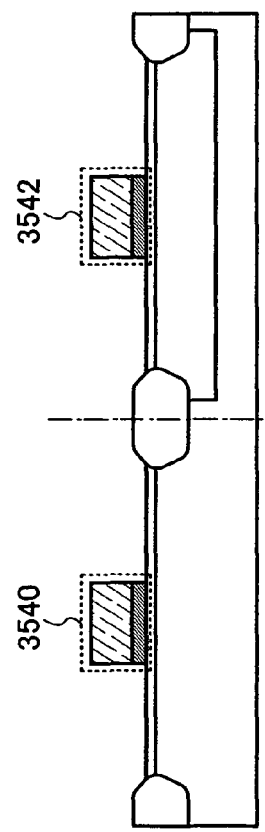
FIGS. 21A to 21C are views illustrating a manufacturing method of a semiconductor device to which the present invention is applied.

Next, the stacked conductive films 3536 and 3538 are selectively removed by etching, so that the conductive films 3536 and 3538 remain above part of the regions 3504 and 3506, respectively. Thus, gate electrodes 3540 and 3542 are formed (see FIG. 21A).

Figure 21B:
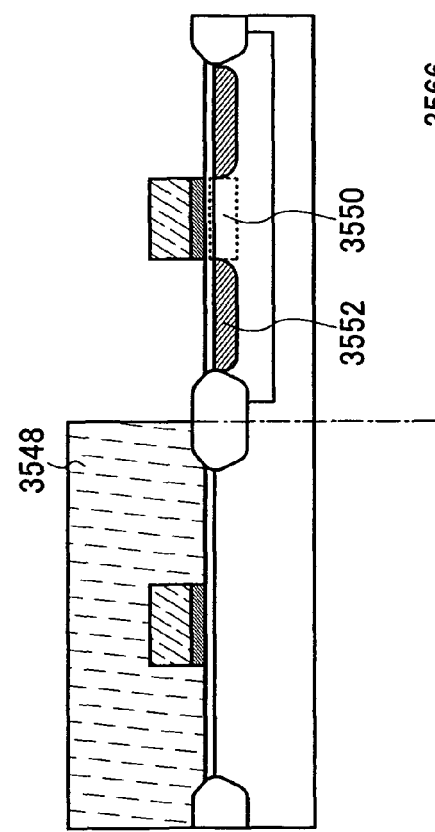

Next, a resist mask 3548 is selectively formed so as to cover the region 3504, and an impurity element is introduced into a desired position of the region 3506, using the resist mask 3548 and the gate electrode 3542 as masks, so that impurity regions are formed (see FIG. 21B). As an impurity element, an impurity element imparting n-type conductivity or an impurity element imparting p-type conductivity is used. As an impurity element imparting n-type conductivity, phosphorus, arsenic, or the like can be used. As an impurity element imparting p-type conductivity, boron, aluminum, gallium, or the like can be used. Here, phosphorus is used as the impurity element.

In FIG. 21B, by introduction of an impurity element, impurity regions 3552 which form a source region and a drain region and a channel formation region 3550 are formed in the region 3506.

Figure 21C:
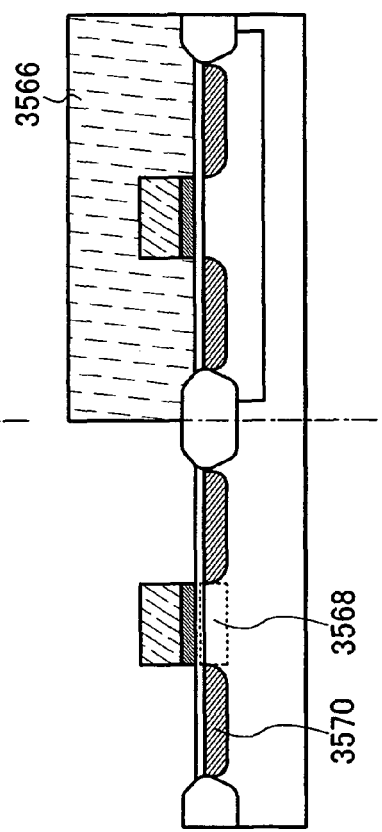

Next, a resist mask 3566 is selectively formed so as to cover the region 3506, and an impurity element is introduced into the region 3504, using the resist mask 3566 and the gate electrode 3540 as masks, so that impurity regions are formed (see FIG. 21C). As the impurity element, an impurity element imparting n-type conductivity or an impurity element imparting p-type conductivity is used. As an impurity element imparting n-type conductivity, phosphorus, arsenic, or the like can be used. As an impurity element imparting p-type conductivity, boron, aluminum, gallium, or the like can be used. Here, an impurity element (for example, boron) imparting different conductivity from that of the impurity element introduced into the region 3506 in FIG. 21C is used. As a result, impurity regions 3570 which form a source region and a drain region and a channel formation region 3568 are formed in the region 3504.

Figure 22A:
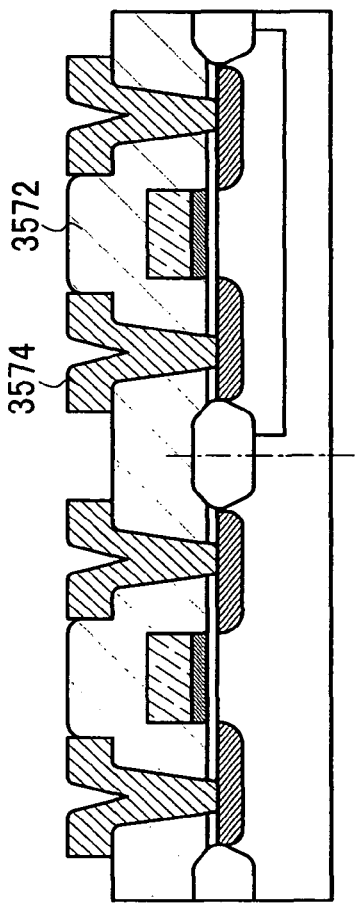
FIGS. 22A and 22B are views illustrating a manufacturing method of a semiconductor device to which the present invention is applied.

Next, an insulating film 3572 is formed so as to cover the insulating films 3532 and 3534 and the gate electrodes 3540 and 3542. Then, wirings 3574, which are electrically connected to the impurity regions 3552 and 3570 formed in the regions 3504 and 3506, respectively, are formed over the insulating film 3572 (see FIG. 22A).

The insulating film 3572 can be formed in a single layer or stacked layers of an insulating film containing oxygen or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); or a film formed of an organic material such as epoxy, polyimide, polyamide, polyvinyl phenol, benzocyclobutene, or acrylic, or a siloxane material such as a siloxane resin by a CVD method, a sputtering method, or the like. Note that a siloxane material corresponds to a material having a bond of Si—O—Si. Siloxane has a skeleton structure with the bond of silicon and oxygen. As a substituent, an organic group containing at least hydrogen (for example, an alkyl group or aromatic hydrocarbon) is used. Alternatively, a fluoro group can be used as the substituent. Further alternatively, both a fluoro group and an organic group containing at least hydrogen may be used as the substituent.

The wirings 3574 are formed in a single layer or stacked layers of an element of aluminum, tungsten, titanium, tantalum, molybdenum, nickel, platinum, copper, gold, silver, manganese, neodymium, carbon, or silicon, or an alloy material or a compound material containing such an element as its main component by a CVD method, a sputtering method, or the like. An alloy material containing aluminum as its main component corresponds to, for example, a material which contains aluminum as its main component and also contains nickel, or an alloy material which contains aluminum as its main component and also contains nickel and one or both carbon and silicon. The wirings 3574 may be formed to have a stacked structure of a barrier film, an aluminum-silicon film, and a barrier film or a stacked structure of a barrier film, an aluminum silicon film, a titanium nitride film, and a barrier film. Note that the barrier film is a thin film formed of titanium, a nitride of titanium, molybdenum, or a nitride of molybdenum. Aluminum and aluminum silicon are optimum materials of the wirings 3574 because they have low resistance and are inexpensive. When barrier layers are provided as the top layer and the bottom layer of the conductive film 3413, generation of hillocks of aluminum and aluminum silicon can be prevented. When a barrier film formed of titanium which is an element having a high reducing property is formed, even when there is a thin natural oxide film formed on the crystalline semiconductor film, the natural oxide film can be reduced and thus the natural oxide film is removed, and a favorable contact between the wirings 3574 and the crystalline semiconductor film can be obtained.

Note that the structure of transistors which is applied to the present invention is not limited to the structure illustrated in the drawing. For example, a transistor with an inversely staggered structure, a FinFET structure, or the like can be used. A FinFET structure is preferable because it can suppress a short channel effect which occurs along with reduction in transistor size.

The semiconductor device of the present invention includes a battery capable of storing power, which is supplied to the signal processing circuit. As the battery, a capacitor such as a double-layer electrolytic capacitor or a thin-film secondary battery is preferably used. In this embodiment mode, a connection between a transistor and a thin-film secondary battery is described.

Figure 22B:
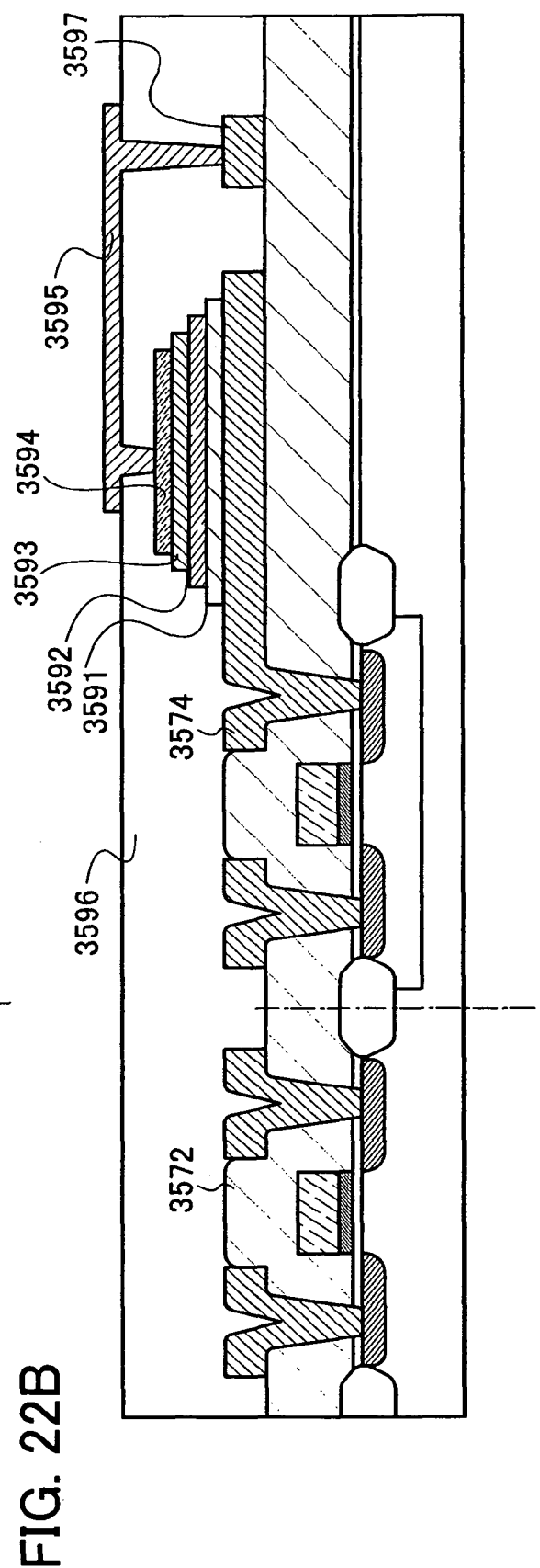

In this embodiment mode, the secondary battery is stacked over the wiring 3574 connected to the transistor. The secondary battery has a structure in which a current-collecting thin film, a negative electrode active material layer, a solid electrolyte layer, a positive electrode active material layer, and a current-collecting thin film are sequentially stacked (see FIG. 22B). Therefore, the material of the wiring 3574 which also has a function of the current-collecting thin film of the secondary battery should have high adhesion to the negative electrode active material layer and also low resistance. In particular, aluminum, copper, nickel, vanadium, or the like is preferably used.

Next, the structure of the thin-film secondary battery is described in detail. A negative electrode active material layer 3591 is formed over the wiring 3574. In general, vanadium oxide ($V_2O_5$) or the like is used. Next, a solid electrolyte layer 3592 is formed over the negative electrode active material layer 3591. In general, lithium phosphate ($Li_3PO_4$) or the like is used. Next, a positive electrode active material layer 3593 is formed over the solid electrolyte layer 3592. In general, lithium manganese oxide ($LiMn_2O_4$) or the like is used. Lithium cobalt oxide ($LiCoO_2$) or lithium nickel oxide ($LiNiO_2$) may also be used. Next, a current-collecting thin film 3594 to serve as an electrode is formed over the positive electrode active material layer 3593. The current-collecting thin film 3594 should have high adhesion to the positive electrode active material layer 3593 and also low resistance. For example, aluminum, copper, nickel, vanadium, or the like can be used.

Each of the above thin layers of the negative electrode active material layer 3591, the solid electrolyte layer 3592, the positive electrode active material layer 3593, and the current-collecting thin film 3594 may be formed by sputtering or evaporation. In addition, the thickness of each layer is preferably 0.1 to 3 μm.

Next, a resin film is formed by a spin-coating method or the like. Then, the resin film is etched to form a contact hole and an interlayer film 3596. The interlayer film 3596 is not limited to a resin film, and other films such as an oxide film formed by a CVD method may be used as well; however, a resin film is preferably used in terms of flatness. Further, the contact hole can be formed without etching with the use of a photosensitive resin. Next, a wiring layer 3595 is formed over the interlayer film 3596 and connected to a wiring 3597. Thus, an electrical connection with the thin-film secondary battery is secured.

With the above structure, the semiconductor device of the present invention can employ a structure in which transistors are formed on a single crystal substrate and a thin-film secondary battery is formed thereover. Thus, an extremely thin and small-sized semiconductor device can be manufactured in this embodiment mode.

Note that the manufacturing method of the semiconductor device of this embodiment mode can be applied to any of the semiconductor devices described in this specification. That is, according to this embodiment mode, a semiconductor device which can transmit and receive information by detecting a difference between a signal line and a reference line in a signal waveform so as to generate a demodulation signal, and generate a demodulation signal stably even with a signal of which modulation factor is small can be manufactured.

Further, a semiconductor device which can demodulate a signal by canceling noise of each line and reducing influence of noise which results from a carrier wave can be manufactured.

Furthermore, a semiconductor device which can detect a signal as to a wireless signal of which modulation factor is 10% and stably perform signal transmission and reception which are based on ISO/IEC 15693 can be manufactured.

In the semiconductor device of the present invention, power from a power supply is continuously supplied while a wireless signal is received; therefore, the semiconductor device can be operated stably. Further, the semiconductor device can be wirelessly charged; therefore, shortage of power for transmitting and receiving individual information, due to deterioration of a battery over time, can be compensated.

Further, a semiconductor device which can generate a demodulation signal by detecting a difference between an output of a first bias circuit and an output of a second bias circuit, generate a demodulation signal stably even with a signal of which modulation factor is small, and demodulate a signal by reducing influence of noise can be manufactured.

Moreover, in the semiconductor device of the present invention, power from a power supply is continuously supplied while a carrier wave of which modulation factor is 10% is received; therefore, the semiconductor device can be operated stably. Further, the semiconductor device can be wirelessly charged; therefore, shortage of power for transmitting and receiving individual information, due to deterioration of a battery over time, can be compensated.

Embodiment Mode 6

An example of a manufacturing method of a semiconductor device, which is different from that described in the above embodiment mode, will be described with reference to the drawings.

Figure 23A:
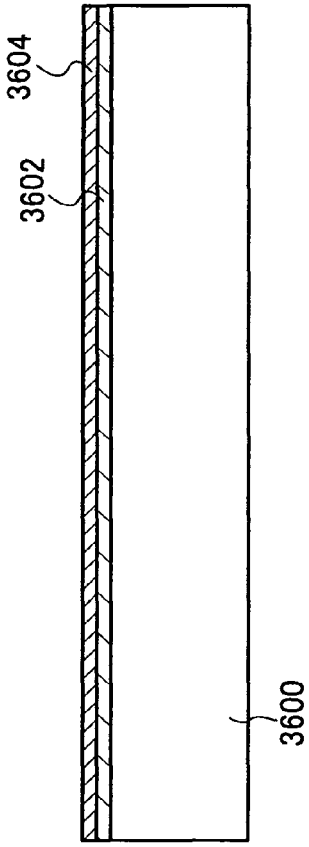
FIGS. 23A to 23C are views illustrating a manufacturing method of a semiconductor device to which the present invention is applied.

First, an insulating film is formed over a substrate 3600. Here, a single crystal silicon substrate having n-type conductivity is used as the substrate 3600, and insulating films 3602 and 3604 are formed over the substrate 3600 (see FIG. 23A). For example, a silicon oxide film is formed as the insulating film 3602 by performance of heat treatment to the substrate 3600, and then a silicon nitride film is formed over the insulating film 3602 by a CVD method.

Any substrate can be used as the substrate 3600 as long as it is a semiconductor substrate, without limitation to the silicon substrate. For example, a single crystal silicon substrate having n-type or p-type conductivity, a compound semiconductor substrate (for example, a GaAs substrate, an InP substrate, a GaN substrate, a SiC substrate, a sapphire substrate, or a ZnSe substrate), an silicon on insulator (SOI) substrate formed by a bonding method or a separation by implanted oxygen (SIMOX) method, or the like can be used.

Alternatively, after the insulating film 3602 is formed, the insulating film 3604 may be formed by nitridation of the insulating film 3602 by high-density plasma treatment. Note that the insulating film provided over the substrate 3600 may have a single-layer structure or a stacked structure of three or more layers.

Figure 23B:
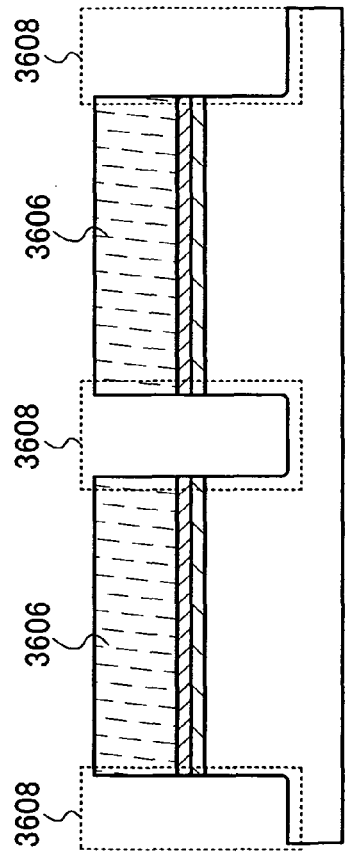

Next, a pattern of a resist mask 3606 is selectively formed over the insulating film 3604, and selective etching is performed using the resist mask 3606 as a mask, so that recessed portions 3608 are selectively formed in the substrate 3600 (see FIG. 23B). For the etching of part of the substrate 3600 and the insulating films 3602 and 3604, plasma dry etching can be performed.

Figure 23C:
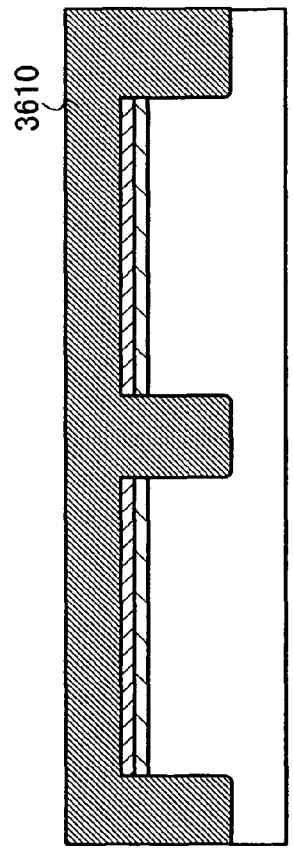

Next, the patterns of the resist mask 3606 are removed, and then an insulating film 3610 is formed so as to fill the recessed portions 3608 formed in the substrate 3600 (see FIG. 23C).

The insulating film 3610 is formed of an insulating material such as silicon oxide, silicon nitride, silicon oxynitride ($SiO_xN_y$, where $x>y>0$), or silicon nitride oxide ($SiN_xO_y$, where $x>y>0$) by a CVD method, a sputtering method, or the like. As the insulating film 3610, a silicon oxide film is formed by a TEOS (tetraethyl orthosilicate) gas, using an atmospheric pressure CVD method or a low-pressure CVD method.

Figure 24A:
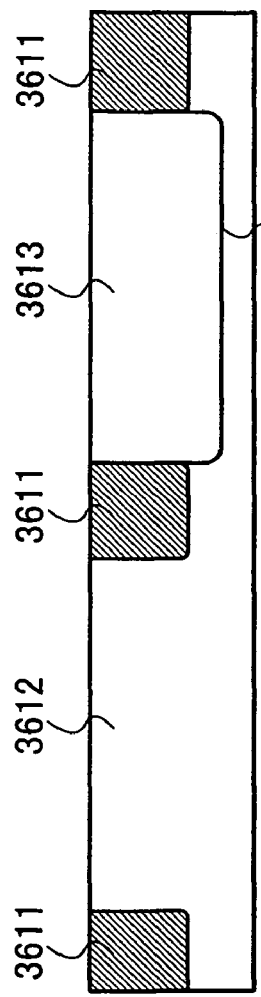
FIGS. 24A to 24C are views illustrating a manufacturing method of a semiconductor device to which the present invention is applied.

Next, the surface of the substrate 3600 is exposed by grinding treatment or polishing treatment such as chemical mechanical polishing (CMP). Here, by exposure of the surface of the substrate 3600, regions 3612 and 3613 are formed between insulating films 3611 which are formed in the recessed portions 3608 of the substrate 3600. The insulating film 3610 formed over the surface of the substrate 3600 is removed by grinding treatment or polishing treatment such as CMP, so that the insulating films 3611 are obtained. Subsequently, by selective introduction of an impurity element imparting p-type conductivity, a p-well 3615 is formed in the region 3613 of the substrate 3600 (see FIG. 24A).

As an impurity element imparting p-type conductivity, boron, aluminum, gallium, or the like can be used. Here, boron is introduced into the region 3613 as the impurity element.

Further, in this embodiment mode, although an impurity element is not introduced into the region 3612 because a semiconductor substrate having n-type conductivity is used as the substrate 3600, an n-well may be formed in the region 3612 by introduction of an impurity element imparting n-type conductivity. As an impurity element imparting n-type conductivity, phosphorus, arsenic, or the like can be used.

When a semiconductor substrate having p-type conductivity is used, on the other hand, an impurity element imparting n-type conductivity may be introduced into the region 3612 to form an n-well, whereas the region 3613 may not be doped with an impurity element.

Figure 24B:
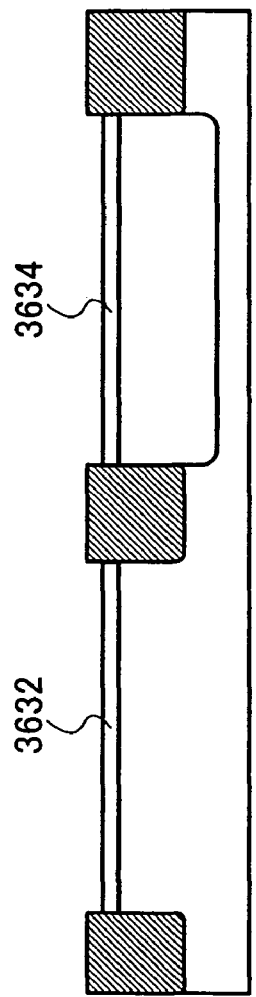

Next, insulating films 3632 and 3634 are formed over the surfaces of the regions 3612 and 3613 in the substrate 3600, respectively (see FIG. 24B).

For example, surfaces of the regions 3612 and 3613 provided in the substrate 3600 are oxidized by heat treatment, so that the insulating films 3632 and 3634 can be formed of silicon oxide films. Alternatively, the insulating films 3632 and 3634 may be each formed by stack of a silicon oxide film and a film containing oxygen and nitrogen (a silicon oxynitride film) by the steps of forming a silicon oxide film by a thermal oxidation method and then nitriding the surface of the silicon oxide film by nitridation treatment.

Further alternatively, the insulating films 3632 and 3634 may be formed by plasma treatment as described above. For example, a silicon oxide film or a silicon nitride film can be formed as the insulating films 3632 and 3634 by performance of high-density plasma treatment to the surfaces of the regions 3612 and 3613 provided in the substrate 3600 so as to oxide or nitride the surfaces. Furthermore, after oxidation treatment is performed on the surfaces of the regions 3612 and 3613 by high-density plasma, the surfaces may be nitrided by performance of high-density plasma again. In this case, silicon oxide films are formed so as to be in contact with the surfaces of the regions 3612 and 3613, and then silicon oxynitride films are formed on the silicon oxide films. Thus, the insulating films 3632 and 3634 are each formed to have a stacked structure of the silicon oxide film and the silicon oxynitride film. Further, the surfaces of the regions 3612 and 3613 may be oxided or nitrided by high-density plasma treatment after silicon oxide films are formed on the surfaces by a thermal oxidation method.

The insulating films 3632 and 3634 formed over the regions 3612 and 3613 of the substrate 3600, respectively, function as gate insulating films of transistors which are completed later.

Figure 24C:
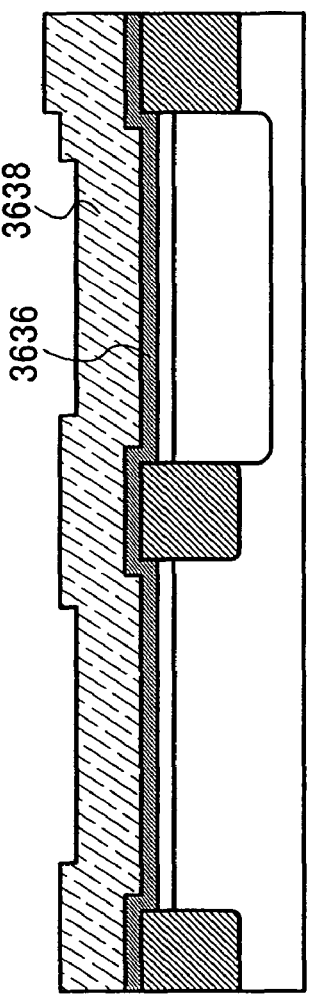

Next, a conductive film is formed so as to cover the insulating films 3632 and 3634 which are formed over the regions 3612 and 3613 provided in the substrate 3600, respectively (see FIG. 24C). Here, an example is shown in which conductive films 3636 and 3638 are sequentially stacked as the conductive film. Needless to say, the conductive film may be formed to have a single layer or a stacked structure of three or more layers.

As materials of the conductive films 3636 and 3638, an element of tantalum, tungsten, titanium, molybdenum, aluminum, copper, chromium, niobium, or the like, or an alloy material or a compound material containing such an element as its main component can be used. Alternatively, a metal nitride film obtained by nitridation of the above elements can be used. Besides, a semiconductor material typified by polycrystalline silicon doped with an impurity element such as phosphorus can be used.

Here, a tantalum nitride film is formed as the conductive film 3636, and a tungsten film is formed thereover as the conductive film 3638. Alternatively, it is also possible to form the conductive film 3636 using a single layer or stacked layers of a tungsten nitride film, a molybdenum nitride film, and a titanium nitride film and form the conductive film 3638 using a single layer or stacked layers of a tungsten film, a tantalum film, a molybdenum film, and a titanium film.

Figure 25A:
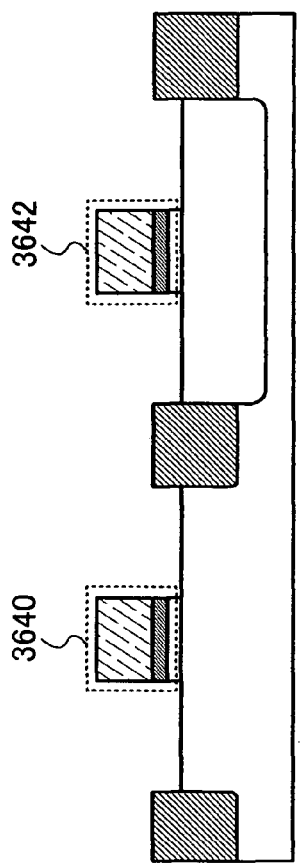
FIGS. 25A to 25C are views illustrating a manufacturing method of a semiconductor device to which the present invention is applied.

Next, the stacked conductive films 3636 and 3638 are selectively removed by etching, so that the conductive films 3636 and 3638 remain above part of the regions 3612 and 3613 of the substrate 3600. Thus, conductive films 3640 and 3642 which function as gate electrodes are formed (see FIG. 25A). Here, surfaces of the regions 3612 and 3613 of the substrate 2600 which does not overlap with the conductive films 3640 and 3642, respectively, are exposed.

Specifically, in the region 3612 of the substrate 3600, part of the insulating film 3632 formed below the conductive film 3640, which does not overlap with the conductive film 3640, is selectively removed, so that the ends of the conductive film 3640 and the ends of the insulating film 3632 are almost aligned with each other. In addition, in the region 3613 of the substrate 3600, part of the insulating film 3634 formed below the conductive film 3642, which do not overlap with the conductive film 3642, is selectively removed, so that the ends of the conductive film 3642 and the ends of the insulating film 3634 are almost aligned with each other.

In this case, the part of the insulating films or the like which do not overlap with the conductive films 3640 and 3642 may be removed at the same time as the formation of the conductive films 3640 and 3642. Alternatively, the part of the insulating films which do not overlap with the conductive films 3640 and 3642 may be removed using resist masks which are left after the formation of the conductive films 3640 and 3642 or the conductive films 3640 and 3642 as masks.

Figure 25B:
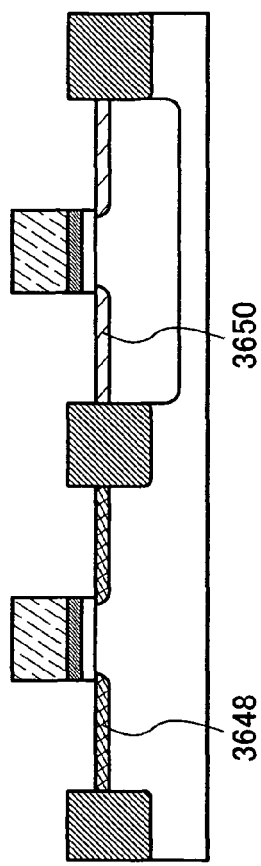

Then, an impurity element is selectively introduced into the regions 3612 and 3613 of the substrate 3600 (see FIG. 25B). Here, an impurity element imparting n-type conductivity is selectively introduced into the region 3613, using the conductive film 3642 as a mask, whereas an impurity element imparting p-type conductivity is selectively introduced into the region 3612, using the conductive film 3640 as a mask. As an impurity element imparting n-type conductivity, phosphorus, arsenic, or the like can be used. As an impurity element imparting p-type conductivity, boron, aluminum, gallium, or the like can be used.

Next, sidewalls 3654 which are in contact with the side surfaces of the conductive films 3640 and 3642 are formed. Specifically, the sidewalls are formed in a single layer or stacked layers of a film containing an inorganic material such as silicon, an oxide of silicon, or a nitride of silicon, or a film containing an organic material such as an organic resin. Then, such an insulating film is selectively etched by anisotropic etching mainly in the perpendicular direction, so that the sidewalls 3654 can be formed so as to be in contact with the side surfaces of the conductive films 3640 and 3642. The sidewalls 2654 are used as masks in doping for forming lightly diode drain (LDD) regions. Further, the sidewalls 3654 are formed so as to be in contact with side surfaces of the insulating films formed below the conductive films 3640 and 3642.

Figure 25C:
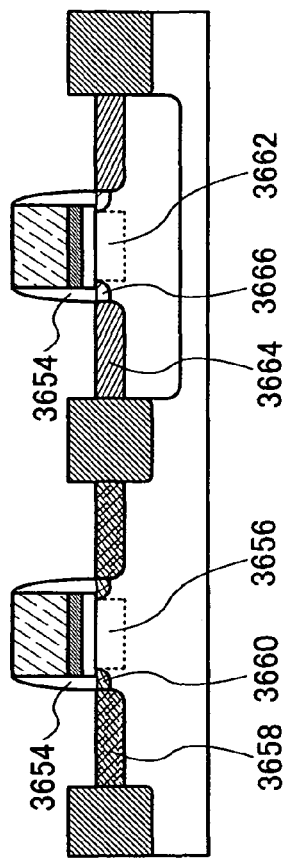

Subsequently, an impurity element is introduced into the regions 3612 and 3613 of the substrate 3600, using the sidewalls 3654 and the conductive films 3640 and 3642 as masks, so that impurity regions which each function as a source region or a drain region are formed (see FIG. 25C). Here, an impurity element imparting n-type conductivity is introduced into the region 3613 of the substrate 3600, using the sidewalls 3654 and the conductive film 3642 as masks, at higher concentration than the concentrations in LDD regions. Whereas, an impurity element imparting p-type conductivity is introduced into the region 3612 of the substrate 3600, using the sidewalls 3654 and the conductive film 3640 as masks, at higher concentration than the concentrations in LDD regions.

As a result, impurity regions 3658 which each form a source region or a drain region, low-concentration impurity regions 3660 which form LDD regions, and a channel formation region 3656 are formed in the region 3612 of the substrate 3600. Whereas, impurity regions 3664 which form a source region or a drain region, low-concentration impurity regions 3666 which form LDD regions, and a channel formation region 3662 are formed in the region 3613 of the substrate 3600.

In this embodiment mode, the impurity elements are introduced under the condition that parts of the regions 3612 and 3613 of the substrate 3600 which do not overlap with the conductive films 3640 and 3642 are exposed. Thus, the channel formation regions 3656 and 3662 which are formed in the regions 3612 and 3613 of the substrate 3600, respectively, can be formed in a self-aligned manner with the conductive films 3640 and 3642.

Figure 26A:
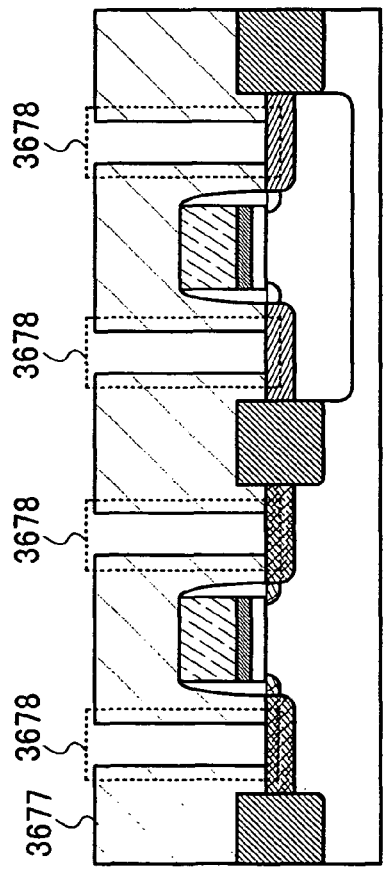
FIGS. 26A and 26B are views illustrating a manufacturing method of a semiconductor device to which the present invention is applied.

Next, an insulating film is formed so as to cover the insulating films, the conductive films, and the like which are provided over the regions 3612 and 3613 of the substrate 3600, and insulating films 3677 are formed by formation of openings 3678 in the insulating film (see FIG. 26A).

The insulating films 3677 can be formed in a single layer or stacked layers of an insulating film containing oxygen or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (Diamond-Like Carbon); or a film formed of an organic material such as epoxy, polyimide, polyamide, polyvinyl phenol, benzocyclobutene, or acrylic, or a siloxane material such as a siloxane resin by a CVD method, a sputtering method, or the like. Note that a siloxane material corresponds to a material having a bond of Si—O—Si. Siloxane has a skeleton structure with the bond of silicon and oxygen. As a substituent, an organic group containing at least hydrogen (for example, an alkyl group or aromatic hydrocarbon) is used. Alternatively, a fluoro group can be used as the substituent. Further alternatively, both a fluoro group and an organic group containing at least hydrogen may be used as the substituent.

Figure 26B:
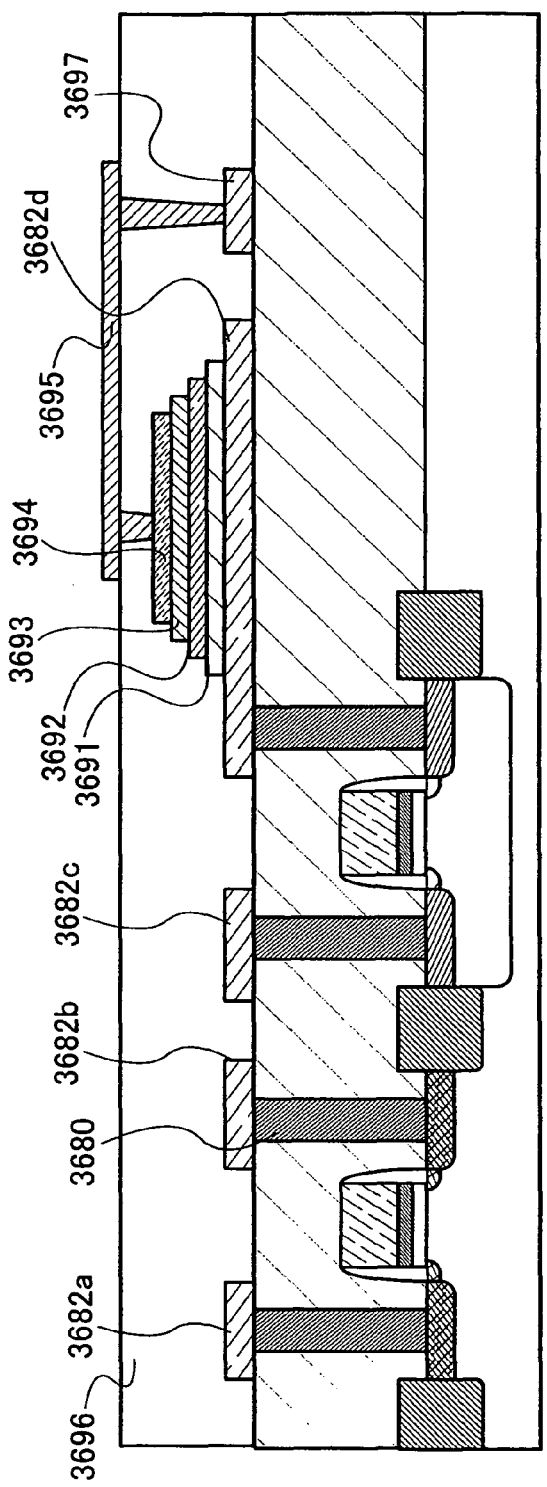

Next, conductive films 3680 are formed in the openings 3678 by a CVD method or the like. Then, conductive films 3682a to 3682d are selectively formed over the insulating films 3677 so as to be electrically connected to the conductive films 3680 (see FIG. 26B).

The conductive films 3680 and the conductive films 3682a to 3682d are formed in a single layer or stacked layers of an element of aluminum, tungsten, titanium, tantalum, molybdenum, nickel, platinum, copper, gold, silver, manganese, neodymium, carbon, or silicon, or an alloy material or a compound material containing such an element as its main component by a CVD method, a sputtering method, or the like. An alloy material containing aluminum as its main component corresponds to, for example, a material which contains aluminum as its main component and also contains nickel, or an alloy material which contains aluminum as its main component and also contains nickel and one or both carbon and silicon. The conductive films 3680 and the conductive films 3682a to 3682d may be formed to have a stacked structure of a barrier film, an aluminum-silicon film, and a barrier film or a stacked structure of a barrier film, an aluminum silicon film, a titanium nitride film, and a barrier film. Note that the barrier film is a thin film formed of titanium, a nitride of titanium, molybdenum, or a nitride of molybdenum. Aluminum and aluminum silicon are optimum materials of the conductive films 3680 and the conductive films 3682a to 3682d because they have low resistance and are inexpensive. When barrier layers are provided as the top layer and the bottom layer of the conductive film 3680, generation of hillocks of aluminum and aluminum silicon can be prevented. When a barrier film formed of titanium which is an element having a high reducing property is formed, even when there is a thin natural oxide film formed on the crystalline semiconductor film, the natural oxide film can be reduced and thus the natural oxide film is removed, and a favorable contact between the conductive films 3680 and the conductive films 3682a to 3682d and the crystalline semiconductor film can be obtained. Here, the conductive films 3680 and the conductive films 3682a to 3682d can be formed by selective growth of tungsten by a CVD method.

Through the above steps, a p-channel transistor formed in the region 3612 of the substrate 3600 and an n-channel transistor formed in the region 3613 of the substrate 3600 can be obtained.

Note that the structure of transistors which is applied to the present invention is not limited to the structure illustrated in the drawing. For example, a transistor with an inversely staggered structure, a FinFET structure, or the like can be used. A FinFET structure is preferable because it can suppress a short channel effect which occurs along with reduction in transistor size.

The semiconductor device of the present invention includes a battery capable of storing power, which is supplied to the signal processing circuit. As the battery, a capacitor such as a double-layer electrolytic capacitor or a thin-film secondary battery is preferably used. In this embodiment mode, a connection between a transistor and a thin-film secondary battery is described.

In this embodiment mode, the secondary battery is stacked over the conductive film 3682d connected to the transistor. The secondary battery has a structure in which a current-collecting thin film, a negative electrode active material layer, a solid electrolyte layer, a positive electrode active material layer, and a current-collecting thin film are sequentially stacked (see FIG. 26B). Therefore, the material of the conductive film 3682d which also has a function of the current-collecting thin film of the secondary battery should have high adhesion to the negative electrode active material layer and also low resistance. In particular, aluminum, copper, nickel, vanadium, or the like is preferably used.

Next, the structure of the thin-film secondary battery is described in detail. A negative electrode active material layer 3691 is formed over the conductive film 3682d. In general, vanadium oxide ($V_2O_5$) or the like is used. Next, a solid electrolyte layer 3692 is formed over the negative electrode active material layer 3691. In general, lithium phosphate ($Li_3PO_4$) or the like is used. Next, a positive electrode active material layer 3693 is formed over the solid electrolyte layer 3692. In general, lithium manganese oxide ($LiMn_2O_4$) or the like is used. Lithium cobalt oxide ($LiCoO_2$) or lithium nickel oxide ($LiNiO_2$) may also be used. Next, a current-collecting thin film 3694 to serve as an electrode is formed over the positive electrode active material layer 3693. The current-collecting thin film 3694 should have high adhesion to the positive electrode active material layer 3693 and also low resistance. For example, aluminum, copper, nickel, vanadium, or the like can be used.

Each of the above thin layers of the negative electrode active material layer 3691, the solid electrolyte layer 3692, the positive electrode active material layer 3693, and the current-collecting thin film 3694 may be formed by sputtering or evaporation. In addition, the thickness of each layer is preferably 0.1 to 3 μm.

Next, a resin film is formed by a spin-coating method or the like. Then, the resin film is etched to form a contact hole and an interlayer film 3696. The interlayer film 3696 is not limited to a resin film, and other films such as an oxide film formed by a CVD method may be used as well; however, a resin film is preferably used in terms of flatness. Further, the contact hole can be formed without etching with the use of a photosensitive resin. Next, a wiring layer 3695 is formed over the interlayer film 3696 and connected to a wiring 3697. Thus, an electrical connection with the thin-film secondary battery is secured.

With the above structure, the semiconductor device of the present invention can employ a structure in which transistors are formed on a single crystal substrate and a thin-film secondary battery is formed thereover. Thus, an extremely thin and small-sized semiconductor device can be manufactured in this embodiment mode.

Note that the manufacturing method of the semiconductor device of this embodiment mode can be applied to any of the semiconductor devices described in this specification. That is, according to this embodiment mode, a semiconductor device which can transmit and receive information by detecting a difference between a signal line and a reference line in a signal waveform so as to generate a demodulation signal, and generate a demodulation signal stably even with a signal of which modulation factor is small can be manufactured.

Further, a semiconductor device which can demodulate a signal by canceling noise of each line and reducing influence of noise which results from a carrier wave can be manufactured.

Furthermore, a semiconductor device which can detect a signal as to a wireless signal of which modulation factor is 10% and stably perform signal transmission and reception which are based on ISO/IEC 15693 can be manufactured.

In the semiconductor device of the present invention, power from a power supply is continuously supplied while a wireless signal is received; therefore, the semiconductor device can be operated stably. Further, the semiconductor device can be wirelessly charged; therefore, shortage of power for transmitting and receiving individual information, due to deterioration of a battery over time, can be compensated.

Further, a semiconductor device which can generate a demodulation signal by detecting a difference between an output of a first bias circuit and an output of a second bias circuit, generate a demodulation signal stably even with a signal of which modulation factor is small, and demodulate a signal by reducing influence of noise can be manufactured.

Moreover, in the semiconductor device of the present invention, power from a power supply is continuously supplied while a carrier wave of which modulation factor is 10% is received; therefore, the semiconductor device can be operated stably. Further, the semiconductor device can be wirelessly charged; therefore, shortage of power for transmitting and receiving individual information, due to deterioration of a battery over time, can be compensated.

Embodiment Mode 7

Figure 13A:
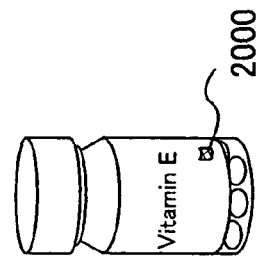
FIGS. 13A to 13F are views each illustrating an example in which a semiconductor device of the present invention is mounted.
Figure 13C:
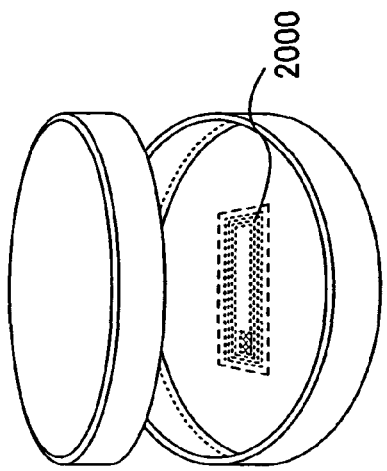
Figure 13B:
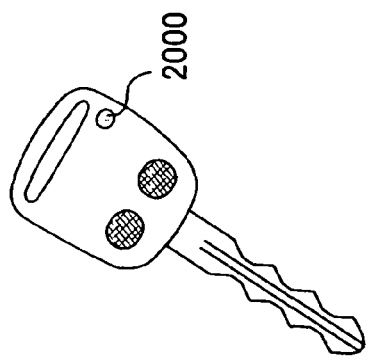
Figure 13E:
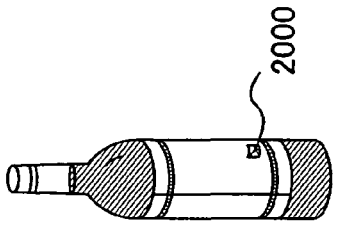
Figure 13F:
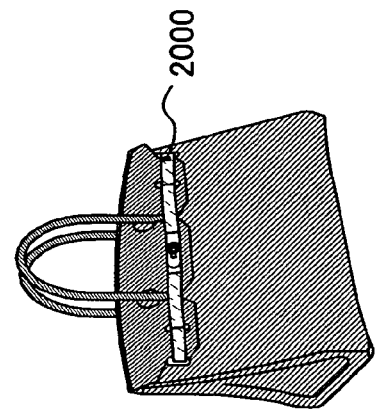
Figure 13D:
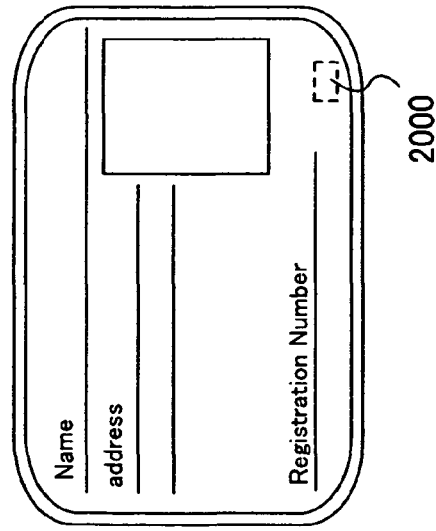

A semiconductor device 2000 to which the present invention is applied can be used for a variety of items and systems by utilizing a function capable of transmitting and receiving an electromagnetic wave. As the items, for example, the following are given: keys (see FIG. 13A), paper money, coins, securities, bearer bonds, certificates (such as a driver's license or a resident's card, see FIG. 13B), books, containers (such as a Petri dish, see FIG. 13C), packaging containers (such as wrapping paper or bottles, see FIGS. 13E and 13F), recording media (such as a disk or video tape), vehicles (such as a bicycle), personal accessories (such as shoes or eyeglasses, see FIG. 13D), food, clothing, living ware, electronic appliances (such as a liquid crystal display device, an EL display device, a television device, or a portable terminal), and the like. The semiconductor device of the present invention is fixed or mounted to items of a variety of forms such as those above by being attached or embedded on a surface. Further, a system refers to a goods management system, an authentication function system, a distribution system, or the like.

With the use of the semiconductor device of the present invention, the semiconductor device can be operated while being supplied with power from a power supply continuously through wireless communication. In addition, noise of a carrier wave can be reduced.

Moreover, with the use of the semiconductor device of the present invention, power from a power supply is continuously supplied while a carrier wave of which modulation factor is 10% is received. In addition, noise of the carrier wave can be reduced. This embodiment mode can be freely combined with other embodiment modes.

Embodiment

A waveform of a signal when a semiconductor device capable of wireless communication to which the present invention is applied is actually operated will be described with reference to the drawings. The semiconductor device 100 described in Embodiment Mode 1 is used as the semiconductor device capable of wireless communication. In each portion in the demodulation signal generation circuit, a waveform is obtained using an oscilloscope. As to an analog buffer circuit, one illustrated in FIG. 10A is used.

A parameter of each element in the semiconductor device used in this embodiment is as follows. In the first demodulation circuit 154, the first capacitor 602 is at 10 pF; the second capacitor 610, 2 pF; the third capacitor 614, 1 pF; the first resistor 608, 200 kΩ; and the second resistor 612, 100 kΩ. In the second demodulation circuit 156, the first a capacitor 622 is at 10 pF; the second capacitor 630, 2 pF; and the third capacitor 634, 1 pF. In the first bias circuit 158, the capacitor 802A is at 500 pF; the first resistor 804A, 300 kΩ; and the second resistor 806A, 400 kΩ. In the second bias circuit 160, the capacitor 802B is at 500 pF; the first resistor 804B, 300 kΩ; and the second resistor 806B, 400 kΩ. Resistance of a resistor included in the constant current circuit 1003 is at 100 kΩ.

Figure 27A:
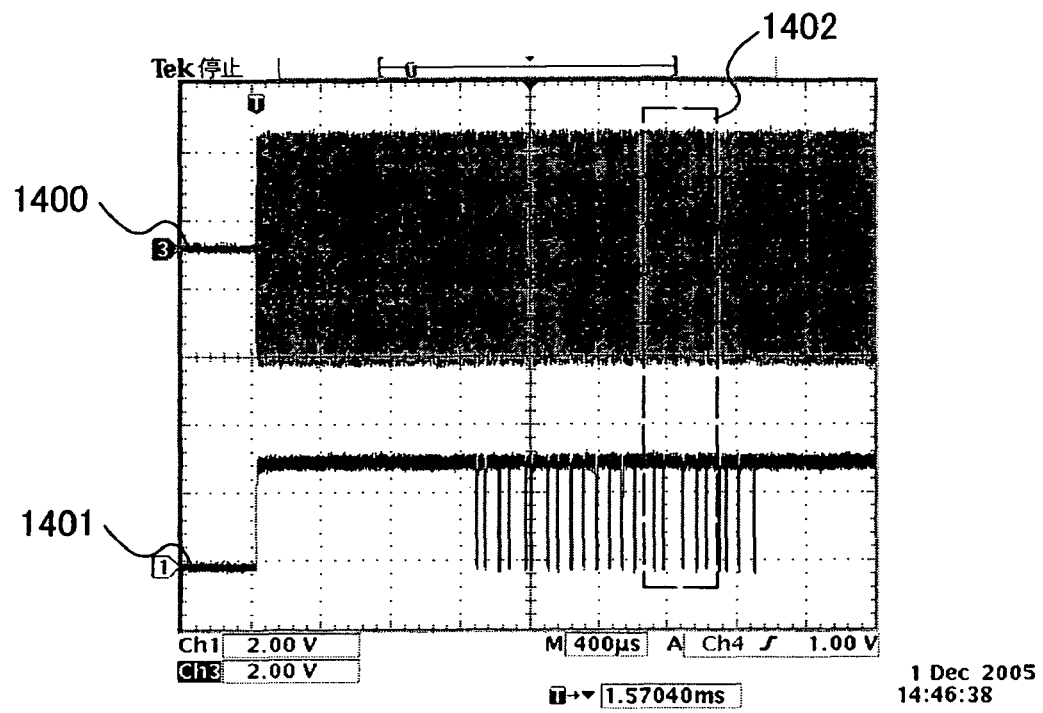
FIGS. 27A and 27B are waveforms illustrating each portion of a semiconductor device to which the present invention is applied.
Figure 27B:
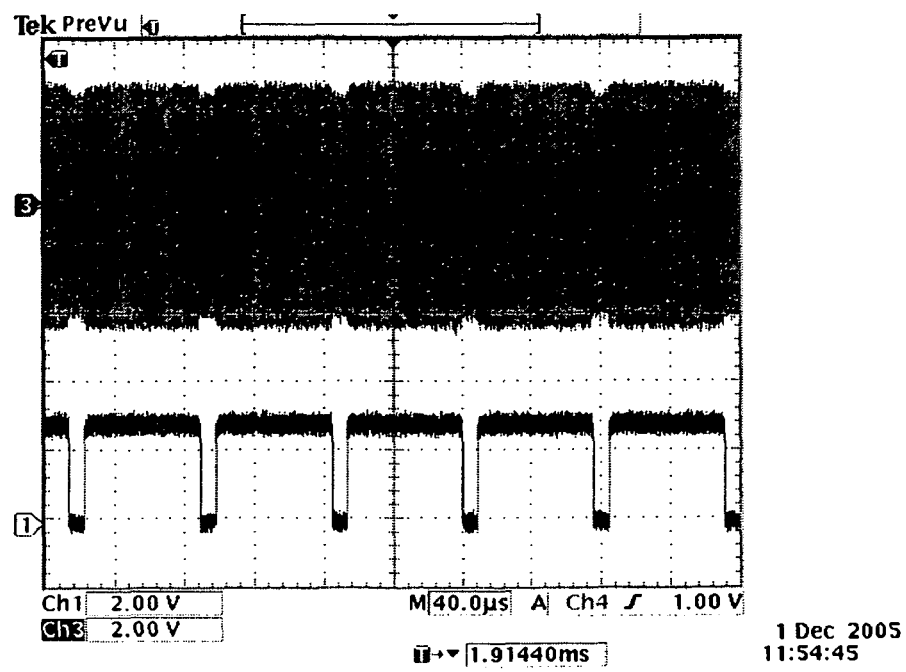

FIGS. 27A and 27B illustrate a waveform 1400 inputted into the input portion 152 and a waveform 1401 outputted from the output portion 166 of the demodulation signal generation circuit, respectively. When the waveform 1400 is inputted into the input portion 152, the waveform 1401 was outputted from the output portion 166. Note that FIG. 27B is an enlarged view of a region 1402 in FIG. 27A.

Figure 28A:
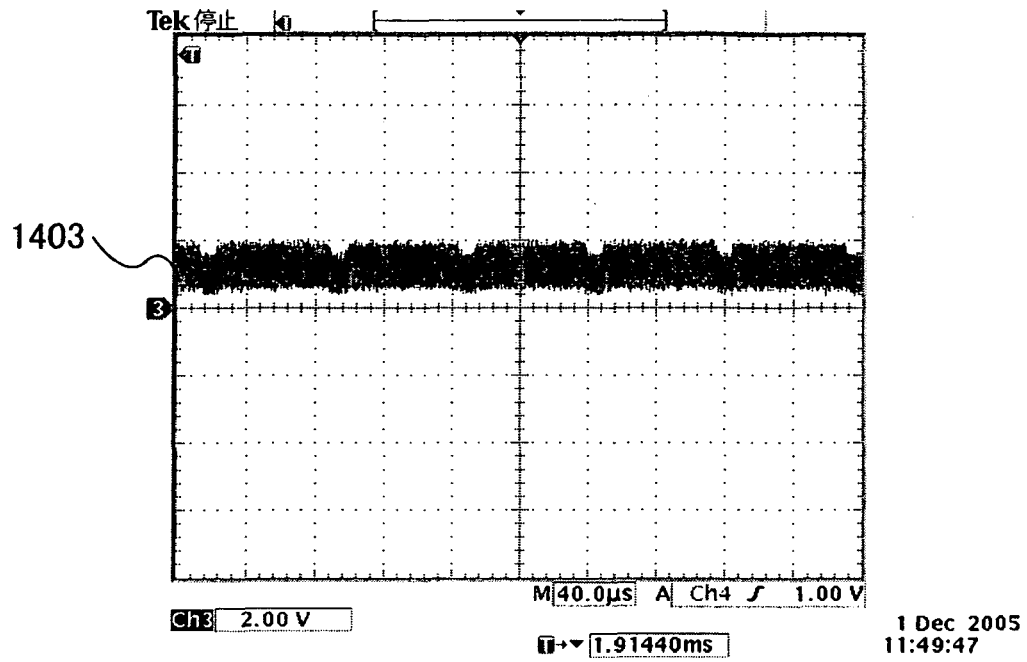
FIGS. 28A and 28B are waveforms illustrating each portion of a semiconductor device to which the present invention is applied.
Figure 28B:
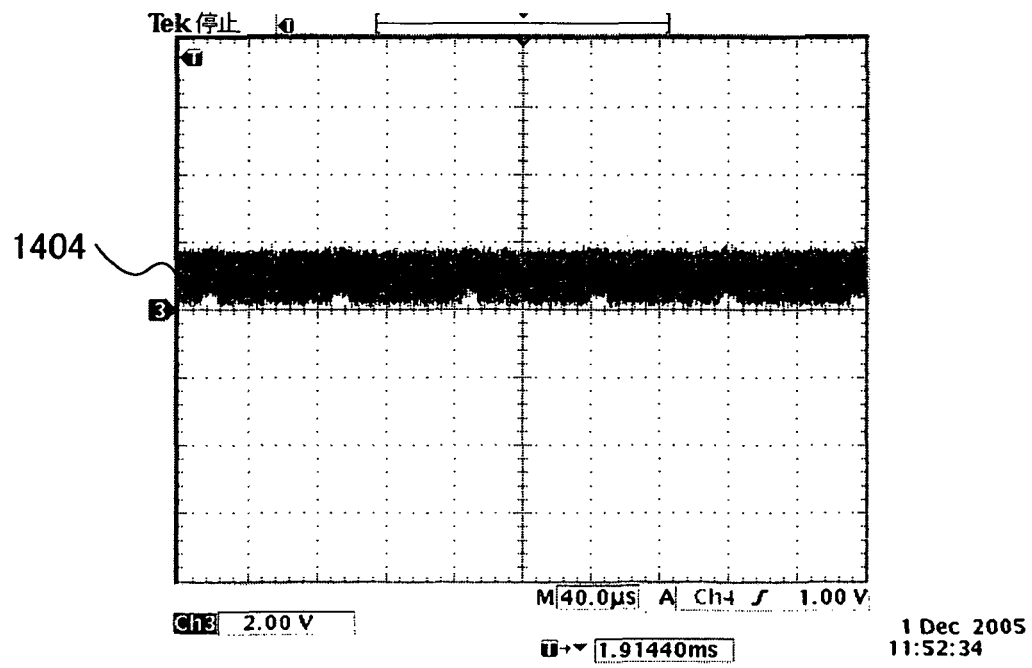

FIGS. 28A and 28B illustrate waveforms which are detected from the first input portion 900A and the second input portion 900B of the comparator 162 when the waveform 1400 is inputted into the input portion 152. FIG. 28A illustrates a waveform 1403 which is detected from the first input portion 900A. FIG. 28B illustrates a waveform 1404 which is detected from the second input portion 900B.

Figure 29A:
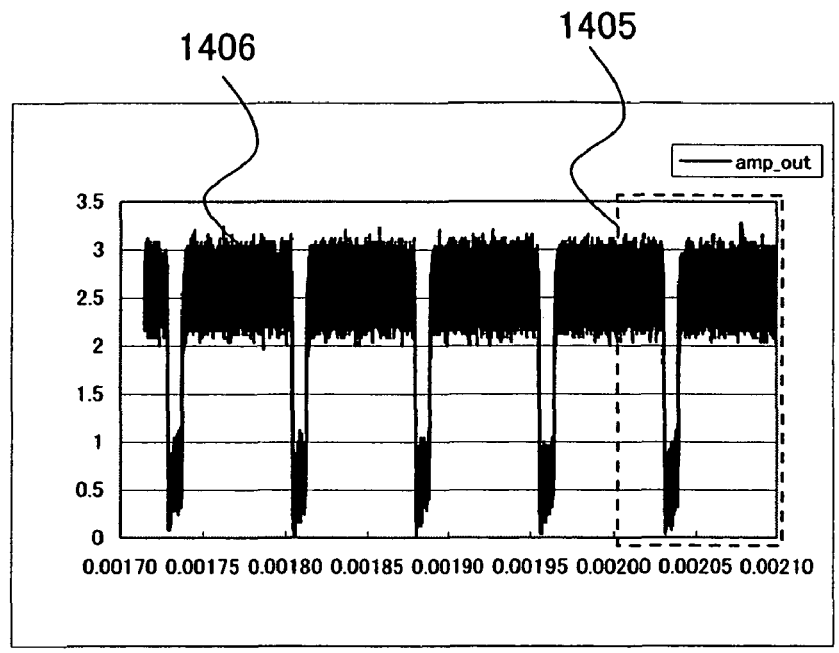
FIGS. 29A and 29B are waveforms illustrating each portion of a semiconductor device to which the present invention is applied.
Figure 29B:
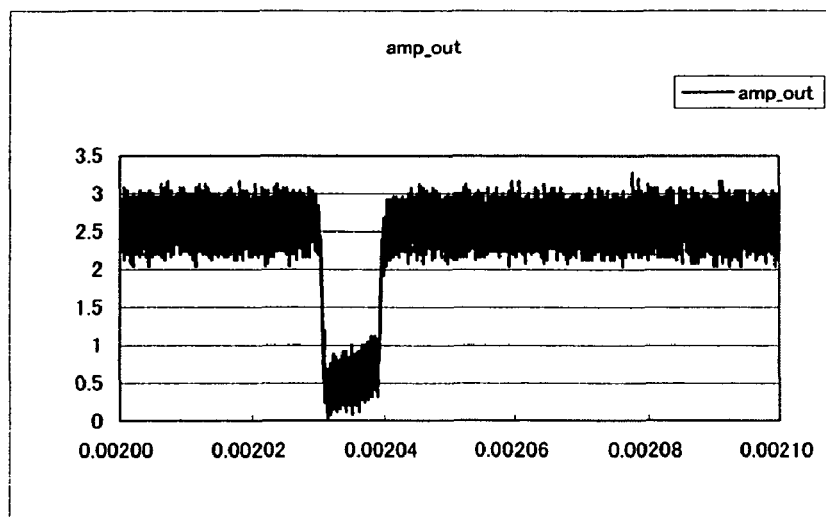
Figure 32A:
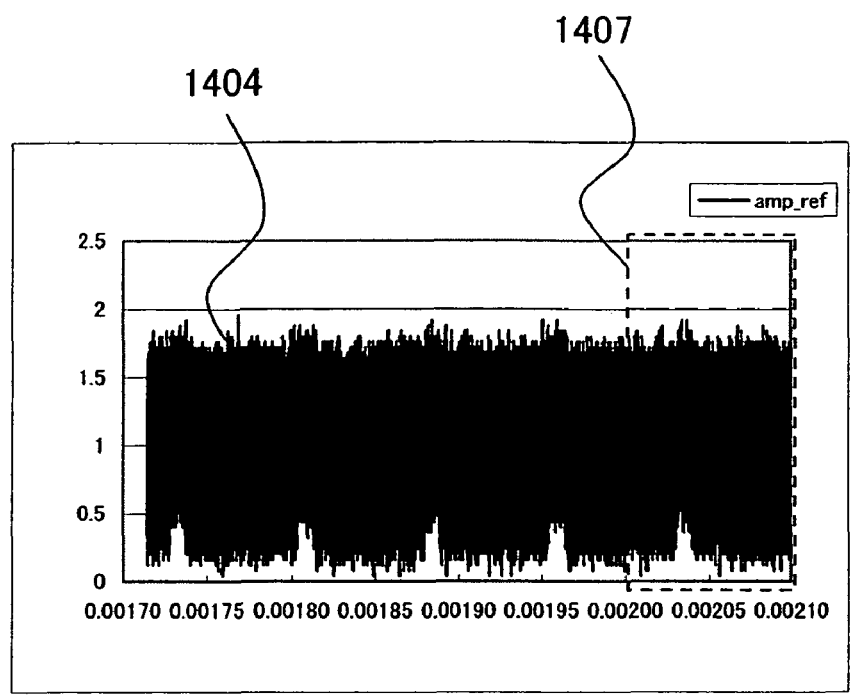
FIGS. 32A and 32B are waveforms illustrating each portion of a semiconductor device to which the present invention is applied.
Figure 32B:
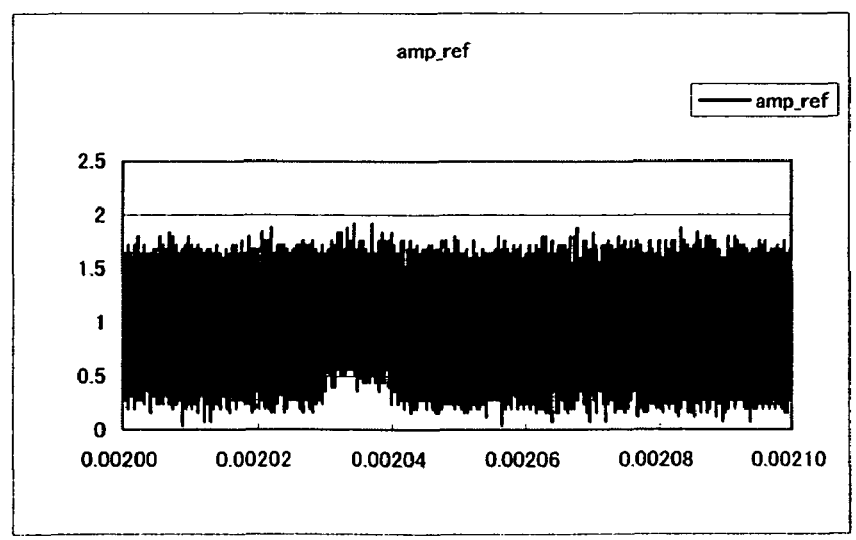
Figure 33A:
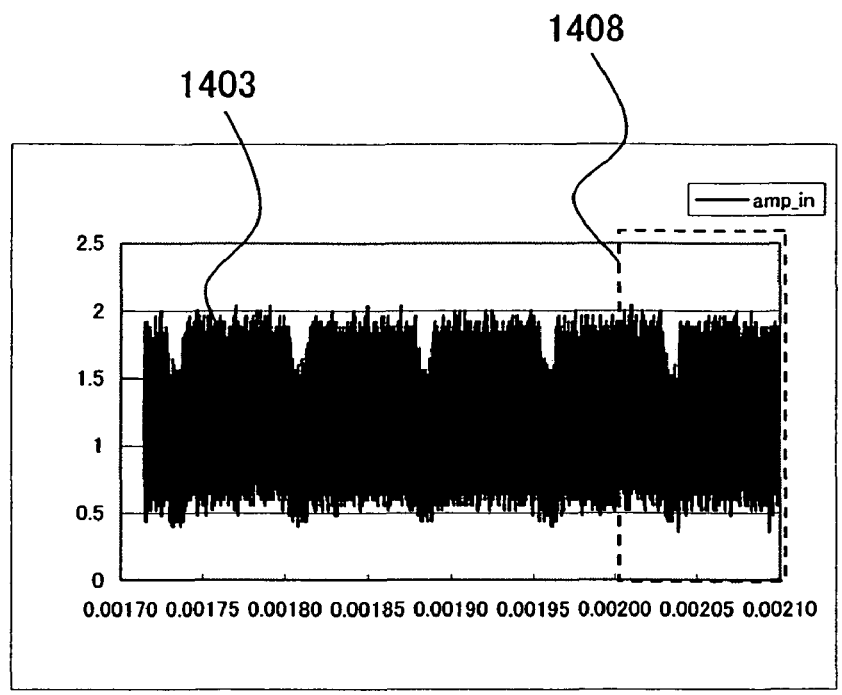
FIGS. 33A and 33B are waveforms illustrating each portion of a semiconductor device to which the present invention is applied.
Figure 33B:
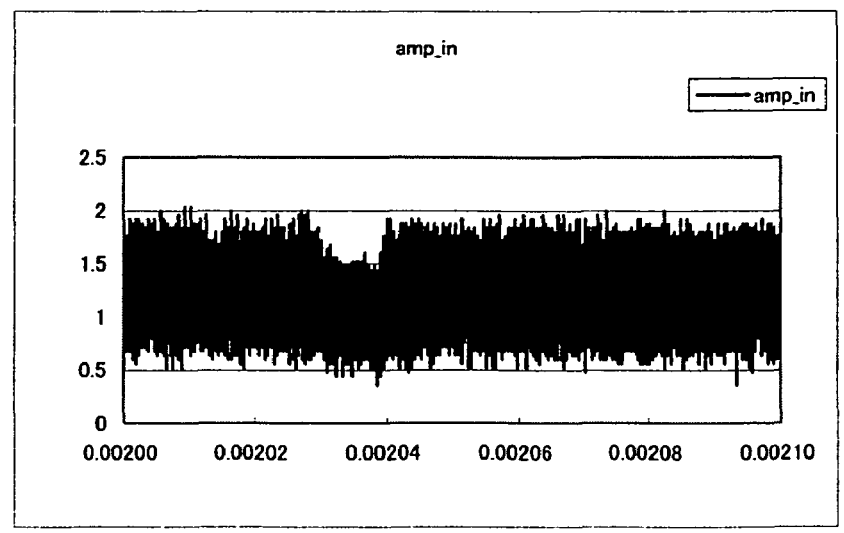

When the waveform 1403 is inputted into the first input portion 900A and the waveform 1404 is inputted into the second input portion 900B, a waveform 1406 was detected from the output portion 912 of the comparator 162. FIG. 29A illustrates the waveform 1406. FIGS. 32A and 32B illustrate the waveforms 1403 and 1404 for comparison, respectively. When the waveforms 1403 and 1404 are compared with the waveform 1406 illustrated in FIG. 29A, a difference between the waveform 1403 and the waveform 1404 can be obtained through the comparator 162; thus, such a signal having less noise as the waveform 1406 can be obtained. Further, by comparison of the waveform 1403 and the waveform 1404, it is apparent from FIG. 29B that noise of a carrier wave is reduced in the waveform 1406. Note that FIG. 29B illustrates an enlarged view of a region 1405 in FIG. 29A. Similarly, FIG. 32B illustrates an enlarged view of a region 1407 in FIG. 32A, and FIG. 33B illustrates an enlarged view of a region 1408 in FIG. 33A.

As shown in this embodiment, with the use of the semiconductor device of the present invention, a difference between a signal line and a reference line in a signal waveform is detected; therefore, a demodulation signal is generated, and a demodulation signal is stably generated even with a signal of which modulation factor is small. Accordingly, information can be transmitted and received.

In the above signal waveforms, noise that exists in each of the signal line and the reference line has the same phase. In the present invention, demodulation is performed by comparison of the signal line and the reference line. Therefore, the noise of each line is cancelled and, influence of noise, which results from a carrier wave, is reduced; thus, a signal can be demodulated.

Furthermore, with the use of the present invention, a signal can be detected stably also as to a wireless signal of which modulation factor is 10%, and signal transmission and reception which are based on ISO/IEC 15693 can be performed stably.

In the semiconductor device of the present invention, power from a power supply is continuously supplied while a wireless signal is received; therefore, the semiconductor device can be operated stably. Further, as shown in Embodiment Mode 2, a battery is mounted on the semiconductor device of the present invention; therefore, much stable operation is possible.

The present application is based on Japanese Patent Applications serial no. 2006-347086 and no. 2006-350344 filed with Japan Patent Office on Dec. 25, 2006 and Dec. 26, 2006, respectively, the entire contents of which are hereby incorporated by reference.

The invention claimed is:

1. A semiconductor device capable of wireless communication comprising:
    a first demodulation circuit having an input portion electrically connected to an antenna circuit, the first demodulation circuit is configured to demodulate a first electric signal;
    a second demodulation circuit, which is configured to demodulate a second electric signal having a polarity opposite to the first electric signal, the second demodulation circuit electrically connected to the input portion;
    a first bias circuit having an input portion electrically connected to an output portion of the first demodulation circuit;
    a second bias circuit having an input portion electrically connected to an output portion of the second demodulation circuit; and
    a comparator having a first input portion and a second input portion,
    wherein an output portion of the first bias circuit is electrically connected to the first input portion of the comparator, and
    wherein an output portion of the second bias circuit is electrically connected to the second input portion of the comparator.

2. A semiconductor device capable of wireless communication according to claim 1, wherein the comparator is any one of a differential circuit, a differential amplifier, or an operational amplifier.

3. A semiconductor device capable of wireless communication according to claim 2, wherein the antenna is in an annular form or a helical form.

4. A semiconductor device capable of wireless communication according to claim 1, wherein the semiconductor device comprises a battery capable of being charged wirelessly.

5. A semiconductor device capable of wireless communication comprising:
    a first demodulation circuit having an input portion electrically connected to an antenna circuit;
    a second demodulation circuit, which is configured to demodulate an electric signal having a polarity opposite to an electric signal demodulated by the first demodulation circuit, the second demodulation circuit electrically connected to the input portion;
    a first bias circuit having an input portion electrically connected to an output portion of the first demodulation circuit;
    a second bias circuit having an input portion electrically connected to an output portion of the second demodulation circuit;
    a comparator having a first input portion and a second input portion; and
    an analog buffer circuit electrically connected to an output portion of the comparator,
    wherein an output portion of the first bias circuit is electrically connected to the first input portion of the comparator, and
    wherein an output portion of the second bias circuit is electrically connected to the second input portion of the comparator.

6. A semiconductor device capable of wireless communication according to claim 5, wherein the comparator is any one of a differential circuit, a differential amplifier, or an operational amplifier.

7. A semiconductor device capable of wireless communication according to claim 6, wherein the antenna is in an annular form or a helical form.

8. A semiconductor device capable of wireless communication according to claim 5, wherein the semiconductor device comprises a battery capable of being charged wirelessly.

9. A semiconductor device capable of wireless communication according to claim 5, wherein the analog buffer circuit comprises a source follower circuit, a constant current circuit, and an inverter circuit.

10. A semiconductor device capable of wireless communication comprising:
    an antenna circuit;
    a first demodulation signal generation circuit electrically connected to the antenna circuit;
    a second demodulation signal generation circuit which is configured to demodulate a signal of which modulation factor is smaller than a modulation factor of the first demodulation signal generation circuit; and
    a selective circuit which selects which of the first demodulation signal generation circuit and the second demodulation signal generation circuit is used when a signal is received through the antenna circuit,
    wherein the second demodulation signal generation circuit includes a comparator, and
    wherein the comparator and a wiring of a power supply potential or a reference potential are connected through a transistor.

11. A semiconductor device capable of wireless communication according to claim 10, wherein the selective circuit comprises an inverter circuit, a flip-flop circuit, and a selector circuit.

12. A semiconductor device capable of wireless communication according to claim 10, wherein the second demodulation signal generation circuit comprises:
    a first demodulation circuit having one input portion electrically connected to an antenna circuit;
    a second demodulation circuit, which demodulates an electric signal having a polarity opposite to an electric signal of the first demodulation circuit, the second demodulation circuit electrically connected to the input portion;
    a first bias circuit having an input portion electrically connected to an output portion of the first demodulation circuit; and
    a second bias circuit having an input portion electrically connected to an output portion of the second demodulation circuit;
    wherein the comparator has a first input portion and a second input portion,
    wherein an output portion of the first bias circuit is electrically connected to the first input portion, and
    wherein an output portion of the second bias circuit is electrically connected to the second input portion.

13. A semiconductor device capable of wireless communication according to claim 10, wherein the second demodulation signal generation circuit comprises:
    a first demodulation circuit having one input portion electrically connected to an antenna circuit;

a second demodulation circuit, which demodulates an electric signal having a polarity opposite to an electric signal of the first demodulation circuit, the second demodulation circuit electrically connected to the input portion;

a first bias circuit having an input portion electrically connected to an output portion of the first demodulation circuit;

a second bias circuit having an input portion electrically connected to an output portion of the second demodulation circuit;

a comparator having a first input portion and a second input portion; and an analog buffer circuit electrically connected to an output portion of the comparator, wherein an output portion of the first bias circuit is electrically connected to the first input portion, and wherein an output portion of the second bias circuit is electrically connected to the second input portion.

14. A semiconductor device capable of wireless communication according to claim 10, wherein the comparator is any one of a differential circuit, a differential amplifier, or an operational amplifier.

15. A semiconductor device capable of wireless communication according to claim 14, wherein the antenna is in an annular form or a helical form.

16. A semiconductor device capable of wireless communication according to claim 10, wherein the semiconductor device comprises a battery capable of being charged wirelessly.

17. A semiconductor device capable of wireless communication according to claim 10, wherein the analog buffer circuit comprises a source follower circuit, a constant current circuit, and an inverter circuit.

18. A semiconductor device capable of wireless communication comprising:

an antenna circuit;

a first demodulation signal generation circuit which is configured to demodulate a signal of which modulation factor is greater than or equal to 90% and less than or equal to 100%;

a second demodulation signal generation circuit which demodulates a signal of which modulation factor is greater than or equal to 10% and less than or equal to 30%; and a selective circuit which selects which of the first demodulation signal generation circuit and the second demodulation signal generation circuit is used when a signal is received through the antenna circuit, wherein the second demodulation signal generation circuit includes a comparator, and wherein the comparator and a wiring of a power supply potential or a reference potential are connected through a transistor.

19. A semiconductor device capable of wireless communication according to claim 18, wherein the selective circuit comprises an inverter circuit, a flip-flop circuit, and a selector circuit.

20. A semiconductor device capable of wireless communication according to claim 18, wherein the second demodulation signal generation circuit comprises:

a first demodulation circuit having one input portion electrically connected to an antenna circuit;

a second demodulation circuit, which demodulates an electric signal having a polarity opposite to an electric signal of the first demodulation circuit, the second demodulation circuit electrically connected to the input portion;

a first bias circuit having an input portion electrically connected to an output portion of the first demodulation circuit; and a second bias circuit having an input portion electrically connected to an output portion of the second demodulation circuit;

wherein the comparator has a first input portion and a second input portion, wherein an output portion of the first bias circuit is electrically connected to the first input portion, and wherein an output portion of the second bias circuit is electrically connected to the second input portion.

21. A semiconductor device capable of wireless communication according to claim 18, wherein the second demodulation signal generation circuit comprises:

a first demodulation circuit having one input portion electrically connected to an antenna circuit;

a second demodulation circuit, which demodulates an electric signal having a polarity opposite to an electric signal of the first demodulation circuit, the second demodulation circuit electrically connected to the input portion;

a first bias circuit having an input portion electrically connected to an output portion of the first demodulation circuit;

a second bias circuit having an input portion electrically connected to an output portion of the second demodulation circuit;

a comparator having a first input portion and a second input portion; and an analog buffer circuit electrically connected to an output portion of the comparator, wherein an output portion of the first bias circuit is electrically connected to the first input portion, and wherein an output portion of the second bias circuit is electrically connected to the second input portion.

22. A semiconductor device capable of wireless communication according to claim 18, wherein the comparator is any one of a differential circuit, a differential amplifier, or an operational amplifier.

23. A semiconductor device capable of wireless communication according to claim 22, wherein the antenna is in an annular form or a helical form.

24. A semiconductor device capable of wireless communication according to claim 18, wherein the semiconductor device comprises a battery capable of being charged wirelessly.

25. A semiconductor device capable of wireless communication according to claim 18, wherein the analog buffer circuit comprises a source follower circuit, a constant current circuit, and an inverter circuit.

* * * * *

UNITED STATES PATENT AND TRADEMARK OFFICE
CERTIFICATE OF CORRECTION

| | |
|---|---|
| PATENT NO. | : 7,877,068 B2 |
| APPLICATION NO. | : 12/003354 |
| DATED | : January 25, 2011 |
| INVENTOR(S) | : Tomoaki Atsumi et al. |

It is certified that error appears in the above-identified patent and that said Letters Patent is hereby corrected as shown below:

At column 3, line 12, "IS014443-A" should be --ISO14443-A--;

At column 3, line 15, "IS014443-B" should be --ISO14443-B--;

At column 6, line 52, "FIG. 7A" should be --FIGS. 7A--;

At column 12, lines 26 and 27, "FIG. 7A" should be --FIGS. 7A--;

At column 15, line 40, "ISO/EEC" should be --ISO/IEC--;

At column 20, lines 54 and 55, "FIG. 7A" should be --FIGS. 7A--;

At column 22, line 59, "1 d/2" should be --$I_d/2$--;

At column 23, line 17, "$\lambda$" should be --k--.

Signed and Sealed this
Twelfth Day of June, 2012

David J. Kappos
*Director of the United States Patent and Trademark Office*